United States Patent
Geng et al.

(10) Patent No.: US 12,423,134 B2
(45) Date of Patent: Sep. 23, 2025

(54) COMMUNICATION METHOD AND APPARATUS

(71) Applicant: HUAWEI TECHNOLOGIES CO., LTD., Shenzhen (CN)

(72) Inventors: Tingting Geng, Shanghai (CN); Xingxing Hu, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 18/304,610

(22) Filed: Apr. 21, 2023

(65) Prior Publication Data
US 2023/0259391 A1 Aug. 17, 2023

Related U.S. Application Data

(63) Continuation of application No. PCT/CN2020/122982, filed on Oct. 22, 2020.

(51) Int. Cl.
| | |
|---|---|
| *G06F 9/48* | (2006.01) |
| *H04W 4/50* | (2018.01) |
| *H04W 8/22* | (2009.01) |
| *G06N 20/00* | (2019.01) |

(52) U.S. Cl.
CPC ............ *G06F 9/4843* (2013.01); *H04W 4/50* (2018.02); *H04W 8/22* (2013.01); *G06N 20/00* (2019.01)

(58) Field of Classification Search
CPC ......... G06F 9/4843; H04W 4/50; H04W 8/22; G06N 20/00; G06N 3/045; G06N 3/08; H04L 41/147; H04L 41/16
See application file for complete search history.

(56) References Cited

U.S. PATENT DOCUMENTS

| | | | |
|---|---|---|---|
| 12,231,525 B2 * | 2/2025 | He | H04L 69/22 |
| 2020/0374729 A1 * | 11/2020 | Alanen | H04L 5/0044 |
| 2021/0345134 A1 * | 11/2021 | Ottersten | H04W 16/22 |

FOREIGN PATENT DOCUMENTS

CN 109409883 A 3/2019

OTHER PUBLICATIONS

3rd Generation Partnership Project; Technical Specification Group Services and System Aspects; Procedures for the 5G System (5GS); Stage 2 (Release 16), 3GPP TS 23.502 V16.4.0 (Mar. 2020), Technical Specification, total 582 pages.

(Continued)

*Primary Examiner* — Ankur Jain
(74) *Attorney, Agent, or Firm* — HAUPTMAN HAM, LLP

(57) ABSTRACT

A communication method and an apparatus, to determine a terminal that is to execute an artificial intelligence (artificial intelligence, AI) task, so that execution of the AI task is more targeted, and an execution result is more accurate. The method includes receiving first information from an AI apparatus, where the first information indicates information about a first terminal capable of executing a first AI task; receiving information from a second terminal; and determining, based on the first information and the information about the second terminal, whether the second terminal is configured to perform the first AI task.

17 Claims, 10 Drawing Sheets

(56) References Cited

OTHER PUBLICATIONS

3rd Generation Partnership Project; Technical Specification Group Services and System Aspects; Study on traffic characteristics and performance requirements for AI/ML model transfer in 5GS (Release 18), 3GPP TR 22.874 V0.1.0 (Sep. 2020), Technical Report, total 55 pages.

3rd Generation Partnership Project; Technical Specification Group Radio Access Network; NG-RAN; Ng Application Protocol (NGAP) (Release 16), 3GPP TS 38.413 V16.1.0 (Mar. 2020), Technical Specification, total 341 pages.

3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16), 3GPP TS 37.320 V16.0.0 (Mar. 2020), Technical Specification, total 34 pages.

3rd Generation Partnership Project; Technical Specification Group Radio Access Network; NG-RAN; F1 application protocol (F1AP) (Release 15), 3GPP TS 38.473 V15.4.1 (Jan. 2019), Technical Specification, total 192 pages.

3rd Generation Partnership Project; Technical Specification Group Radio Access Network; NR; Radio Resource Control (RRC) protocol specification (Release 16), 3GPP TS 38.331 V16.1.0 (Jul. 2020), Technical Specification, total 906 pages.

3rd Generation Partnership Project; Technical Specification Group Radio Access Network; NR; NR and NG-RAN Overall Description; Stage 2 (Release 16), 3GPP TS 38.300 V16.1.0 (Mar. 2020), Technical Specification, total 133 pages.

3rd Generation Partnership Project; Technical Specification Group Radio Access Network; NG-RAN; Xn application protocol (XnAP) (Release 16), 3GPP TS 38.423 V16.1.0 (Mar. 2020), Technical Specification, total 334 pages.

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.7.0 (Sep. 2019), Technical Specification, total 962 pages.

3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.5.0 (Mar. 2019), Technical Specification, total 131 pages.

\* cited by examiner

COMMUNICATION METHOD AND APPARATUS

CROSS-REFERENCE TO RELATED APPLICATIONS

This application is a continuation of International Patent Application No. PCT/CN2020/122982, filed on Oct. 22, 2020. The disclosure of the aforementioned application is hereby incorporated in entirety by reference.

BACKGROUND

Currently, service types supported by mobile networks become increasingly diverse. For example, the mobile networks support different types of services such as ultra-high-speed services, ultra-low-latency services, ultra-reliable services, or services with ultra-massive connections. To support the diverse types of services, various new technologies call for being introduced into the mobile networks. This results in more complex network planning, network configuration, or resource scheduling of the mobile networks. In this case, if the network planning, network configuration, or resource scheduling is still performed based on manual experience or simple algorithms, disadvantages such as high time consumption, high costs, poor self-optimization, and poor scheduling algorithm adaptability are caused.

SUMMARY

Some embodiments provide a communication method and an apparatus, to determine a terminal that is to execute an AI task, so that execution of the AI task is more targeted, and an execution result is more accurate.

To achieve the foregoing objective, the following technical solutions are used in the embodiments.

Some embodiments provide a communication method. The method includes: receiving first information from an AI apparatus, where the first information indicates information about a terminal capable of executing a first AI task; receiving information from a first terminal; and determining, based on the first information and the information about the first terminal, whether the first terminal is capable of executing the first AI task.

Alternatively, some embodiments provide a communication method. The method includes: receiving first information from an AI apparatus, where the first information indicates a condition for a terminal capable of executing a first AI task; receiving information from a first terminal; and if the information about the first terminal meets the condition indicated in the first information, sending information about the first AI task to the first terminal. For example, the information about the first AI task indicates the first AI task. For example, the information about the first AI task includes configuration information corresponding to the first AI task.

In some embodiments, the terminal capable of executing the first AI task is determined from terminals that have established a connection to a first network device, so that execution of the first AI task is more targeted, and an execution result is more accurate.

In some embodiments the first information indicates at least one of the following information about the terminal capable of executing the first AI task: type information of the terminal, information about a moving speed of the terminal, information about a computing capability level of the terminal, electric-quantity information of the terminal, latency information of the terminal, signal quality threshold information of the terminal, information about a memory size of the terminal, information about a remaining memory size of the terminal, information about an AI task type supported by the terminal, information about a network function supported by the terminal and implementable through AI, and information about an AI algorithm supported by the terminal. According to the foregoing method, the first network device determines, based on information in a plurality of forms and indicated by the AI apparatus, whether the first terminal is capable of executing the first AI task. This increases diversity and flexibility of determining, by the first network device, whether the first terminal is capable of executing the first AI task.

In some embodiments the information about the first terminal indicates at least one of the following information: type information of the first terminal, information about a moving speed of the first terminal, information about a computing capability level of the first terminal, electric-quantity information of the first terminal, latency information of the first terminal, signal quality information of the first terminal, information about a memory size of the first terminal, information about a remaining memory size of the first terminal, information about an AI task type supported by the first terminal, information about a network function supported by the first terminal and implementable through the AI, and information about an AI algorithm supported by the first terminal. According to the foregoing method, the first network device determines, based on information in a plurality of forms and about the first terminal, whether the first terminal is capable of executing the first AI task. This increases the diversity and flexibility of determining, by the first network device, whether the first terminal is capable of executing the first AI task.

In some embodiments the method further includes: receiving first configuration information from the AI apparatus, where the first configuration information is configuration information corresponding to the first AI task; and sending the first configuration information to the first terminal when determining that the first terminal is capable of executing the first AI task. According to the foregoing method, the first terminal executes the first AI task based on the first configuration information.

In some embodiments the first configuration information indicates at least one of the following information: an identifier of the first AI task, information about AI data that needs to be collected by a terminal that is to execute the first AI task, a data reporting manner of the first AI task, and information about an AI model used by the terminal that is to execute the first AI task. According to the foregoing method, the first configuration information is configured to have a plurality of forms. This increases diversity of the configuration information corresponding to the first AI task.

In some embodiments the method further includes: sending first indication information to the first terminal and/or the AI apparatus, where the first indication information indicates whether the first terminal is capable of executing the first AI task. According to the foregoing method, the first terminal and/or the AI apparatus is notified after whether the first terminal is capable of executing the first AI task is determined, so that the first terminal and/or the AI apparatus determine/determines whether the first terminal is capable of executing the first AI task.

Some embodiments provide a communication method. The method includes: sending information about a first terminal to a first network device.

In some embodiments the method further includes: receiving first configuration information from the first network device, where the first configuration information is configuration information corresponding to a first AI task; and executing the first AI task based on the first configuration information.

In some embodiments the method further includes: receiving first indication information from the first network device, where the first indication information indicates whether the first terminal is capable of executing the first AI task.

Some embodiments provide a communication method. The method includes: sending first information to a first network device, where the first information indicates information about a terminal capable of executing a first AI task.

In some embodiments the method further includes: sending first configuration information to the first network device, where the first configuration information is configuration information corresponding to the first AI task.

In some embodiments the method further includes: receiving first indication information from the first network device, where the first indication information indicates whether a first terminal is capable of executing the first AI task.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the first terminal in the foregoing methods. The chip system includes a chip, or includes a chip and another discrete component.

Some embodiments provide a chip system. The chip system includes a processor, and further includes a memory, to implement the function of the AI apparatus in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of embodiments.

Some embodiments provide a communication system. The system includes the apparatus according to the embodiments.

Some embodiments provide a communication method. The method includes: receiving information about a first terminal from a first network device; and determining, based on the information about the first terminal, whether the first terminal is capable of executing a first AI task.

Some embodiments provide a terminal capable of executing the first AI task is determined from terminals that have established a connection to the first network device, so that execution of the first AI task is more targeted, and an execution result is more accurate.

In some embodiments the determining, based on the information about the first terminal, whether the first terminal is capable of executing a first AI task includes: determining, based on the information about the first terminal and first information, whether the first terminal is capable of executing the first artificial intelligence (AI) task, where the first information indicates information about a terminal capable of executing the first AI task. According to the foregoing method, whether the first terminal is capable of executing the first AI task is determined based on the first information and the information about the first terminal.

In some embodiments the first information indicates at least one of the following information about the terminal capable of executing the first AI task: type information of the terminal, information about a moving speed of the terminal, information about a computing capability level of the terminal, electric-quantity information of the terminal, latency information of the terminal, signal quality threshold information of the terminal, information about a memory size of the terminal, information about a remaining memory size of the terminal, information about an AI task type supported by the terminal, information about a network function supported by the terminal and implementable through AI, and information about an AI algorithm supported by the terminal. According to the foregoing method, an AI apparatus determines, based on information in a plurality of forms, whether the first terminal is capable of executing the first AI task. This increases diversity and flexibility of determining, by the AI apparatus, whether the first terminal is capable of executing the first AI task.

In some embodiments the information about the first terminal indicates at least one of the following information: type information of the first terminal, information about a moving speed of the first terminal, information about a computing capability level of the first terminal, electric-quantity information of the first terminal, latency information of the first terminal, signal quality information of the first terminal, information about a memory size of the first terminal, information about a remaining memory size of the first terminal, information about an AI task type supported by the first terminal, information about a network function supported by the first terminal and implementable through the AI, and information about an AI algorithm supported by the first terminal. According to the foregoing method, the AI apparatus determines, based on information in a plurality of forms and about the first terminal, whether the first terminal is capable of executing the first AI task. This increases the diversity and flexibility of determining, by the AI apparatus, whether the first terminal is capable of executing the first AI task.

In some embodiments the method further includes: sending first indication information to the first network device, where the first indication information indicates whether the first terminal is capable of executing the first AI task. According to the foregoing method, the first network device is notified after whether the first terminal is capable of executing the first AI task is determined, so that the first network device determines whether the first terminal is capable of executing the first AI task, or the first network device notifies the first terminal whether the first terminal is capable of executing the first AI task.

In some embodiments in response to determining that the first terminal is capable of executing the first AI task, the method further includes: sending first configuration information to the first network device, where the first configuration information is configuration information corresponding to the first AI task. According to the foregoing method, the first configuration information is sent to the first network device, so that the first network device sends the first configuration information to the first terminal, and the first terminal executes the first AI task based on the first configuration information.

In some embodiments the first configuration information includes at least one of the following information: an identifier of the first AI task, information about AI data that needs to be collected by a terminal that is to execute the first AI task, a data reporting manner of the first AI task, or information about an AI model used by the terminal that is to execute the first AI task. According to the foregoing method, the first configuration information is configured to have a plurality of forms. This increases diversity of the configuration information corresponding to the first AI task.

Some embodiments provide a communication method. The method includes: receiving information from a first terminal, where the information about the first terminal indicates at least one of the following information: type information of the first terminal, information about a moving speed of the first terminal, information about a computing capability level of the first terminal, electric-quantity information of the first terminal, latency information of the first terminal, signal quality information of the first terminal, information about a memory size of the first terminal, information about a remaining memory size of the first terminal, information about an artificial intelligence AI task type supported by the first terminal, information about a network function supported by the first terminal and implementable through AI, and information about an AI algorithm supported by the first terminal; and sending the information about the first terminal to an AI apparatus.

In some embodiments the method further includes: receiving first indication information from the AI apparatus, where the first indication information indicates whether the first terminal is capable of executing a first AI task.

In some embodiments the method further includes: sending the first indication information to the first terminal.

In some embodiments the first terminal is capable of executing the first AI task, and the method further includes: receiving first configuration information from the AI apparatus, where the first configuration information is configuration information corresponding to the first AI task; and sending the first configuration information to the first terminal.

In some embodiments the first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task.

Some embodiments provide a communication method. The method includes: sending information about a first terminal to a first network device.

In some embodiments the method further includes: receiving first configuration information from the first network device, where the first configuration information is configuration information corresponding to a first AI task; and executing the first AI task based on the first configuration information.

In some embodiments the method further includes: receiving first indication information from the first network device, where the first indication information indicates whether the first terminal is capable of executing the first AI task.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the AI apparatus in the foregoing methods. The chip system includes a chip, or includes a chip and another discrete component.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the first terminal in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a communication system. The system includes the apparatus according to the embodiments.

Some embodiments provide a communication method. The method includes: receiving first information from a first network device, where the first information indicates information about a terminal capable of executing a first AI task;

and determining, based on the first information, whether a first terminal is capable of executing the first AI task.

According to the method provided in some embodiments, the terminal capable of executing the first AI task is determined from terminals that have established a connection to the first network device, so that execution of the first AI task is more targeted, and an execution result is more accurate.

In some embodiments the first information indicates at least one of the following information about the terminal capable of executing the first artificial intelligence AI task: type information of the terminal, information about a moving speed of the terminal, information about a computing capability level of the terminal, electric-quantity information of the terminal, latency information of the terminal, signal quality threshold information of the terminal, information about a memory size of the terminal, information about a remaining memory size of the terminal, information about an AI task type supported by the terminal, information about a network function supported by the terminal and implementable through AI, and information about an AI algorithm supported by the terminal. According to the foregoing method, the first terminal determines, based on information in a plurality of forms and indicated by an AI apparatus, whether the first terminal is capable of executing the first AI task. This increases diversity and flexibility of determining, by the first terminal, whether the first terminal is capable of executing the first AI task.

In some embodiments the determining, based on the first information, whether a first terminal is capable of executing the first AI task includes: determining, based on the first information and information about the first terminal, whether the first terminal is capable of executing the first AI task. According to the foregoing method, the first terminal determines, based on the first information and the information about the first terminal, whether the first terminal is capable of executing the first AI task.

In some embodiments the information about the first terminal indicates at least one of the following information: type information of the first terminal, information about a moving speed of the first terminal, information about a computing capability level of the first terminal, electric-quantity information of the first terminal, latency information of the first terminal, signal quality information of the first terminal, information about a memory size of the first terminal, information about a remaining memory size of the first terminal, information about an AI task type supported by the first terminal, information about a network function supported by the first terminal and implementable through the AI, and information about an AI algorithm supported by the first terminal. According to the foregoing method, the first terminal determines, based on information in a plurality of forms and about the first terminal, whether the first terminal is capable of executing the first AI task. This increases the diversity and flexibility of determining, by the first terminal, whether the first terminal is capable of executing the first AI task.

In some embodiments the method further includes: sending first indication information to the first network device, where the first indication information indicates whether the first terminal is capable of executing the first AI task. According to the foregoing method, after determining whether the first terminal is capable of executing the first AI task, the first terminal notifies, by using the first indication information, the first network device of a result determined by the first terminal.

In some embodiments the method further includes: receiving first configuration information from the first network device, where the first configuration information is configuration information corresponding to the first AI task. According to the foregoing method, the first terminal executes the first AI task based on the received first configuration information.

In some embodiments the first configuration information indicates at least one of the following information: an identifier of the first AI task, a data reporting manner of the first AI task, information about AI data that needs to be collected by a terminal that is to execute the first AI task, or information about an AI model used by the terminal that is to execute the first AI task. According to the foregoing method, the first configuration information is configured to have a plurality of forms. This increases diversity of the configuration information corresponding to the first AI task.

Some embodiments provide a communication method. The method includes: receiving first information from an AI apparatus, where the first information indicates information about a terminal capable of executing a first AI task; and sending the first information to a first terminal.

In some embodiments the method further includes: receiving first indication information of the first terminal, where the first indication information indicates whether the first terminal is capable of executing the first AI task.

In some embodiments the method further includes: sending the first indication information to the AI apparatus.

In some embodiments the method further includes: receiving first configuration information from the AI apparatus, where the first configuration information is configuration information corresponding to the first AI task; and sending the first configuration information to the first terminal.

Some embodiments provide a communication method. The method includes: sending first information to a first network device, where the first information indicates information about a terminal capable of executing a first AI task.

In some embodiments the method further includes: receiving first indication information from the first network device, where the first indication information indicates whether a first terminal is capable of executing the first AI task.

In some embodiments the method further includes: sending first configuration information to the first network device, where the first configuration information is configuration information corresponding to the first AI task.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the first terminal in the foregoing methods. The chip system includes a chip, or includes a chip and another discrete component.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the AI apparatus in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a communication system. The system includes the apparatus according to the embodiments.

Some embodiments provide a communication method. The method includes: receiving first information from a first network device, where the first information indicates a condition that is met by a terminal corresponding to each of at least one AI split mode, and the at least one AI split mode includes at least one of the following modes: a mode in which a network device performs AI functions, a mode in which the terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions; and determining a split mode of a first AI task based on the first information.

In some embodiments, the first network device, a first terminal, and the AI apparatus executes the first AI task based on the determined AI split mode, to better collect AI data, training data, inference data, or the like.

In some embodiments the determining a split mode of a first AI task based on the first information includes: determining the split mode of the first AI task based on the first information and information about a first terminal. According to the foregoing method, the split mode of the first AI task is determined depending on whether the information about the first terminal meets the condition that is met by the terminal corresponding to the AI split mode. For example, if the information about the first terminal meets a condition that is met by a terminal corresponding to a split mode, the split mode of the first AI task is the split mode.

In some embodiments the information about the first terminal includes at least one of the following information: information about an AI split mode supported by the first terminal, information about a computing capability level of the first terminal, electric-quantity information of the first terminal, type information of the first terminal, information about a memory size of the first terminal, and authorization condition information of the first terminal. According to the foregoing method, the split mode of the first AI task is determined based on information in a plurality of forms and about the first terminal. This increases diversity and flexibility of determining the split mode of the first AI task.

In some embodiments the first information includes information about the terminal corresponding to each AI split mode, and the information about the terminal corresponding to each AI split mode indicates at least one of the following information: information about a computing capability level of the terminal corresponding to the AI split mode, electric-quantity information of the terminal corresponding to the AI split mode, type information of the terminal corresponding to the AI split mode, information about a memory size of the terminal corresponding to the AI split mode, and authorization condition information of the terminal corresponding to the AI split mode. According to the foregoing method, the split mode of the first AI task is determined based on the first information in a plurality of forms. This increases the diversity and flexibility of determining the split mode of the first AI task.

In some embodiments the method further includes: sending second information to the first network device, where the second information indicates the split mode of the first AI task. According to the foregoing method, the split mode of the first AI task is indicated to the first network device by using the second information.

In some embodiments the method further includes: receiving, from the first network device, information about an AI split mode supported by the AI apparatus. According to the foregoing method, the split mode of the first AI task is determined from the AI split mode supported by the AI apparatus and indicated in the information about the AI split mode supported by the AI apparatus.

In some embodiments the method further includes: receiving first configuration information from the first network device, where the first configuration information is configuration information for the first AI task. According to the foregoing method, the first AI task is executed based on the first configuration information.

In some embodiments the first configuration information indicates at least one of the following information: an identifier of the first AI task, a data reporting manner of the first AI task, information about AI data that needs to be collected by a terminal that is to execute the first AI task, and information about an AI model used by the terminal that is to execute the first AI task. According to the foregoing method, the first configuration information is configured to have a plurality of forms. This increases diversity of the configuration information corresponding to the first AI task.

In some embodiments, a communication method is provided. The method includes: receiving first information from an AI apparatus, where the first information indicates a condition that is met by a terminal corresponding to each of at least one AI split mode, and the at least one AI split mode includes at least one of the following modes: a mode in which a network device performs AI functions, a mode in which the terminal performs the AI functions, a mode in which the AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions.

In some embodiments the method further includes: sending the first information to a first terminal.

In some embodiments the method further includes: receiving second information from the first terminal, where the second information indicates a split mode of a first AI task.

In some embodiments the method further includes: sending the second information to the AI apparatus.

In some embodiments the method further includes: receiving, from the AI apparatus, information about an AI split mode supported by the AI apparatus; and sending, to the terminal, the information about the AI split mode supported by the AI apparatus.

In some embodiments the method further includes: receiving first configuration information from the AI apparatus, where the first configuration information is configuration information corresponding to the split mode of the first AI task.

Some embodiments provide a communication method. The method includes: sending first information to a first network device, where the first information indicates a condition that is met by a terminal corresponding to each of at least one AI split mode, and the at least one AI split mode includes at least one of the following modes: a mode in which a network device performs AI functions, a mode in which the terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions.

In some embodiments the method further includes: sending, to the first network device, information about an AI split mode supported by the AI apparatus.

In some embodiments the method further includes: receiving second information from the first network device, where the second information indicates a split mode of a first AI task.

In some embodiments the method further includes: sending first configuration information to the first network device, where the first configuration information is configuration information corresponding to the split mode of the first AI task.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first network device, an apparatus in the first network device, or an apparatus that is used in coordination with the first network device. In a design, the communication apparatus includes that modules are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-toone correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the first terminal in the foregoing methods. The chip system includes a chip, or includes a chip and another discrete component.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the AI apparatus in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a communication system. The system includes the apparatus according to the embodiments.

Some embodiments provide a communication method. The method includes: receiving information about a first terminal from a first network device, where the information about the first terminal indicates at least one of the following information: an AI split mode supported by the first terminal, information about a computing capability level of the first terminal, electric-quantity information of the first terminal, a type of the first terminal, information about a memory size of the first terminal, and authorization condition information of the first terminal, where the AI split mode includes at least one of the following modes: a mode in which a network device performs AI functions, a mode in which a terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions; and determining a split mode of a first AI task based on the information about the first terminal.

In some embodiments, the first network device, the first terminal, and the AI apparatus executes the first AI task based on the determined AI split mode, to better collect AI data, training data, inference data, or the like.

In some embodiments the determining a split mode of a first AI task based on the information about the first terminal includes: determining the split mode of the first AI task based on the information about the first terminal and first information, where the first information indicates a condition that is met by a terminal corresponding to each of the AI split modes. According to the foregoing method, the split mode of the first AI task is determined depending on whether the information about the first terminal meets the condition that is met by the terminal corresponding to the AI split mode. For example, if the information about the first terminal meets a condition that is met by a terminal corresponding to a split mode, the split mode of the first AI task is the split mode.

In some embodiments the first information includes information about the terminal corresponding to each AI split mode, and the information about the terminal corresponding to each AI split mode includes at least one of the following information: information about a computing capability level of the terminal corresponding to the AI split mode, electric-quantity information of the terminal corresponding to the AI split mode, type information of the terminal corresponding to the AI split mode, information about a memory size of the terminal corresponding to the AI split mode, and authorization condition information of the terminal corresponding to the AI split mode. According to the foregoing method, the split mode of the first AI task is determined based on the first information in a plurality of forms. This increases diversity and flexibility of determining the split mode of the first AI task.

In some embodiments the method further includes: sending second information to the first network device, where the second information indicates the split mode of the first AI task. According to the foregoing method, the split mode of the first AI task is indicated to the first network device by using the second information.

In some embodiments the method further includes: sending first configuration information to the first network device, where the first configuration information is configuration information corresponding to the split mode of the first AI task. According to the foregoing method, the first configuration information is sent to the first network device, so that the first network device sends the first configuration information to the first terminal, and the first terminal executes the first AI task based on the first configuration information.

In some embodiments the first configuration information indicates at least one of the following information: an identifier of the first AI task, a data reporting manner of the first AI task, information about AI data that needs to be collected by a terminal that is to execute the first AI task, or information about an AI model used by the terminal that is to execute the first AI task. According to the foregoing method, the first configuration information is configured to have a plurality of forms. This increases diversity of the configuration information corresponding to the first AI task.

Some embodiments provide a communication method. The method includes: receiving information from a first terminal, where the information about the first terminal indicates at least one of the following information: information about an AI split mode supported by the first terminal, information about a computing capability level of the first terminal, electric-quantity information of the first terminal, type information of the first terminal, information about a memory size of the first terminal, and authorization condition information of the first terminal, where the AI split mode includes at least one of the following modes: a mode in which a network device performs AI functions, a mode in which a terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions; and sending the information about the first terminal to the AI apparatus.

In some embodiments the method further includes: receiving second information from the AI apparatus, where the second information indicates a split mode of a first AI task; and sending the second information to the first terminal. According to the foregoing method, the split mode of the first AI task is determined based on the second information. In addition, the split mode of the first AI task is indicated to the first terminal by using the second information.

In some embodiments the method further includes: receiving first configuration information from the AI apparatus, where the first configuration information is configuration information corresponding to the split mode of the first AI task.

Some embodiments provide a communication method. The method includes: sending information about a first terminal to a first network device, where the information about the first terminal indicates at least one of the following information: an artificial intelligence AI split mode supported by the first terminal, information about a computing capability level of the first terminal, electric-quantity information of the first terminal, a type of the first terminal, information about a memory size of the first terminal, and authorization condition information of the first terminal, where the AI split mode includes at least one of the following modes: a mode in which a network device performs AI functions, a mode in which a terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions.

In some embodiments the method further includes: receiving second information from the first network device, where the second information indicates a split mode of a first AI task.

In some embodiments the method further includes: receiving first configuration information from the first network device, where the first configuration information is configuration information corresponding to the split mode of the first AI task.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the AI apparatus in the foregoing methods. The chip system includes a chip, or includes a chip and another discrete component.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the first terminal in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a communication system. The system includes the apparatus according to the embodiments.

Some embodiments provide a communication method. The method includes: receiving first information from an AI apparatus, where the first information indicates a condition that is met by a terminal corresponding to each of at least one AI split mode, and the at least one AI split mode includes at least one of the following modes: a mode in which a network device performs AI functions, a mode in which the terminal performs the AI functions, a mode in which the AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions; receiving information from a first terminal; and determining a split mode of a first AI task based on the first information and the information about the first terminal.

In some embodiments, the first network device, the first terminal, and the AI apparatus executes the first AI task based on the determined AI split mode, to better collect AI data, training data, inference data, or the like.

In some embodiments the first information includes information about the terminal corresponding to each AI split mode, and the information about the terminal corresponding to each AI split mode indicates at least one of the following information: information about a computing capability level of the terminal corresponding to the AI split mode, electric-quantity information of the terminal corresponding to the AI split mode, type information of the terminal corresponding to the AI split mode, information about a memory size of the terminal corresponding to the AI split mode, or authorization condition information of the terminal corresponding to the AI split mode. According to the foregoing method, the split mode of the first AI task is determined based on the first information in a plurality of forms. This increases diversity and flexibility of determining the split mode of the first AI task.

In some embodiments the information about the first terminal indicates at least one of the following information: information about an AI split mode supported by the first terminal, information about a computing capability level of the first terminal, electric-quantity information of the first terminal, type information of the first terminal, information about a memory size of the first terminal, and authorization condition information of the first terminal. According to the foregoing method, the split mode of the first AI task is determined based on information in a plurality of forms and about the first terminal. This increases the diversity and flexibility of determining the split mode of the first AI task.

In some embodiments the method further includes: sending second information to the AI apparatus and the first terminal, where the second information indicates the split mode of the first AI task. According to the foregoing method, the split mode of the first AI task is indicated to the AI apparatus and the first terminal by using the second information.

In some embodiments the method further includes: receiving, from the AI apparatus, information about an AI split mode supported by the AI apparatus. According to the foregoing method, the split mode of the first AI task is determined from the AI split mode supported by the AI apparatus and indicated in the information about the AI split mode supported by the AI apparatus.

In some embodiments the method further includes: receiving first configuration information from the AI apparatus, where the first configuration information is configuration information corresponding to the split mode of the first AI task. According to the foregoing method, the first configuration information from the AI apparatus is received, so that the first network device sends the first configuration information to the first terminal, and the first terminal executes the first AI task based on the first configuration information.

In some embodiments the first configuration information indicates at least one of the following information: an identifier of the first AI task, a reporting manner of the first AI task, information about AI data that needs to be collected by a terminal that is to execute the first AI task, and information about an AI model used by the terminal that is to execute the first AI task. According to the foregoing method, the first configuration information is configured to have a plurality of forms. This increases diversity of the configuration information corresponding to the first AI task.

Some embodiments provide a communication method. The method includes: sending information about a first terminal to a first network device, where the information about the first terminal indicates at least one of the following information: an artificial intelligence AI split mode supported by the first terminal, information about a computing capability level of the first terminal, electric-quantity information of the first terminal, a type of the first terminal, information about a memory size of the first terminal, and authorization condition information of the first terminal, where the AI split mode includes at least one of the following modes: a mode in which a network device performs AI functions, a mode in which a terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions.

In some embodiments the method further includes: receiving second information from the first network device, where the second information indicates a split mode of a first AI task.

In some embodiments the method further includes: receiving first configuration information from the first network device, where the first configuration information is configuration information corresponding to the split mode of the first AI task.

Some embodiments provide a communication method. The method includes: sending first information to a first network device, where the first information indicates a condition that is met by a terminal corresponding to each of at least one AI split mode, and the at least one AI split mode includes at least one of the following modes: a mode in which a network device performs AI functions, a mode in which the terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, and a mode in which the network device, the AI apparatus, and the terminal respectively perform a part of the AI functions.

In some embodiments the method further includes: receiving second information from the first network device, where the second information indicates a split mode of a first AI task.

In some embodiments the method further includes: sending, to the first network device, information about an AI split mode supported by the AI apparatus.

In some embodiments the method further includes: sending first configuration information to the first network device, where the first configuration information is configuration information corresponding to the split mode of the first AI task.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the first terminal in the foregoing methods. The chip system includes a chip, or includes a chip and another discrete component.

Some embodiments provide a chip system. The chip system includes a processor, and further includes a memory, to implement the function of the AI apparatus in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments Some embodiments provide a communication system. The system includes the apparatus according to embodiments.

Some embodiments provide a communication method. The method includes: receiving first priority information from an AI apparatus, where the first priority information indicates a priority of a first AI task; and sending first information to a first terminal, where the first information indicates an RB and/or a channel, the RB and the channel carry data to be collected by the first terminal based on the first AI task, and the first priority information corresponds to the RB and/or the channel.

In some embodiments, the first terminal and/or a first network device appropriately schedules the data collected based on the first AI task, to ensure transmission of data corresponding to a high-priority task.

In some embodiments the first information indicates an identifier of the RB and/or an identifier of the channel. Before the sending first information to a first terminal, the method further includes: determining the RB and/or the channel based on the first priority information. According to the foregoing method, the RB and/or the channel is first determined based on the first priority information and then indicated to the first terminal.

In some embodiments the first information includes the first priority information. According to the foregoing method, the first priority information is sent to the first terminal, so that the first terminal determines the RB and/or the channel based on the first priority information.

In some embodiments the method further includes: receiving first request information from the first terminal, where the first request information requests to set up the RB. According to the foregoing method, the RB is set up based on the first request information.

In some embodiments the first request information includes at least one of the following information: indication information indicating that the first terminal needs to report AI data, type information of the RB, or priority information corresponding to the AI data. According to the foregoing method, the RB is set up based on the first request information in a plurality of forms. This increases diversity and flexibility of setting up the RB by the first network device.

Some embodiments provide a communication method. The method includes: receiving first information from a first network device, where the first information indicates an RB and/or a channel, the RB and the channel carry data to be collected by a first terminal based on a first AI task, first priority information corresponds to the RB and/or the channel, and the first priority information indicates a priority of the first AI task.

In some embodiments the first information indicates an identifier of the RB and/or an identifier of the channel. Alternatively, the first information includes the first priority information. The first priority information indicates the priority of the first AI task. The first priority information corresponds to the RB and/or the channel. According to the foregoing method, the RB and/or the channel is determined based on the identifier of the RB and/or the identifier of the channel, or is determined based on the first priority information.

In some embodiments the method further includes: sending first request information to the first network device, where the first request information requests to set up the RB. According to the foregoing method, when the first network device does not set up the RB, the first network device is requested to set up the RB.

In some embodiments the method further includes: sending the first request information to a second network device, where the first request information is for setting up the RB, the second network device is different from the first network device, and the second network device is a device that has currently established a connection to the first terminal. According to the foregoing method, in a case of movement from coverage of the first network device to coverage of the second network device, the second network device is requested to set up the RB.

In some embodiments the first request information includes at least one of the following information: indication information indicating that the first terminal needs to report AI data, type information of the RB, or priority information corresponding to the AI data. According to the foregoing method, the first network device sets up the RB based on the first request information in a plurality of forms. This increases diversity and flexibility of setting up the RB by the first network device.

Some embodiments provide a communication method. The method includes: sending first priority information to a first network device, where the first priority information indicates a priority of a first AI task, the first priority information corresponds to an RB and/or a channel, and the RB and the channel carry data to be collected by a first terminal based on the first AI task.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the first terminal in the foregoing methods. The chip system includes a chip, or includes a chip and another discrete component.

Some embodiments provide a chip system. The chip system includes a processor, and further includes a memory, to implement the function of the AI apparatus in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a communication system. The system includes the apparatus according to the embodiments.

In some embodiments, any communication apparatus, chip system, computer-readable medium, computer program product, communication system, or the like provided above is configured to perform a corresponding method provided above. Therefore, for beneficial effects that is achieved by the communication apparatus, the chip system, the computer-readable medium, the computer program product, the communication system, or the like, refer to the beneficial effects in the corresponding method. Details are not described herein again.

Some embodiments provide a communication method. The method includes: receiving first configuration information and first area information from an AI apparatus, where the first configuration information is configuration information for a first AI task, and the first area information indicates an area to which the first configuration information is applicable; and sending the first configuration information and the first area information to a first terminal.

In some embodiments, the first configuration information and the first area information is indicated to the first terminal, so that the first terminal executes the AI task based on the first configuration information and the first area information.

In some embodiments the first area information includes an identifier of the area to which the first configuration information is applicable, and the identifier of the area includes at least one of the following identifiers: a cell identifier, a tracking area code, a radio access network area code (radio access network area code, RANAC), an AI area code, or an operator identifier. According to the foregoing method, a plurality of identifiers, for example, the cell identifier, the tracking area code, the RANAC, the AI area code, or the operator identifier, identifies the area to which the first configuration information is applicable.

Some embodiments provide a communication method. The method includes: receiving first configuration information and first area information from a first network device, where the first configuration information is configuration information for a first AI task, and the first area information indicates an area to which the first configuration information is applicable; receiving second configuration information from a second network device, where the second configuration information indicates configuration information for a second AI task, and the second AI task is the same as or different from the first AI task; and executing the second AI task based on the second configuration information.

In some embodiments, the first configuration information and the first area information that are from the first network device is received, the second configuration information from the second network device is received, and the second AI task is executed based on the second configuration information. In this way, the first terminal flexibly processes the first AI task corresponding to the first configuration information and the second AI task corresponding to the second configuration information.

In some embodiments the first area information includes an identifier of the area to which the first configuration information is applicable, and the identifier of the area includes at least one of the following identifiers: a cell identifier, a tracking area code, a RANAC, an AI area code, or an operator identifier. According to the foregoing method, a plurality of identifiers, for example, the cell identifier, the tracking area code, the RANAC, the AI area code, or the operator identifier, identifies the area to which the first configuration information is applicable.

In some embodiments the method further includes: receiving first indication information from the second network device, where the first indication information indicates a processing manner of the first AI task corresponding to the first configuration information, and the processing manner includes suspending execution of the first AI task, releasing the first AI task, or continuing execution of the first AI task; and executing, based on the first indication information, the first AI task corresponding to the first configuration information. According to the foregoing method, the first AI task corresponding to the first configuration information is executed based on the first indication information. In this way, there are appropriate processing methods for both the first AI task corresponding to the first configuration information and the second AI task corresponding to the second configuration information.

In some embodiments an area to which the second configuration information is applicable is smaller than the area to which the first configuration information is applicable. According to the foregoing method, after indicating the first configuration information, an AI apparatus further indicates the second configuration information, where the area to which the second configuration information is applicable is smaller than the area to which the first configuration information is applicable.

Some embodiments provide a communication method. The method includes: sending first configuration information and first area information to a first network device, where the first configuration information is configuration information for a first AI task, and the first area information indicates an area to which the first configuration information is applicable; and sending second configuration information to a second network device, where the second configuration information indicates configuration information for a second AI task, and the second AI task is the same as or different from the first AI task.

In some embodiments, first configuration information and the first area information is sent to the first network device, and the second configuration information is sent to the second network device, so that the first network device sends the first configuration information and the first area information to a first terminal, and the second network device sends the second configuration information to the first terminal.

In some embodiments the first area information includes an identifier of the area to which the first configuration information is applicable, and the identifier of the area includes at least one of the following identifiers: a cell identifier, a tracking area code, a RANAC, an AI area code, or an operator identifier. According to the foregoing method, a plurality of identifiers, for example, the cell identifier, the tracking area code, the RANAC, the AI area code, or the operator identifier, identifies the area to which the first configuration information is applicable.

In some embodiments the method further includes: sending first indication information to the second network device, where the first indication information indicates a processing manner of the first AI task corresponding to the first configuration information, and the processing manner includes suspending execution of the first AI task, releasing the first AI task, or continuing execution of the first AI task. According to the foregoing method, the first indication information is sent to the second network device, so that the second network device sends the first indication information to the first terminal, and the first terminal executes, based on the first indication information, the first AI task corresponding to the first configuration information.

In some embodiments an area to which the second configuration information is applicable is smaller than the area to which the first configuration information is applicable. According to the foregoing method, after indicating the first configuration information, an AI apparatus further indicates the second configuration information, where the area to which the second configuration information is applicable is smaller than the area to which the first configuration information is applicable.

Some embodiments provide a communication method. The method includes: receiving second configuration information from an AI apparatus, where the second configuration information indicates configuration information for a second AI task, first configuration information indicates configuration information for a first AI task, and the first AI task is the same as or different from the second AI task; and sending the second configuration information to a first terminal.

In some embodiments, the second configuration information is indicated to the first terminal, so that the first terminal executes the AI task based on the second configuration information.

In some embodiments the method further includes: receiving first indication information from the AI apparatus, where the first indication information indicates a processing manner of the first AI task corresponding to the first configuration information, and the processing manner includes suspending execution of the first AI task, releasing the first AI task, or continuing execution of the first AI task. According to the foregoing method, the first indication information is sent to the first terminal, so that the first terminal executes, based on the first indication information, the first AI task corresponding to the first configuration information.

Some embodiments provide a communication apparatus. The communication apparatus is a first network device, an apparatus in the first network device, or an apparatus that is used in coordination with the first network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a first terminal, an apparatus in the first terminal, or an apparatus that is used in coordination with the first terminal. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is an AI apparatus, an apparatus in the AI apparatus, or an apparatus that is used in coordination with the AI apparatus. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus is a second network device, an apparatus in the second network device, or an apparatus that is used in coordination with the second network device. In a design, the communication apparatus includes modules that are in a one-to-one correspondence with the methods/operations/steps/actions described in the embodiments. The modules are hardware circuits or software, or is implemented by a combination of the hardware circuits and the software.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, or another type of communication interface. The another device is a first terminal or an AI apparatus.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a communication apparatus. The communication apparatus includes a processor, configured to implement the method described in the embodiments. The communication apparatus further includes a memory, configured to store instructions and data. The memory is coupled to the processor. When the processor executes the instructions stored in the memory, the method described in the embodiments are implemented. The communication apparatus further includes a communication interface. The communication interface is used by the communication apparatus to communicate with another device. For example, the communication interface is a transceiver, a circuit, a bus, a module, a pin, or another type of communication interface.

Some embodiments provide a chip system. The chip system includes a processor, and further includes a memory, to implement the function of the first network device in the foregoing methods. The chip system includes a chip, or includes a chip and another discrete component.

Some embodiments provide a chip system. The chip system includes a processor, and further includes a memory, to implement the function of the first terminal in the foregoing methods. The chip system includes a chip, or includes a chip and another discrete component.

Some embodiments provide a chip system. The chip system includes a processor, and further includes a memory, to implement the function of the AI apparatus in the foregoing methods. The chip system includes a chip, or includes a chip and another discrete component.

Some embodiments provide a chip system. The chip system includes a processor, and further includes a memory, to implement the function of the second network device in the foregoing methods. The chip system includes a chip, or includes a chip and another discrete component.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer-readable storage medium, including instructions. When the instructions are run on a computer, the computer is enabled to perform the method according to the embodiments.

Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments Some embodiments provide a computer program product. The computer program product includes computer program code. When the computer program code is run on a computer, the computer is enabled to perform the method according to any one of the embodiments.

Some embodiments provide a computer program product. The computer program product includes computer program code. When the computer program code is run on a computer, the computer is enabled to perform the method according to any one of the embodiments.

Some embodiments provide a communication system. The system includes the apparatus according to the embodiments.

DESCRIPTION OF EMBODIMENTS

The following describes implementations of embodiments in detail with reference to the accompanying drawings.

A method provided in some embodiments are applied to various communication systems. For example, the communication system is a long term evolution (long term evolution, LTE) system, a 5th generation (5th generation, 5G) communication system, a wireless fidelity (wireless fidelity, Wi-Fi) system, a 3rd generation partnership project (3rd generation partnership project, 3GPP)-related communication system, a future evolved communication system, or a system integrating a plurality of systems. This is not limited. 5G further is referred to as new radio (new radio, NR). The following uses a communication system 10 shown in FIG. 1 as an example to describe the method provided in some embodiments.

Figure 1:
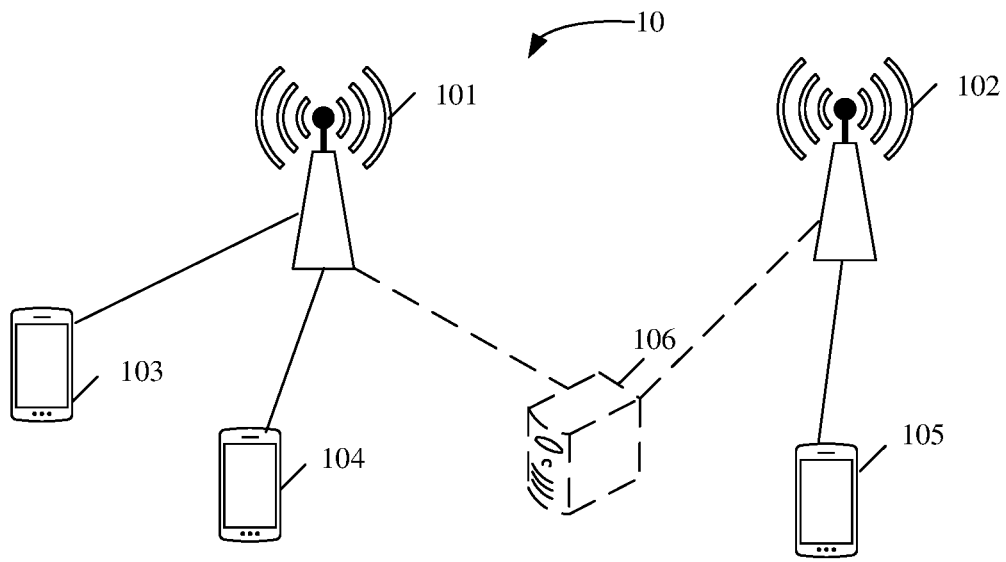
FIG. 1 is a schematic diagram of an architecture of a communication system according to some embodiments.

FIG. 1 is a schematic diagram of an architecture of the communication system 10 according to some embodiments. In FIG. 1, the communication system 10 includes a network device 101, a network device 102, a terminal 103 and a terminal 104 that communicates with the network device 101, and a terminal 105 that communicates with the network device 102. Optionally, the communication system 10 further includes an artificial intelligence (artificial intelligence, AI) apparatus 106 that communicates with the network device 101 and/or the network device 102. FIG. 1 is a schematic diagram, and does not constitute a limitation on a scenario to which technical solutions provided in some embodiments are applicable.

In FIG. 1, the network device provides a wireless access service for the terminal. Each network device corresponds to one service coverage area. A terminal that enters the area communicates with the network device through a Uu interface, to receive the wireless access service provided by the network device. Optionally, the service coverage area includes one or more cells. The terminal and the network device communicates with each other through a Uu link. Uu links are classified into an uplink (uplink, UL) and a downlink (downlink, DL) based on directions of data transmitted on the Uu links. Uplink data sent by the terminal to the network device is transmitted on the UL, and downlink data transmitted by the network device to the terminal is transmitted on the DL. For example, in FIG. 1, the terminal 103 is located in a coverage area of the network device 101. The network device 101 sends downlink data to the terminal 103 through a DL, and the terminal 103 sends uplink data to the network device 101 through a UL.

A network device in some embodiments, for example, the network device 101 or the network device 102, is a device that is deployed in a radio access network and that performs wireless communication with a terminal. There is a plurality of forms of base stations, such as a macro base station, a micro base station, a relay station, and an access point. For example, the base station in some embodiments are a base station in 5G or a base station in LTE. The base station in 5G further is referred to as a transmission reception point (transmission reception point, TRP) or a gNB. The network device alternatively is a radio controller in a cloud radio access network (cloud radio access network, CRAN) scenario. The network device alternatively is a central unit (central unit, CU) and/or a distributed unit (distributed unit, DU). The network device alternatively is a control plane (control plane, CP) part of a CU and/or a user plane (user plane, UP) part of the CU. The network device alternatively is a server, a wearable device, a machine communication device, a vehicle-mounted device, or the like. In some embodiments, an apparatus configured to implement functions of the network device is a network device, or is an apparatus, for example, a chip system, that supports the network device in implementing the functions. The apparatus is mounted in the network device, or is used in coordination with the network device. The following provides descriptions by using an example in which the network device is a base station. The base station communicates with the terminal, or communicates with the terminal through a relay station. The terminal communicates with a plurality of base stations using different technologies. For example, the terminal communicates with a base station supporting an LTE network, communicate with a base station supporting a 5G network, or supports dual connectivity to the base station supporting the LTE network and the base station supporting the 5G network. The relay station is a network device, or is a terminal. This is not limited.

The terminal in some embodiments, for example, the terminal 103, the terminal 104, or the terminal 105, is a device having a wireless transceiver function. The terminal is deployed on land, including an indoor device, an outdoor device, a handheld device, or a vehicle-mounted device; is deployed on water (for example, on a ship); or is deployed in the air (for example, on a plane, a balloon, or a satellite). The terminal further is referred to as a terminal device, and the terminal device is user equipment (user equipment, UE). The UE includes a handheld device, a vehicle-mounted device, a wearable device, or a computing device that has a wireless communication function. For example, the UE is a mobile phone (mobile phone), a tablet computer, or a computer having a wireless transceiver function. Alternatively, the terminal device is a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In some embodiments, an apparatus configured to implement functions of the terminal is a terminal, or is an apparatus, for example, a chip system, that supports the terminal in implementing the functions. The apparatus is mounted in the terminal or used in coordination with the terminal. In some embodiments, the chip system includes a chip, or includes a chip and another discrete component. In the technical solutions provided in some embodiments, the technical solutions provided in some embodiments are described by using an example in which the apparatus configured to implement the functions of the terminal is a terminal and the terminal is UE.

By way of example and not limitation, the terminal in some embodiments are a wearable device. The wearable device further is referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on the body or integrated into clothes or an accessory of a user. For example, the wearable device is not a hardware device but further a device implementing powerful functions through software support, data exchange, and cloud interaction. In a broad sense, wearable intelligent devices include full-featured and large-size devices that implements or some functions without depending on smartphones, such as smart watches or smart glasses, and include devices that focus on one type of application functions and work with other devices such as smartphones, such as various smart bands or smart jewelry for monitoring physical signs.

To implement an efficient mobile communication network, an AI technology is introduced into the mobile communication network. The AI technology aims to enable a machine to learn and accumulate experience, so that the machine resolves problems, such as natural language understanding, image recognition, and/or chess playing, that is resolved by humans through experience. AI technologies include machine learning. The machine learning is considered as a method that enables a machine to learn, so that the machine completes a function that is unable to be completed through direct programming only. In the machine learning, the machine may train or learn training data to obtain an AI model. The AI model is for predicting a test sample to obtain a prediction result. The AI model is referred to as a model for short, a machine learning (machine learning, ML) model, an AI/ML model, an AI network, or another name. This is not limited. Performing prediction by using a model further is referred to as performing inference by using a model.

To introduce an AI technology into a mobile communication network, an AI apparatus is introduced into the network. The AI apparatus is configured to implement an AI function, for example, configured to implement model training and/or inference. A name of the AI apparatus is not limited in some embodiments. For example, the AI apparatus is referred to as a wireless intelligent apparatus or an (intelligent) controller. The AI apparatus releases an AI task to an object of the task. The AI task is a data collection task, to be specific, the AI apparatus indicates the object of the task to collect data. The object of the task obtains the data and feed back the AI data to the AI apparatus. The data is referred to as the AI data corresponding to the AI task, and a manner in which the object of the task obtains the AI data is measuring or reading information about the object or another manner. This is not limited. The AI apparatus performs model training on the AI data by using a machine learning algorithm, to obtain a corresponding AI model. Subsequently, the AI apparatus implements or assist in implementing a network function, for example, network planning, network configuration, or resource scheduling, based on the AI model, to implement network intelligence. In some embodiments, the AI task further is referred to as an AI configuration or the like, and further is referred to as a task, a configuration, a setting, or the like for short; and is for indicating the object of the task to perform data collection (feedback), releasing an inference result to the object of the task, indicating the object of the task to perform model training (for example, perform federated training), or releasing the AI model to the object of the task, or is for another purpose. A name of the AI task is not limited. An operation or a type of a task is: data collection, model release (or model release), model training, inference result release, and the like. An object of the task is a network device or a terminal, and objects of different tasks are the same or different. The object of the task further is referred to as an execution body of the task. The AI data further is referred to as AI information, data, measurement data, or the like, and includes an inference result, data for inference, data for AI model training, and/or the like. A name of the AI data is not limited.

As described above, the AI apparatus releases a task to the terminal. The task released to the terminal is directly sent to the terminal, or is sent to the terminal through the network device. This is not limited. When releasing an AI task to the terminal, the AI apparatus fails to determine which terminals are suitable for executing the AI task. Therefore, the AI apparatus is unable to determine terminals to which the AI task is to be released. To resolve this technical problem, Some embodiments provide a corresponding method and apparatus.

In some embodiments, an AI apparatus is integrated into the network device and/or the terminal in FIG. 1. For example, an AI apparatus is integrated into each of the network device 101 and the network device 102. The AI apparatus performs one or more AI functions. As described above, the AI apparatus performs a training function, an inference function, and/or the like. The training function further is referred to as a learning function. The AI apparatus learns, with the training function, to execute a task. For example, the AI apparatus learns, with the training function, to identify a type of service data. The AI apparatus predicts, with the inference function, a result of an event. For example, the AI apparatus predicts, with the inference function, a service data amount in a future time period. The AI apparatus obtains, through learning, a model that implements or assist in implementing a corresponding network function, and the model is for inference. There is a corresponding model for an application or a network function, for example, radio access technology (radio access technology, RAT) selection, load balancing, network energy saving, coverage optimization, traffic control, scheduling, channel coding, mobility management, traffic prediction, or modulation. An inference result of the model is for implementing or assisting in implementing the network function. The AI apparatus trains the model and/or perform inference by using the model. Different applications or network functions corresponds to a same model or different models. This is not limited. In some embodiments, the AI function, for example, the training function or the inference function, alternatively is named in another manner. This is not limited.

In an example of a possible implementation, an AI apparatus is integrated into a network device, no AI apparatus is integrated into a terminal, and the network device performs AI functions, for example, performs a training function and an inference function. Alternatively, an AI apparatus is integrated into a terminal, no AI apparatus is integrated into a network device, and the terminal performs AI functions, for example, performs a training function and an inference function. Alternatively, an AI apparatus is integrated into each of a network device and a terminal; and the network device and the terminal respectively performs a part of AI functions, the network device performs the AI functions, or the terminal device performs the AI functions. For example, the network device and the terminal respectively perform the part of AI functions. The network device performs the training function, and the terminal performs the inference function; and vice versa. In some embodiments, quantities of AI functions performed by the network device and the terminal is the same or different. For example, AI functions include a training function 1, a training function 2, and an inference function. The network device performs the training function 1, and the terminal performs the training function 2 and the inference function. Alternatively, the network device performs the training function 1 and the inference function, and the terminal performs the training function 2.

AI functions performed by the network device and the terminal is the same or different for different applications or network functions. For example, an AI apparatus is integrated into each of the network device and the terminal. For a network optimization function or application, the network device performs AI functions. For a traffic control function or application, the network device performs a training function, and the terminal performs an inference function.

In some embodiments, the AI apparatus is independently deployed in a communication system. For example, the AI apparatus is the AI apparatus 106 in FIG. 1. The AI apparatus performs all or a part of AI functions. When the AI apparatus performs the part of AI functions, an AI function that is not performed by the AI apparatus is performed by the network device and/or the terminal. In some embodiments, quantities of AI functions performed by the network device, the terminal, and the AI apparatus is the same or different.

For example, AI functions include a training function 1, a training function 2, an inference function 1, and an inference function 2. The AI apparatus performs the training function 1, the training function 2, the inference function 1, and the inference function 2. Alternatively, the AI apparatus performs the training function 1 and the inference function 1, and the network device performs the training function 2 and the inference function 2. Alternatively, the AI apparatus performs the training function 1 and the training function 2, and the terminal performs the inference function 1 and the inference function 2. Alternatively, the AI apparatus performs the training function 1, the network device performs the training function 2 and the inference function 1, and the terminal performs the inference function 2.

The communication system 10 shown in FIG. 1 is used as an example, but is not intended to limit the technical solutions in some embodiments. A person skilled in the art is able to understand that in an implementation process, the communication system 10 further includes another device, and a quantity of network devices and a quantity of terminals alternatively is determined based on a condition. This is not limited.

Optionally, each network element in FIG. 1 in some embodiments, for example, the network device 101, the network device 102, the terminal 103, the terminal 104, the terminal 105, or the AI apparatus 106, is an apparatus or a functional module in the apparatus. In some embodiments, the functional module is an element in a hardware device, for example, a circuit, a communication chip, or a communication component in a terminal, a network device, or an AI apparatus, or is a software functional module running on hardware or a virtualized function instantiated on a platform (for example, a cloud platform).

Figure 2:
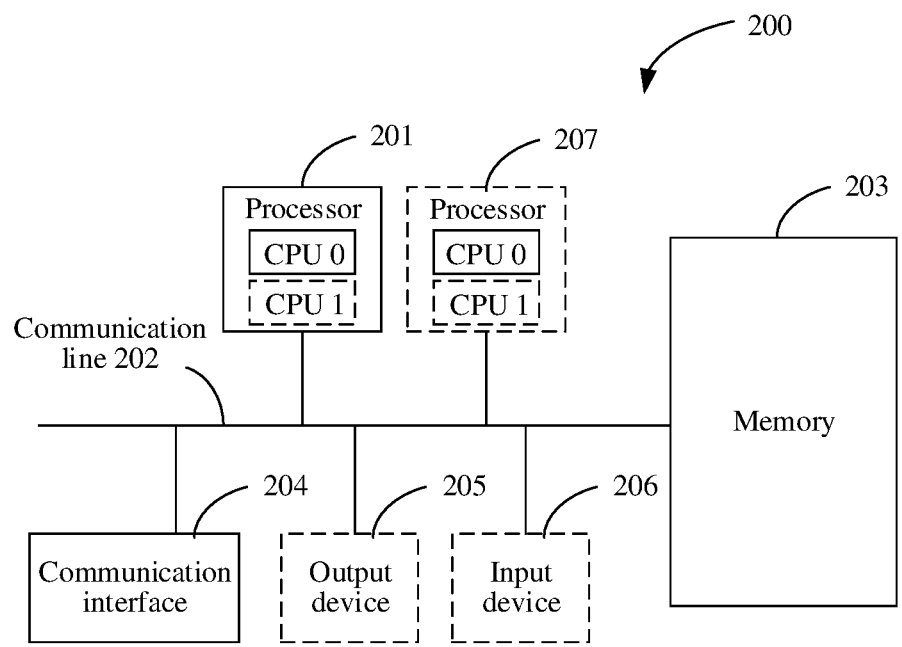
FIG. 2 is a schematic diagram of a hardware structure of a communication apparatus according to some embodiments.

For example, each network element in FIG. 1 is implemented by a communication apparatus 200 in FIG. 2. FIG. 2 is a schematic diagram of a hardware structure of a communication apparatus applicable to some embodiments. The communication apparatus 200 includes at least one processor 201 and at least one communication interface 204, and is configured to implement the method provided in some embodiments. The communication apparatus 200 further includes a communication line 202 and a memory 203.

The processor 201 is a general-purpose central processing unit (central processing unit, CPU), a microprocessor, an application-specific integrated circuit (application-specific integrated circuit, ASIC), or one or more integrated circuits configured to control execution of programs in the solutions in some embodiments.

The communication line 202 includes a path, for example, a bus, for transmitting information between the foregoing components.

The communication interface 204 is configured to communicate with another device or a communication network. The communication interface 204 is any transceiver-type apparatus, for example, an Ethernet interface, a radio access network (radio access network, RAN) interface, a wireless local area network (wireless local area network, WLAN) interface, a transceiver, a pin, a bus, or a transceiver circuit.

The memory 203 is a read-only memory (read-only memory, ROM) or another type of static storage device that stores static information and instructions, a random access memory (random access memory, RAM) or another type of dynamic storage device that stores information and instructions, an electrically erasable programmable read-only memory (electrically erasable programmable read-only memory, EEPROM), a compact disc read-only memory (compact disc read-only memory, CD-ROM) or other compact disc storage, optical disc storage (including a compact disc, a laser disc, an optical disc, a digital versatile disc, a Blu-ray disc, or the like), a magnetic disk storage medium or another magnetic storage device, or any other medium that is configured to carry or store expected program code in a form of an instruction or a data structure and that is accessible to a computer, but is not limited thereto. The memory exists independently, and is coupled to the processor 201 through the communication line 202. Alternatively, the memory 203 is integrated with the processor 201. The memory provided in some embodiments are usually nonvolatile. The memory 203 is configured to store computer-executable instructions for executing the solutions provided in some embodiments, and the processor 201 controls the execution. The processor 201 is configured to execute the computer-executable instructions stored in the memory 203, to implement the method provided in some embodiments.

The computer-executable instructions in some embodiments further is referred to as application program code. This is not limited in some embodiments.

Coupling in some embodiments are indirect coupling or a communication connection between apparatuses, units, or modules in an electrical form, a mechanical form, or another form, and is for information exchange between the apparatuses, the units, or the modules.

In an embodiment, the processor 201 includes one or more CPUs, for example, a CPU 0 and a CPU 1 in FIG. 2.

In an embodiment, the communication apparatus 200 includes a plurality of processors, for example, the processor 201 and a processor 207 in FIG. 2. Each of the processors are a single-core (single-CPU) processor or a multi-core (multi-CPU) processor. The processor herein is one or more devices, circuits, and/or processing cores configured to process data (for example, computer program instructions).

In an embodiment, the communication apparatus 200 further includes an output device 205 and/or an input device 206. The output device 205 is coupled to the processor 201, and displays information in a plurality of manners. For example, the output device 205 is a liquid crystal display (liquid crystal display, LCD), a light emitting diode (light emitting diode, LED) display device, a cathode ray tube (cathode ray tube, CRT) display device, or a projector (projector). The input device 206 is coupled to the processor 201, and receives an input from a user in a plurality of manners. For example, the input device 206 is a mouse, a keyboard, a touchscreen device, or a sensor device.

The communication apparatus 200 is a general-purpose device or a special-purpose device. During implementation, the communication apparatus 200 is a desktop computer, a portable computer, a network server, a personal digital assistant (personal digital assistant, PDA), a mobile phone, a tablet computer, a wireless terminal device, an embedded device, a wearable device, or a device having a structure similar to that in FIG. 2. A type of the communication apparatus 200 is not limited.

The following describes the communication method in some embodiments with reference to FIG. 1 and FIG. 2.

The communication method provided in some embodiments are applied to wireless communication between communication devices. The wireless communication between the communication devices includes wireless communication between a network device and a terminal, wireless communication between network devices, wireless communication between terminals, wireless communication between a network device and an AI apparatus, and wireless communication between a terminal and an AI apparatus. In some embodiments, the term "wireless communication" further is referred to as "communication" for short, and the term "communication" further is described as "data transmission", "signal transmission", "information transmission", or "transmission".

In some embodiments, "/" represents an "or" relationship between associated objects. For example, A/B represents A or B. The term "and/or" indicates that there are three relationships between associated objects. For example, A and/or B represents the following three cases: A exists, both A and B exist, and B exists. A and B is singular or plural. To facilitate description of the technical solutions in some embodiments, in some embodiments, terms such as "first" and "second" is used to distinguish between technical features with a same function or similar functions. The terms such as "first" and "second" do not limit a quantity and an execution sequence, and do not indicate a definite difference. In some embodiments, terms such as "example" or "for example" represent an example, an illustration, or a description. Any embodiment or design scheme described with "example" or "for example" is not to be explained as being more preferred or having more advantages than another embodiment or design scheme. Use of the terms such as "example" or "for example" is intended to present a related concept in a manner for ease of understanding.

In some embodiments, for a technical feature, "first", "second", "third", "A", "B", "C", "D", and the like are for distinguishing between technical features in the technical feature. There is no chronological order or no size order between the technical features described by "first", "second", "third", "A", "B", "C", and "D".

Names of messages between network elements or names of parameters in the messages in the following some embodiments are examples, and alternatively is other names during implementation. This is not limited in some embodiments.

Same steps or steps or technical features having a same function in some embodiments are mutually referenced in different embodiments.

In some embodiments, the network device, the terminal, and/or the AI apparatus performs a part or all of steps in some embodiments. The steps are examples. In some embodiments, other steps or variants of various steps alternatively is performed. In addition, the steps are performed in a sequence different from a sequence presented in some embodiments, and not the steps in some embodiments are called to be performed.

In some embodiments, a structure of an execution body of the communication method is not particularly limited in some embodiments, provided that the method provided in some embodiments are implemented. For example, the communication method provided in some embodiments are performed by a first network device or a component, for example, a chip, used in the first network device. This is not limited. Alternatively, the communication method provided in some embodiments are performed by a second network device or a component, for example, a chip, used in the second network device. This is not limited. Alternatively, the communication method provided in some embodiments are performed by a first terminal or a component, for example, a chip, used in the first terminal. This is not limited. Alternatively, the communication method provided in some embodiments are performed by an AI apparatus or a component, for example, a chip, used in the AI apparatus. This is not limited. The following embodiments are respectively described by using examples in which the communication method is performed by the first network device, the first terminal, the AI apparatus, and the second network device.

Figure 3:
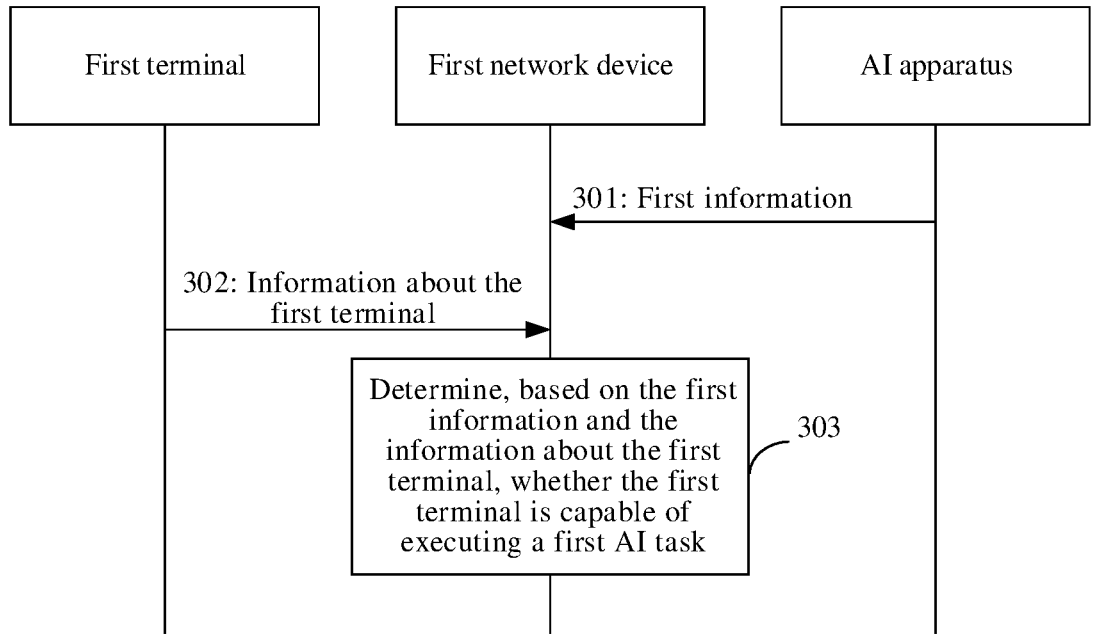
FIG. 3 to FIG. 16 each are a schematic flowchart of a communication method according to some embodiments.

FIG. 3 shows a communication method according to some embodiments. The communication method includes step 301 to step 303.

Step 301: An AI apparatus sends first information to a first network device.

The AI apparatus performs one or more AI functions, for example, a training function and an inference function. For descriptions of the training function and the inference function, refer to the corresponding descriptions in FIG. 1. The training function further is referred to as a model training function.

The AI apparatus is an AI apparatus integrated into the first network device; is an AI apparatus integrated into a first terminal; is an AI apparatus integrated into the first network device and the first terminal; or is an AI apparatus independent of the first network device and the first terminal, for example, the AI apparatus 106 in FIG. 1.

In some embodiments if the AI apparatus is integrated into the first network device, the AI apparatus is replaced with the first network device. If the AI apparatus is integrated into the first terminal, the AI apparatus is replaced with the first terminal. If the AI apparatus is integrated into the first network device and the first terminal, the AI apparatus is replaced with the first network device or the first terminal.

The first network device is the network device 101 or the network device 102 in FIG. 1. The first terminal is any terminal in FIG. 1. For example, if the first network device is the network device 101 in FIG. 1, the first terminal is the terminal 103 or the terminal 104 in FIG. 1; if the first network device is the network device 102 in FIG. 1, the first terminal is the terminal 105 in FIG. 1.

In some embodiments the first information indicates information about a terminal capable of executing a first AI task, or indicates a condition for the terminal capable of executing the first AI task. This further is referred to as: The first information indicates an execution body of the first AI task or an object of the first AI task. The first AI task is any AI task released by the AI apparatus. The first AI task includes an AI task of one or more network functions (or an AI model corresponding to the network function).

For example, the first information indicates at least one of the following information about the terminal capable of executing the first AI task: type information of the terminal, information about a moving speed of the terminal, information about a computing capability level of the terminal, electric-quantity information of the terminal, latency information of the terminal, signal quality threshold information of the terminal, information about a memory size of the terminal, information about a remaining memory size of the terminal, information about an AI task type supported by the terminal, information about a network function supported by the terminal and implementable through AI, and information about an AI algorithm supported by the terminal.

The following describes in detail the various pieces of information indicated in the first information.

(1) Type Information of the Terminal

The type information of the terminal indicates a type of the terminal capable of executing the first AI task. A type of a terminal includes at least one of the following types: a vehicle to everything (vehicle to everything, V2X) terminal, an unmanned aerial vehicle (unmanned aerial vehicle, UAV) terminal, a mobile broadband (mobile broadband, MBB) terminal, an enhanced mobile broadband (enhanced mobile broadband, eMBB) terminal, a massive machine-type communications (massive machine-type communications, mMTC) terminal, an ultra-reliable low-latency communication (ultra-reliable low-latency communication, URLLC) terminal, a narrowband Internet of things (narrowband Internet of things, NB-IoT) terminal, an enhanced machine type communication (enhanced machine type communication, eMTC) terminal, or a reduced capability (reduced capability, REDCAP) terminal. For descriptions of the foregoing types of terminals, refer to explanations and descriptions in a conventional technology. In some embodiments, the foregoing types of terminals are examples of the type of the terminal. During application, the type of the terminal further includes another type of terminal. This is not limited.

In some embodiments the type information of the terminal includes an identifier of the type of the terminal capable of executing the first AI task. For example, the types of the terminals include the V2X terminal, the UAV terminal, and the eMBB terminal, an identifier of the V2X terminal is an ID 1, an identifier of the UAV terminal is an ID 2, and an identifier of the eMBB terminal is an ID 3. If the type information of the terminal includes the ID 1, the terminal capable of executing the first AI task is the V2X terminal. If the type information of the terminal includes the ID 1 and the ID 2, the terminals capable of executing the first AI task are the V2X terminal and the UAV terminal. If the type information of the terminal includes the ID 3, the terminal capable of executing the first AI task is the eMBB terminal.

In some embodiments, the identifier of the type of terminal alternatively is other information, for example, terminal capability information and service type information, for determining the terminal.

(2) Information about the Moving Speed of the Terminal

The information about the moving speed of the terminal indicates the moving speed of the terminal capable of executing the first AI task. Moving speeds of terminals are classified into different levels. For example, the moving speeds of the terminals are classified into a high speed, a medium speed, a low speed, or an ultra-low speed. The high speed indicates that the moving speed of the terminal is greater than or equal to a first threshold. The medium speed indicates that the moving speed of the terminal is less than the first threshold and is greater than or equal to a second threshold. The low speed indicates that the moving speed of the terminal is less than the second threshold and is greater than or equal to a third threshold. The ultra-low speed indicates that the moving speed of the terminal is less than the third threshold. The first threshold is greater than the second threshold, and the second threshold is greater than the third threshold.

In a case, the information about the moving speed of the terminal includes an identifier of a level of the moving speed of the terminal capable of executing the first AI task. For example, the moving speeds of the terminals are classified into the high speed, the medium speed, the low speed, and the ultra-low speed, an identifier of the high speed is G, an identifier of the medium speed is Z, an identifier of the low speed is D, and an identifier of the ultra-low speed is J. If the information about the moving speed of the terminal includes G and Z, the moving speed of the terminal capable of executing the first AI task is the high speed or the medium speed. If the information about the moving speed of the terminal includes D and J, the moving speed of the terminal capable of executing the first AI task is the low speed or the ultra-low speed.

In another case, the information about the moving speed of the terminal includes a threshold of a level of the moving speed of the terminal capable of executing the first AI task. For example, if the information about the moving speed of the terminal includes a first threshold, the moving speed of the terminal capable of executing the first AI task is the high speed. If the information about the moving speed of the terminal includes a second threshold, the moving speed of the terminal capable of executing the first AI task is the medium speed.

(3) Information about the Computing Capability Level of the Terminal

The information about the computing capability level of the terminal indicates the computing capability level of the terminal capable of executing the first AI task. Computing capabilities of terminals are classified into different levels. For example, the computing capabilities of the terminals are classified into a high level, a medium level, or a low level. Terminals of different computing capability levels executes AI tasks with different complexity. For example, a terminal whose computing capability level is the high level executes an AI task with high complexity, a terminal whose computing capability level is the medium level executes an AI task with medium complexity, and a terminal whose computing capability level is the low level executes an AI task with low complexity.

For example, the information about the computing capability level of the terminal indicates at least one of the high level, the medium level, or the low level. Further, the information about the computing capability level of the terminal includes an identifier of the computing capability level of the terminal capable of executing the first AI task. For example, the computing capability levels of the terminals are classified into the high level, the medium level, and the low level, an identifier of the high level is G, an identifier of the medium level is Z, and an identifier of the low level is D. If the information about the computing capability level of the terminal includes G, the capability level of the terminal capable of executing the first AI task is the high level. If the information about the computing capability level of the terminal includes Z, the capability level of the terminal capable of executing the first AI task is the medium level. If the information about the computing capability level of the terminal includes D, the capability level of the terminal capable of executing the first AI task is the low level.

(4) Electric-Quantity Information of the Terminal

The electric-quantity information of the terminal indicates an electric quantity needed by the terminal capable of executing the first AI task. Electric quantities of terminals are classified into different levels based on values of the electric quantities of the terminals. For example, the electric quantities of the terminals are classified into a high electric quantity, a medium electric quantity, or a low electric quantity. The high electric quantity indicates that the electric quantity of the terminal is greater than or equal to a fourth threshold. The medium electric quantity indicates that the electric quantity of the terminal is less than the fourth threshold and is greater than or equal to a fifth threshold. The low electric quantity indicates that the electric quantity of the terminal is less than the fifth threshold. The fourth threshold is greater than the fifth threshold.

In a case, the electric-quantity information of the terminal includes the electric quantity needed by the terminal capable of executing the first AI task. For example, if the electric-quantity information of the terminal includes 75%, the electric quantity of the terminal capable of executing the first AI task needs to reach at least 75%, or indicates that the electric quantity of the terminal capable of executing the first AI task does not exceed 75%.

In a case, the electric-quantity information of the terminal includes an identifier of a level of the electric quantity needed by the terminal capable of executing the first AI task. For example, the electric quantities of the terminals are classified into the high electric quantity, the medium electric quantity, and the low electric quantity, an identifier of the high electric quantity is G, an identifier of the medium electric quantity is Z, and an identifier of the low electric quantity is D. If the electric-quantity information of the terminal includes G, the electric quantity of the terminal capable of executing the first AI task is the high electric quantity. If the electric-quantity information of the terminal includes Z, the electric quantity of the terminal capable of executing the first AI task is the medium electric quantity. If the electric-quantity information of the terminal includes D, the electric quantity of the terminal capable of executing the first AI task is the low electric quantity.

In a case, the electric-quantity information of the terminal includes a threshold corresponding to a level of the electric quantity needed by the terminal capable of executing the first AI task. For example, if the electric-quantity information of the terminal includes a fourth threshold, the electric quantity of the terminal capable of executing the first AI task is the high electric quantity. If the electric-quantity information of the terminal includes a fifth threshold, the electric quantity of the terminal capable of executing the first AI task is the medium electric quantity. If the electric-quantity information of the terminal includes 0, the electric quantity of the terminal capable of executing the first AI task is the low electric quantity.

(5) Latency Information of the Terminal

The latency information of the terminal indicates a latency condition on the terminal capable of executing the first AI task. Latency of terminals are classified into different levels based on values of the latency. For example, the latency of the terminals is classified into low latency or high latency. The high latency indicates that the latency of the terminal is greater than or equal to a sixth threshold. The low latency indicates that the latency of the terminal is less than the sixth threshold.

In a case, the latency information of the terminal includes an identifier of a latency level of the terminal capable of executing the first AI task. For example, the latency of the terminals is classified into the low latency and the high latency, an identifier of the low latency is D, and an identifier of the high latency is G. If the latency information of the terminal includes G, the latency condition on the terminal capable of executing the first AI task is the high latency. If the electric-quantity information of the terminal includes D, the latency condition on the terminal capable of executing the first AI task is the low latency.

In another case, the latency information of the terminal includes a threshold of a latency level of the terminal capable of executing the first AI task. For example, if the electric-quantity information of the terminal includes a sixth threshold, the latency of the terminal capable of executing the first AI task is the high latency.

(6) Signal Quality Threshold Information of the Terminal

The signal quality threshold information of the terminal indicates signal quality needed by the terminal capable of executing the first AI task. The signal quality includes at least one of the following: reference signal received power (reference signal received power, RSRP), reference signal received quality (reference signal received quality, RSRQ), a signal to interference plus noise ratio (signal to interference plus noise ratio, SINR), or a received signal strength indicator (received signal strength indicator, RSSI).

In some embodiments the signal quality threshold information of the terminal includes the signal quality needed by the terminal capable of executing the first AI task. For example, if the signal quality threshold information of the terminal includes 30 decibel-milliwatts (decibels relative to one milliwatt, dBm), the signal quality needed by the terminal capable of executing the first AI task is greater than or equal to 30 dBm, or indicates that the signal quality needed by the terminal capable of executing the first AI task is less than 30 dBm.

(7) Information about the Memory Size of the Terminal

The information about the memory size of the terminal indicates the memory size needed by the terminal capable of executing the first AI task. For example, the information about the memory size of the terminal includes the memory size needed by the terminal capable of executing the first AI task. For example, if the information about the memory size of the terminal includes 4 G (giga) bytes, the memory size needed by the terminal capable of executing the first AI task is greater than or equal to 4 G bytes, or indicates that the memory size needed by the terminal capable of executing the first AI task is less than 4 G bytes.

(8) Information about the Remaining Memory Size of the Terminal

The information about the remaining memory size of the terminal indicates the remaining memory size needed by the terminal capable of executing the first AI task. For example, the information about the remaining memory size of the terminal includes the remaining memory size needed by the terminal capable of executing the first AI task. For example, if the information about the remaining memory size of the terminal includes 2 G bytes, the remaining memory size needed by the terminal capable of executing the first AI task is greater than or equal to 2 G bytes, or indicates that the remaining memory size needed by the terminal capable of executing the first AI task is less than 2 G bytes.

(9) Information about the AI Task Type Supported by the Terminal

The AI task type supported by the terminal includes one or more of the following: data collection, model release, model training, inference result release, and the like.

In some embodiments if the information about the AI task type supported by the terminal indicates the AI task type supported by the terminal capable of executing the first AI task, the information about the AI task type supported by the terminal includes an identifier of the AI task type supported by the terminal capable of executing the first AI task.

For example, an identifier of the data collection task is an ID 1, an identifier of the model release task is an ID 2, an identifier of the model training task is an ID 3, and an identifier of the inference result release task is an ID 4. If the information about the AI task type supported by the terminal includes the ID 1 and the ID 2, the AI task types supported by the terminal capable of executing the first AI task are the data collection task and the model release task. If the information about the AI task type supported by the terminal includes the ID 3, the AI task type supported by the terminal capable of executing the first AI task is the model training task. If the information about the AI task type supported by the terminal includes the ID 4, the AI task type supported by the terminal capable of executing the first AI task is the inference result release task.

(10) Information about the Network Function Supported by the Terminal and Implementable Through the AI The information about the network function supported by the terminal and implementable through the AI indicates the network function implementable through the AI. For example, the network function includes at least one of energy saving parameter optimization, load balancing, coverage and capacity optimization, or mobility parameter optimization. Alternatively, for example, the network function includes at least one of the following: RAT selection, load balancing, network energy saving, coverage optimization, traffic control, scheduling, channel coding, mobility management, traffic prediction, and modulation.

In some embodiments if the information about the network function supported by the terminal and implementable through the AI indicates the network function implementable by the terminal through the AI, the information about the network function supported by the terminal and implementable through the AI includes an identifier of the network function implementable by the terminal through the AI.

For example, an identifier of the RAT selection function is an ID 1, an identifier of the load balancing function is an ID 2, an identifier of the network energy saving function is an ID 3, and an identifier of the traffic control function is an ID 4. If the information about the network function supported by the terminal and implementable through the AI includes the ID 1 and the ID 2, the terminal implements or assist in implementing the RAT selection and the load balancing through the AI. If the information about the network function supported by the terminal and implementable through the AI includes the ID 3, the terminal implements or assist in implementing the network energy saving through the AI. If the information about the network function supported by the terminal and implementable through the AI includes the ID 4, the terminal implements or assist in implementing the traffic control through the AI.

(11) Information about the AI Algorithm Supported by the Terminal

In some embodiments, the AI algorithm is described as a machine learning algorithm or the like, and a name of the AI algorithm is not limited.

The information about the AI algorithm supported by the terminal indicates the AI algorithm supported by the terminal capable of executing the first AI task. The AI algorithm includes at least one of the following algorithms: a neural network (neural network) algorithm, a deep neural network algorithm, a deep learning algorithm, a federated learning algorithm, or another AI algorithm. For descriptions of the neural network algorithm, the deep neural network algorithm, the deep learning algorithm, and the federated learning algorithm, refer to explanations and descriptions in a conventional technology.

In some embodiments the information about the AI algorithm supported by the terminal includes an identifier of the AI algorithm supported by the terminal capable of executing the first AI task.

For example, an identifier of the neural network algorithm is an ID 1, an identifier of the deep neural network algorithm is an ID 2, an identifier of the deep learning algorithm is an ID 3, and an identifier of the federated learning algorithm is an ID 4. If the information about the AI algorithm supported by the terminal includes the ID 1, the AI algorithm supported by the terminal capable of executing the first AI task is the neural network algorithm. If the information about the AI algorithm supported by the terminal includes the ID 2 and the ID 3, the AI algorithms supported by the terminal capable of executing the first AI task are the deep neural network algorithm and the deep learning algorithm. If the information about the AI algorithm supported by the terminal includes the ID 4, the AI algorithm supported by the terminal capable of executing the first AI task is the federated learning algorithm.

Correspondingly, the first network device receives the first information from the AI apparatus.

Step 302: The first terminal sends information about the first terminal to the first network device.

In some embodiments the first terminal sends the information about the first terminal to the first network device by using higher layer signaling, for example, a radio resource control (radio resource control, RRC) message or a media access control (media access control, MAC) message. The MAC message is a MAC control element (control element, CE).

The information about the first terminal includes at least one of the following information: type information of the first terminal, information about a moving speed of the first terminal, information about a computing capability level of the first terminal, electric-quantity information of the first terminal, latency information of the first terminal, signal quality information of the first terminal, information about a memory size of the first terminal, information about a remaining memory size of the first terminal, information about an AI task type supported by the first terminal, information about a network function supported by the first terminal and implementable through the AI, and information about an AI algorithm supported by the first terminal.

The following describes in detail the various pieces of information indicated in the information about the first terminal.

(1) Type Information of the First Terminal

The type information of the first terminal indicates a type of the first terminal. For example, the type information of the first terminal includes an identifier of the type of the first terminal. For example, the types of the terminals include the V2X terminal, the UAV terminal, and the eMBB terminal, an identifier of the V2X terminal is an ID 1, an identifier of the UAV terminal is an ID 2, and an identifier of the eMBB terminal is an ID 3. If the type information of the first terminal includes the ID 1, the first terminal is the V2X terminal. If the type information of the first terminal includes the ID 2, the first terminal is the UAV terminal. If the type information of the first terminal includes the ID 3, the first terminal is the eMBB terminal.

(2) Information about the Moving Speed of the First Terminal

The information about the moving speed of the first terminal indicates the moving speed of the first terminal.

In a case, the information about the moving speed of the first terminal includes an identifier of a level of the moving speed of the first terminal. For example, the moving speeds of the terminals are classified into the high speed, the medium speed, the low speed, and the ultra-low speed, an identifier of the high speed is G, an identifier of the medium speed is Z, an identifier of the low speed is D, and an identifier of the ultra-low speed is J. If the information about the moving speed of the first terminal includes G, the moving speed of the first terminal is the high speed. If the information about the moving speed of the first terminal includes Z, the moving speed of the first terminal is the medium speed. If the information about the moving speed of the first terminal includes D, the moving speed of the first terminal is the low speed. If the information about the moving speed of the first terminal includes J, the moving speed of the first terminal is the ultra-low speed.

In another case, the information about the moving speed of the first terminal includes a threshold of a level of the moving speed of the first terminal. For example, if the information about the moving speed of the first terminal includes a first threshold, the moving speed of the first terminal is the high speed. If the information about the moving speed of the first terminal includes a second threshold, the moving speed of the first terminal is the medium speed.

(3) Information about the Computing Capability Level of the First Terminal

The information about the computing capability level of the first terminal indicates the computing capability level of the first terminal.

For example, the information about the computing capability level of the first terminal includes an identifier of the computing capability level of the first terminal. For example, the computing capability levels of the terminals are classified into the high level, the medium level, and the low level, an identifier of the high level is G, an identifier of the medium level is Z, and an identifier of the low level is D. If the information about the computing capability level of the first terminal includes G, the capability level of the first terminal is the high level. If the information about the computing capability level of the first terminal includes Z, the capability level of the first terminal is the medium level. If the information about the computing capability level of the first terminal includes D, the capability level of the first terminal is the low level.

(4) Electric-Quantity Information of the First Terminal

The electric-quantity information of the first terminal indicates an electric quantity of the first terminal.

In a case, the electric-quantity information of the first terminal includes the electric quantity of the first terminal. For example, if the electric-quantity information of the first terminal includes 60%, the electric quantity of the first terminal is 60%.

In a case, the electric-quantity information of the first terminal includes an identifier of a level of the electric quantity of the first terminal. For example, the electric quantities of the terminals are classified into the high electric quantity, the medium electric quantity, and the low electric quantity, an identifier of the high electric quantity is G, an identifier of the medium electric quantity is Z, and an identifier of the low electric quantity is D. If the electric-quantity information of the first terminal includes G, the electric quantity of the first terminal is the high electric quantity. If the electric-quantity information of the first terminal includes Z, the electric quantity of the first terminal is the medium electric quantity. If the electric-quantity information of the first terminal includes D, the electric quantity of the first terminal is the low electric quantity.

In a case, the electric-quantity information of the first terminal includes a threshold corresponding to a level of the electric quantity of the first terminal. For example, if the electric-quantity information of the first terminal includes a fourth threshold, the electric quantity of the first terminal is the high electric quantity. If the electric-quantity information of the first terminal includes a fifth threshold, the electric quantity of the first terminal is the medium electric quantity. If the electric-quantity information of the first terminal includes 0, the electric quantity of the first terminal is the low electric quantity.

(5) Latency Information of the First Terminal

The latency information of the first terminal indicates a latency status of the first terminal.

In a case, the latency information of the first terminal includes an identifier of a latency level of the first terminal. For example, the latency of the terminals is classified into the low latency and the high latency, an identifier of the low latency is D, and an identifier of the high latency is G. If the latency information of the first terminal includes G, the first terminal is a high-latency terminal. If the electric-quantity information of the first terminal includes D, the first terminal is a low-latency terminal.

In another case, the latency information of the first terminal includes a threshold of a latency level of the first terminal. For example, if the electric-quantity information of the first terminal includes a sixth threshold, the first terminal is a high-latency terminal.

(6) Signal Quality Information of the First Terminal

The signal quality information of the first terminal indicates signal quality of the first terminal.

In some embodiments the signal quality information of the first terminal includes the signal quality of the first terminal. For example, if the signal quality information of the first terminal includes 20 dBm, the signal quality of the first terminal is 20 dBm.

(7) Information about the Memory Size of the First Terminal

The information about the memory size of the first terminal indicates the memory size of the first terminal. For example, the information about the memory size of the first terminal includes the memory size of the first terminal. For example, if the information about the memory size of the first terminal includes 4 G bytes, the memory size of the first terminal is 4 G bytes.

(8) Information about the Remaining Memory Size of the First Terminal

The information about the remaining memory size of the first terminal indicates the remaining memory size of the first terminal. For example, the information about the remaining memory size of the first terminal includes the remaining memory size of the first terminal. For example, if the information about the remaining memory size of the first terminal includes 1 G bytes, the remaining memory size of the first terminal is 1 G bytes.

(9) Information about the AI Task Type Supported by the First Terminal

In some embodiments if the information about the AI task type supported by the first terminal indicates the AI task type supported by the first terminal, the information about the AI task type supported by the first terminal includes an identifier of the AI task type supported by the first terminal.

For example, an identifier of the data collection task is an ID 1, an identifier of the model release task is an ID 2, an identifier of the model training task is an ID 3, and an identifier of the inference result release task is an ID 4. If the information about the AI task type supported by the first terminal includes the ID 1 and the ID 2, the AI task types supported by the first terminal are the data collection task and the model release task. If the information about the AI task type supported by the first terminal includes the ID 3, the AI task type supported by the first terminal is the model training task. If the information about the AI task type supported by the first terminal includes the ID 4, the AI task type supported by the first terminal is the inference result release task.

(10) Information about the Network Function Supported by the First Terminal and Implementable Through the AI In some embodiments if the information about the network function supported by the first terminal and implementable through the AI indicates the network function supported by the first terminal and implementable through the AI, the information about the network function supported by the first terminal and implementable through the AI includes an identifier of the network function supported by the first terminal and implementable through the AI.

For example, an identifier of the RAT selection function is an ID 1, an identifier of the load balancing function is an ID 2, an identifier of the network energy saving function is an ID 3, and an identifier of the traffic control function is an ID 4. If the information about the network function supported by the first terminal and implementable through the AI includes the ID 1 and the ID 2, the first terminal implements or assist in implementing the RAT selection and the load balancing through the AI. If the information about the network function supported by the first terminal and implementable through the AI includes the ID 3, the first terminal implements or assist in implementing the network energy saving through the AI. If the information about the network function supported by the first terminal and implementable through the AI includes the ID 4, the first terminal implements or assist in implementing the traffic control through the AI.

(11) Information about the AI Algorithm Supported by the First Terminal

The information about the AI algorithm supported by the first terminal indicates the AI algorithm supported by the first terminal.

In some embodiments the information about the AI algorithm supported by the first terminal includes an identifier of the AI algorithm supported by the first terminal.

For example, an identifier of the neural network algorithm is an ID 1, an identifier of the deep neural network algorithm is an ID 2, an identifier of the deep learning algorithm is an ID 3, and an identifier of the federated learning algorithm is an ID 4. If the information about the AI algorithm supported by the first terminal includes the ID 1, the AI algorithm supported by the first terminal is the neural network algorithm. If the information about the AI algorithm supported by the first terminal includes the ID 2 and the ID 3, the AI algorithms supported by the first terminal are the deep neural network algorithm and the deep learning algorithm. If the information about the AI algorithm supported by the first terminal includes the ID 4, the AI algorithm supported by the first terminal is the federated learning algorithm.

In some embodiments, a sequence of performing steps 301 and 302 is not limited in some embodiments. In other words, in the method shown in FIG. 3, step 301 is performed before step 302, or step 302 is performed before step 301. This is not limited.

Correspondingly, the first network device receives the information about the first terminal from the first terminal.

Step 303: The first network device determines, based on the first information and the information about the first terminal, whether the first terminal is capable of executing the first AI task.

In some embodiments that the first network device determines, based on the first information and the information about the first terminal, whether the first terminal is capable of executing the first AI task includes: When the first terminal meets the condition that is for the terminal capable of executing the first AI task and that is indicated by the first information, the first network device determines that the first terminal is capable of executing the first AI task. When the first terminal does not meet the condition that is for the terminal capable of executing the first AI task and that is indicated by the first information, the first network device determines that the first terminal is incapable of executing the first AI task.

For example, the first information includes the type information of the terminal, and the type information of the terminal includes the identifier of the V2X terminal. If the type information of the first terminal includes the identifier of the V2X terminal, the first network device determines that the first terminal is capable of executing the first AI task; or if the type information of the first terminal includes the identifier of the UAV terminal, the first network device determines that the first terminal is incapable of executing the first AI task.

For example, the first information includes the information about the moving speed of the terminal, and the information about the moving speed of the terminal includes the first threshold. If the information about the moving speed of the first terminal includes the first threshold, the first network device determines that the first terminal is capable of executing the first AI task; or if the information about the moving speed of the first terminal includes the second threshold, the first network device determines that the first terminal is incapable of executing the first AI task.

For example, the first information includes the information about the computing capability level of the terminal and the electric-quantity information of the terminal, the information about the computing capability level of the terminal includes the identifier of the high level and the identifier of the medium level, and the electric-quantity information of the terminal includes the identifier of the high electric quantity. If the information about the computing capability level of the first terminal includes the identifier of the medium level, and the electric-quantity information of the first terminal includes the identifier of the high electric quantity, the first network device determines that the first terminal is capable of executing the first AI task; if the information about the computing capability level of the first terminal includes the identifier of the low level, and the electric-quantity information of the first terminal includes the identifier of the high electric quantity, the first network device determines that the first terminal is incapable of executing the first AI task; if the information about the computing capability level of the first terminal includes the identifier of the high level, and the electric-quantity information of the first terminal includes the identifier of the low electric quantity, the first network device determines that the first terminal is incapable of executing the first AI task.

For example, the first information includes the latency information of the terminal, the signal quality threshold information of the terminal, and the information about the memory size of the terminal, the latency information of the terminal includes the identifier of the low latency, the signal quality threshold information of the terminal includes 25 dBm, and the information about the memory size of the terminal includes 4 G bytes. If the latency information of the first terminal includes the identifier of the low latency, the signal quality information of the first terminal includes 30 dBm, and the information about the memory size of the first terminal includes 5 G bytes, the first network device determines that the first terminal is capable of executing the first AI task; if the latency information of the first terminal includes the identifier of the low latency, the signal quality information of the first terminal includes 20 dBm, and the information about the memory size of the first terminal includes 5 G bytes, the first network device determines that the first terminal is incapable of executing the first AI task; if the latency information of the first terminal includes the identifier of the high latency, the signal quality information of the first terminal includes 30 dBm, and the information about the memory size of the first terminal includes 5 G bytes, the first network device determines that the first terminal is incapable of executing the first AI task; if the latency information of the first terminal includes the identifier of the low latency, the signal quality information of the first terminal includes 30 dBm, and the information about the memory size of the first terminal includes 3 G bytes, the first network device determines that the first terminal is incapable of executing the first AI task.

For example, the first information includes the information about the remaining memory size of the terminal and the information about the AI task type supported by the terminal, the information about the remaining memory size of the terminal includes 2 G bytes, and the information about the AI task type supported by the terminal includes the identifier of the data collection task. If the information about the remaining memory size of the first terminal includes 3 G bytes, and the information about the AI task type supported by the first terminal includes the identifier of the data collection task, the first network device determines that the first terminal is capable of executing the first AI task; if the information about the remaining memory size of the first terminal includes 1 G bytes, and the information about the AI task type supported by the first terminal includes the identifier of the data collection task, the first network device determines that the first terminal is incapable of executing the first AI task; if the information about the remaining memory size of the first terminal includes 3 G bytes, and the information about the AI task type supported by the first terminal includes the identifier of the model release task, the first network device determines that the first terminal is capable of executing the first AI task.

For example, the first information includes the information about the network function supported by the terminal and implementable through the AI and the information about the AI algorithm supported by the terminal, the information about the network function supported by the terminal and implementable through the AI includes the identifier of the load balancing function, and the information about the AI algorithm supported by the terminal includes the identifier of the deep learning algorithm and the identifier of the federated learning algorithm. If the information about the network function supported by the first terminal and implementable through the AI includes the identifier of the load balancing function, and the information about the AI algorithm supported by the first terminal includes the identifier of the deep learning algorithm and the identifier of the federated learning algorithm, the first network device determines that the first terminal is capable of executing the first AI task; if the information about the network function supported by the first terminal and implementable through the AI includes the identifier of the network energy saving function, and the information about the AI algorithm supported by the first terminal includes the identifier of the deep learning algorithm and the identifier of the federated learning algorithm, the first network device determines that the first terminal is incapable of executing the first AI task; if the information about the network function supported by the first terminal and implementable through the AI includes the identifier of the load balancing function, and the information about the AI algorithm supported by the first terminal includes the identifier of the neural network algorithm, the first network device determines that the first terminal is incapable of executing the first AI task.

Optionally, after step 303, the first network device sends first indication information to the AI apparatus and/or the first terminal.

The first indication information indicates whether the first terminal is capable of executing the first AI task. For example, if the first network device determines that the first terminal is capable of executing the first AI task, the first indication information indicates that the first terminal is capable of executing the first AI task. If the first network device determines that the first terminal is incapable of executing the first AI task, the first indication information indicates that the first terminal is incapable of executing the first AI task.

In some embodiments, the first network device is unable to send the first indication information to the first terminal. In this case, if the first network device sends configuration information for the first AI task to the first terminal, the first terminal determines, when receiving the configuration information, that the first terminal is capable of executing the first AI task.

Similarly, the first network device is unable to send the first indication information to the AI apparatus. In this case, if the first terminal sends, to the AI apparatus through the first network device, AI data collected when the first terminal executes the first AI task, the AI apparatus determines, when receiving the AI data sent by the first terminal, that the first terminal is capable of executing the first AI task.

According to the method shown in FIG. 3, the first network device receives, from the AI apparatus, the first information indicating the condition for the terminal capable of executing the first AI task, receive the information about the first terminal from the first terminal, and determine, based on the first information and the information about the first terminal, whether the first terminal is capable of executing the first AI task. In this way, the first network device determines, from terminals that have established a connection to the first network device, the terminal capable of executing the first AI task, so that the execution of the first AI task is more targeted, and an execution result is more accurate.

Figure 4:
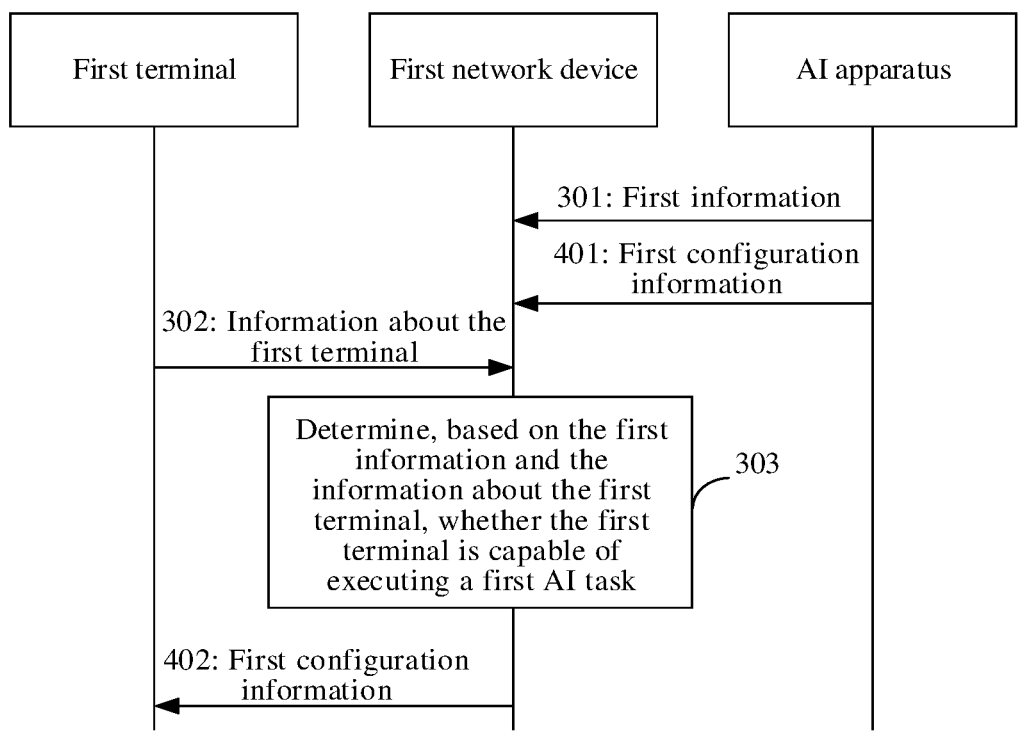

Optionally, in a possible implementation of the method shown in FIG. 3, the AI apparatus sends the configuration information for the first AI task to the first network device. In this way, the first network device and/or the first terminal executes the first AI task based on the configuration information. Specifically, as shown in FIG. 4, the method shown in FIG. 3 further includes step 401 and step 402.

Step 401: The AI apparatus sends first configuration information to the first network device.

The first configuration information indicates the configuration information for the first AI task.

For example, the first configuration information indicates at least one of the following information: an identifier of the first AI task, information about AI data that needs to be collected by a terminal that is to execute the first AI task, a data reporting manner of the first AI task, and information about an AI model used by the terminal that is to execute the first AI task.

The identifier of the first AI task identifies the first AI task.

In some embodiments the identifier of the first AI task corresponds to the configuration information for the first AI task. In this way, the first network device determines the configuration information for the first AI task based on the identifier of the first AI task. Subsequently, after receiving the first configuration information, the first terminal further determines the configuration information for the first AI task based on the identifier of the first AI task. In some embodiments, in this case, the first configuration information includes the identifier of the first AI task. The first terminal, the AI apparatus, and the first network device store the identifier of the first AI task and the configuration information that is for the first AI task and that corresponds to the identifier of the first AI task.

The information about the AI data that needs to be collected by the terminal that is to execute the first AI task indicates the AI data that needs to be collected by the terminal that is to execute the first AI task. For example, the AI data is signal quality, a moving speed, a service volume, and/or location information of the terminal that is to execute the first AI task.

The data reporting manner of the first AI task indicates a manner of reporting the AI data by the terminal that is to execute the first AI task. For example, the data reporting manner of the first AI task includes at least one of the following manners: periodic reporting, delayed reporting, or triggered reporting. The periodic reporting means that the terminal that executes the first AI task reports the AI data once at a preset time interval. The delayed reporting means that after collecting the AI data, the terminal that executes the first AI task does not immediately report the AI data, but reports the AI data in a subsequent appropriate time period. For example, when collecting the AI data, the terminal that executes the first AI task is in a non-connected state. In this case, the terminal does not immediately perform a procedure for reporting the AI data (for example, triggering the terminal to enter a connected state to report the AI data), but stores the AI data, and reports the AI data after the terminal enters the connected state. The triggered reporting means that after collecting the AI data, the terminal that executes the first AI task immediately performs a procedure for reporting the AI data.

The information about the AI model used by the terminal that is to execute the first AI task indicates a model parameter of the AI model needed by the terminal that is to execute the first AI task.

In some embodiments, step 401 is performed before step 301, is performed after step 301 (for example, performed between step 301 and step 302, performed between step 302 and step 303, or performed after step 303), or is performed simultaneously with step 301.

Correspondingly, the first network device receives the first configuration information from the AI apparatus. Subsequently, the first network device executes the first AI task based on the first configuration information; or the first network device sends the first configuration information to the first terminal, so that the first terminal executes the first AI task based on the first configuration information.

Step 402: The first network device sends the first configuration information to the first terminal.

In some embodiments the first network device sends the first configuration information to the first terminal when determining that the first terminal is capable of executing the first AI task.

In some embodiments the first network device sends the first configuration information to the first terminal by using higher layer signaling, for example, an RRC message or a MAC message, physical layer signaling, or a system message. Alternatively, the first network device sends the first configuration information in a broadcast manner.

Correspondingly, the first terminal receives the first configuration information from the first network device. Subsequently, the first terminal executes the first AI task based on the first configuration information.

In some embodiments, if the first network device sends the first configuration information in the broadcast manner, the first terminal executes the first AI task based on the first configuration information when receiving the first configuration information and determining that the first terminal is capable of executing the first AI task.

According to the method shown in FIG. 4, the first network device receives, from the AI apparatus, the first configuration information indicating the configuration information for the first AI task, and send the first configuration information to the first terminal. In this way, the first network device and/or the first terminal executes the first AI task based on the first configuration information.

The methods shown in FIG. 3 and FIG. 4 are methods for determining, by the first network device, whether the first terminal is capable of executing the first AI task. Alternatively, the AI apparatus determines whether the first terminal is capable of executing the first AI task. For details, refer to the following methods shown in FIG. 5 and FIG. 6.

Figure 5:
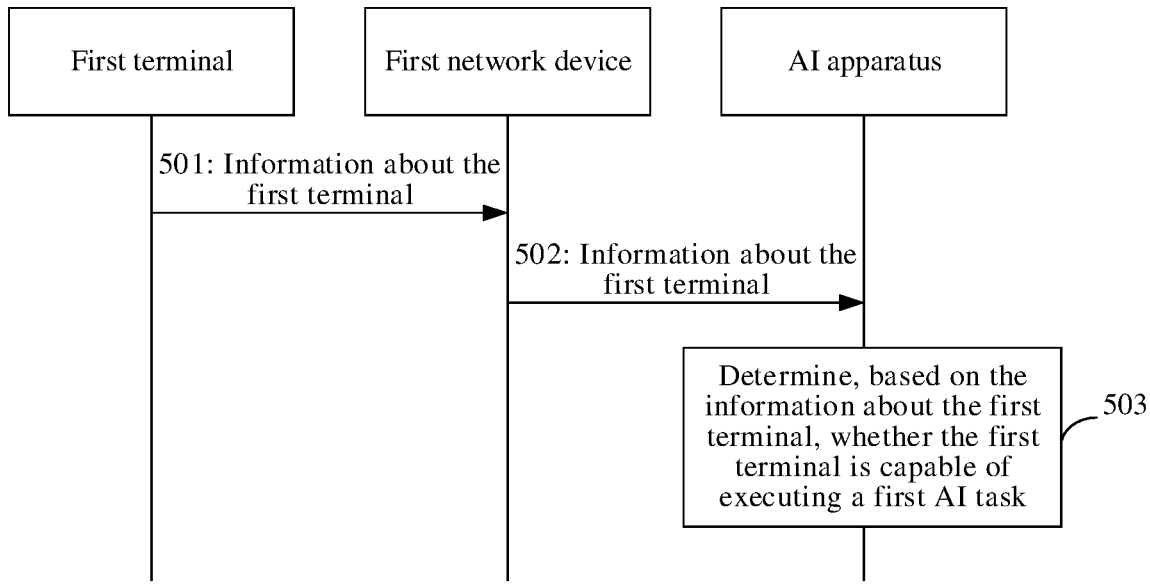

FIG. 5 shows another communication method according to some embodiments. The communication method includes step 501 to step 503.

Step 501: A first terminal sends information about the first terminal to a first network device.

In some embodiments the first terminal sends the information about the first terminal to the first network device by using higher layer signaling, for example, an RRC message or a MAC message.

For descriptions of the first network device, the first terminal, and the information about the first terminal, refer to the descriptions in the foregoing method shown in FIG. 3. Details are not described again.

Correspondingly, the first network device receives the information about the first terminal from the first terminal.

Step 502: The first network device sends the information about the first terminal to an AI apparatus.

Correspondingly, the AI apparatus receives the information about the first terminal from the first network device.

Step 503: The AI apparatus determines, based on the information about the first terminal, whether the first terminal is capable of executing a first AI task.

In some embodiments that the AI apparatus determines, based on the information about the first terminal, whether the first terminal is capable of executing a first AI task includes: The AI apparatus determines, based on the information about the first terminal and first information, whether the first terminal is capable of executing the first AI task. For descriptions of the first information, refer to the descriptions in step 301. Details are not described again.

For a process in which the AI apparatus determines, based on the information about the first terminal and the first information, whether the first terminal is capable of executing the first AI task, refer to the corresponding descriptions in step 303 in which the first network device determines, based on the first information and the information about the first terminal, whether the first terminal is capable of executing the first AI task. Details are not described again.

Optionally, after step 503, the AI apparatus sends first indication information to the first network device.

The first indication information indicates whether the first terminal is capable of executing the first AI task. For example, if the AI apparatus determines that the first terminal is capable of executing the first AI task, the first indication information indicates that the first terminal is capable of executing the first AI task. If the AI apparatus determines that the first terminal is incapable of executing the first AI task, the first indication information indicates that the first terminal is incapable of executing the first AI task.

In some embodiments, the AI apparatus is unable to send the first indication information to the first network device. In this case, if the AI apparatus sends configuration information for the first AI task and an identifier of the first terminal to the first network device, the first network device determines, when receiving the configuration information, that the first terminal is capable of executing the first AI task.

Correspondingly, the first network device receives the first indication information from the AI apparatus. Further, the first network device sends the first indication information to the first terminal.

Similarly, the first network device is unable to send the first indication information to the first terminal. In this case, if the first network device sends the configuration information for the first AI task to the first terminal after receiving the configuration information, the first terminal determines, when receiving the configuration information, that the first terminal is capable of executing the first AI task.

According to the method shown in FIG. 5, the first terminal sends the information about the first terminal to the AI apparatus through the first network device, and the AI apparatus determines, based on the information about the first terminal after receiving the information about the first terminal, whether the first terminal is capable of executing the first AI task. In this way, the AI apparatus determines, from terminals that have established a connection to the first network device, the terminal capable of executing the first AI task, so that execution of the first AI task is more targeted, and an execution result is more accurate.

Figure 6:
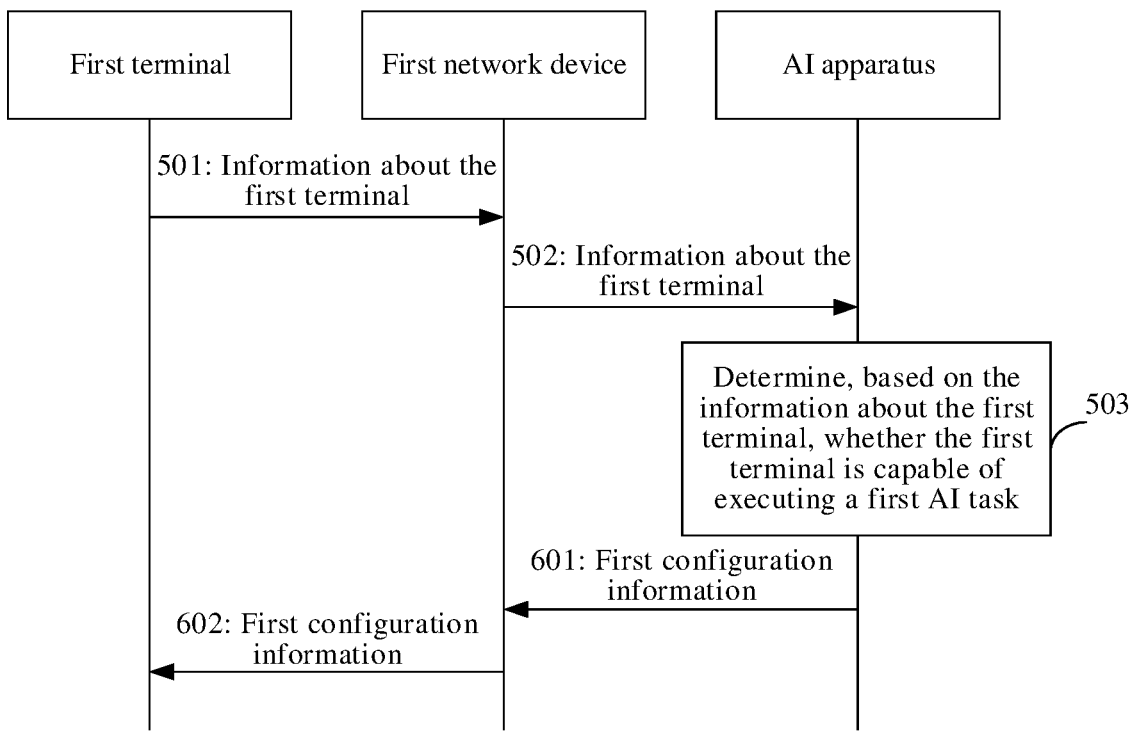

Optionally, in a possible implementation of the method shown in FIG. 5, the AI apparatus sends the configuration information for the first AI task to the first network device. In this way, the first network device and/or the first terminal executes the first AI task based on the configuration information. Specifically, as shown in FIG. 6, the method shown in FIG. 5 further includes step 601 and step 602.

Step 601: The AI apparatus sends first configuration information to the first network device.

embodiments the AI apparatus determines that the first terminal is capable of executing the first AI task and sends the first configuration information to the first network device.

For a process in which the AI apparatus sends the first configuration information to the first network device, refer to the corresponding descriptions in step 401. Details are not described again.

Correspondingly, the first network device receives the first configuration information from the AI apparatus. Subsequently, the first network device executes the first AI task based on the first configuration information; or the first network device sends the first configuration information to the first terminal, so that the first terminal executes the first AI task based on the first configuration information.

Step 602: The first network device sends the first configuration information to the first terminal.

For a process of step 602, refer to the descriptions in step 402. Details are not described again.

According to the method shown in FIG. 6, the first network device receives, from the AI apparatus, the first configuration information indicating the configuration information for the first AI task, and send the first configuration information to the first terminal. In this way, the first network device and/or the first terminal executes the first AI task based on the first configuration information.

The methods shown in FIG. 3 and FIG. 4 are methods for determining, by the first network device, whether the first terminal is capable of executing the first AI task. The methods shown in FIG. 5 and FIG. 6 are methods for determining, by the AI apparatus, whether the first terminal is capable of executing the first AI task. Alternatively, the first terminal determines whether the first terminal is capable of executing the first AI task. For details, refer to the following methods shown in FIG. 7 and FIG. 8.

Figure 7:
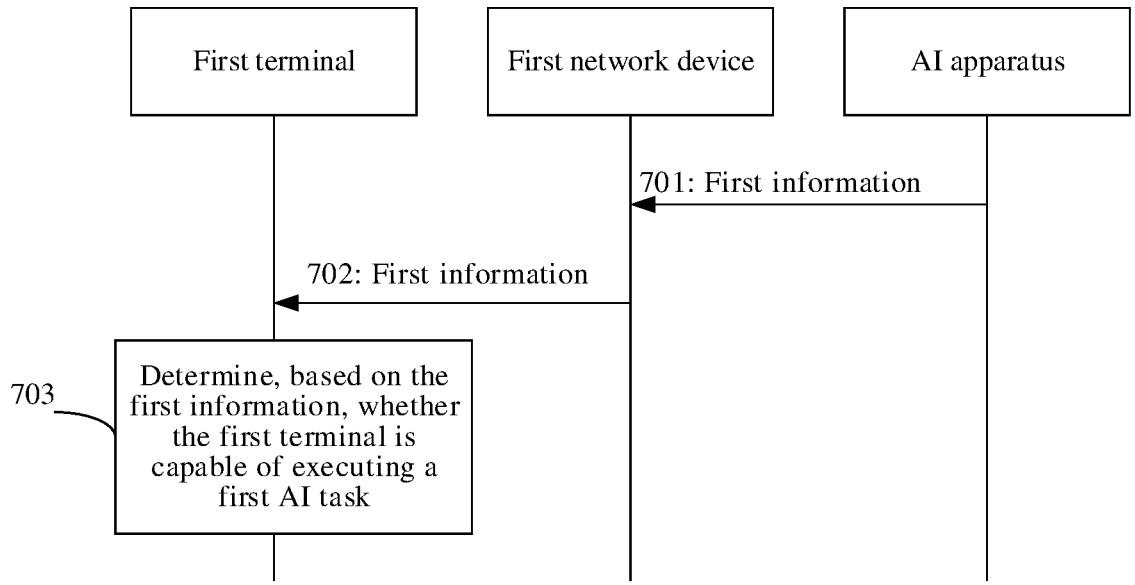

FIG. 7 shows another communication method according to some embodiments. The communication method includes step 701 to step 703.

Step 701: An AI apparatus sends first information to a first network device.

For descriptions of the AI apparatus, the first network device, a first terminal, and the first information, refer to the descriptions in step 301. Details are not described again.

Correspondingly, the first network device receives the first information from the AI apparatus.

Step 702: The first network device sends the first information to the first terminal.

In some embodiments the first network device sends the first information to the first terminal by using higher layer signaling, for example, an RRC message or a MAC message, physical layer signaling, or a system message.

Correspondingly, the first terminal receives the first information from the first network device.

Step 703: The first terminal determines, based on the first information, whether the first terminal is capable of executing a first AI task.

In some embodiments that the first terminal determines, based on the first information, whether the first terminal is capable of executing a first AI task includes: The first terminal determines, based on the first information and information about the first terminal, whether the first terminal is capable of executing the first AI task. For descriptions of the information about the first terminal, refer to the descriptions in step 302. Details are not described again.

For a process in which the first terminal determines, based on the information about the first terminal and the first information, whether the first terminal is capable of executing the first AI task, refer to the corresponding descriptions in step 303 in which the first network device determines, based on the first information and the information about the first terminal, whether the first terminal is capable of executing the first AI task. Details are not described again.

Optionally, after step 703, the first terminal sends first indication information to the first network device.

The first indication information indicates whether the first terminal is capable of executing the first AI task. For example, if the first terminal determines that the first terminal is capable of executing the first AI task, the first indication information indicates that the first terminal is capable of executing the first AI task. If the first terminal determines that the first terminal is incapable of executing the first AI task, the first indication information indicates that the first terminal is incapable of executing the first AI task.

In some embodiments, the first terminal is unable to send the first indication information to the first network device. In this case, if the first terminal sends, to the first network device, AI data collected when the first terminal executes the first AI task, the first network device determines, when receiving the AI data, that the first terminal is capable of executing the first AI task.

Correspondingly, the first network device receives the first indication information from the first terminal. Further, the first network device sends the first indication information to the AI apparatus.

Similarly, the first network device is unable to send the first indication information to the AI apparatus. In this case, if the first network device sends the AI data to the AI apparatus after receiving the AI data, the AI apparatus determines, when receiving the AI data, that the first terminal is capable of executing the first AI task.

According to the method shown in FIG. 7, the AI apparatus sends, to the first terminal through the first network device, the first information indicating a condition for a terminal capable of executing the first AI task, and the first terminal determines, based on the first information after receiving the first information, whether the first terminal is capable of executing the first AI task. In this way, the first terminal determines whether the first terminal is capable of executing the first AI task, so that the execution of the first AI task is more targeted, and an execution result is more accurate.

Figure 8:
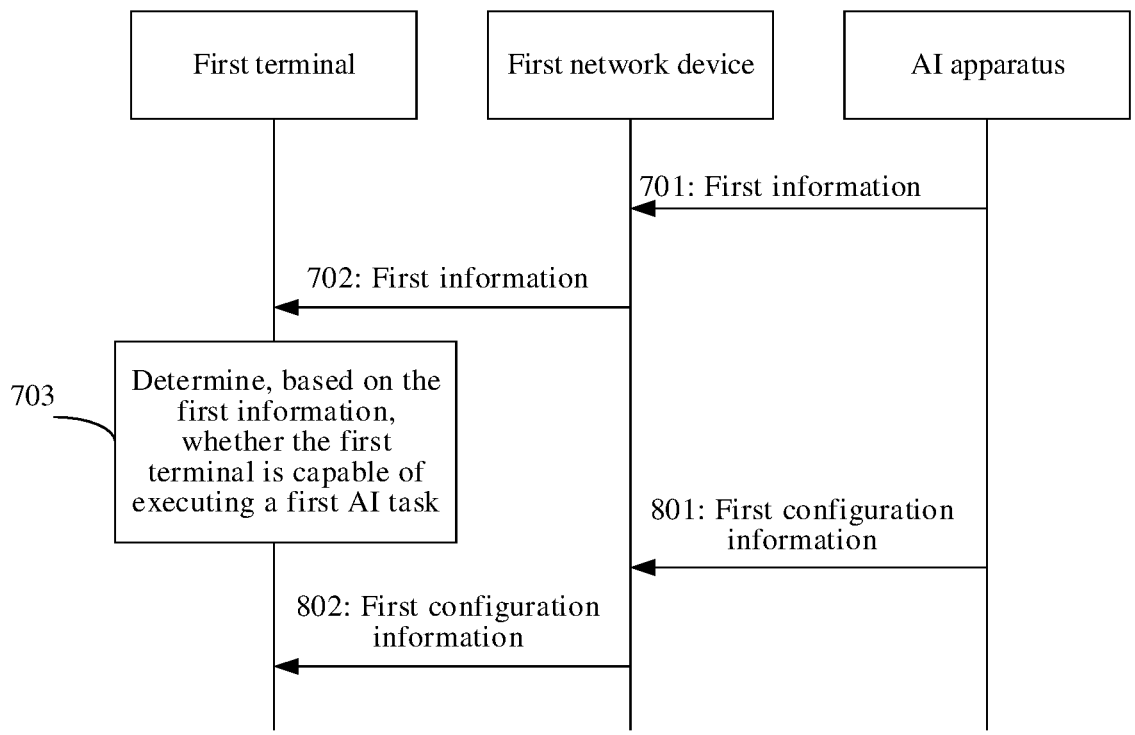

Optionally, in a possible implementation of the method shown in FIG. 7, the AI apparatus sends configuration information for the first AI task to the first network device. In this way, the first network device and/or the first terminal executes the first AI task based on the configuration information. Specifically, as shown in FIG. 8, the method shown in FIG. 7 further includes step 801 and step 802.

Step 801: The AI apparatus sends first configuration information to the first network device.

Step 802: The first network device sends the first configuration information to the first terminal.

For processes of step 801 and step 802, refer to the descriptions of step 401 and step 402. Details are not described again.

According to the method shown in FIG. 8, the first network device receives, from the AI apparatus, the first configuration information indicating the configuration information for the first AI task, and send the first configuration information to the first terminal. In this way, the first network device and/or the first terminal executes the first AI task based on the first configuration information. For example, the first terminal determines that the first terminal is capable of executing the first AI task, and executes the first AI task based on the first configuration information.

As described above, the network device/terminal/AI apparatus performs all or a part of AI functions. Before an AI task is executed, an AI split mode is first determined, to be specific, an AI function to be performed by each apparatus is first determined. Subsequently, the network device, the terminal, and the AI apparatus executes the AI task based on the determined AI split mode.

Figure 9:
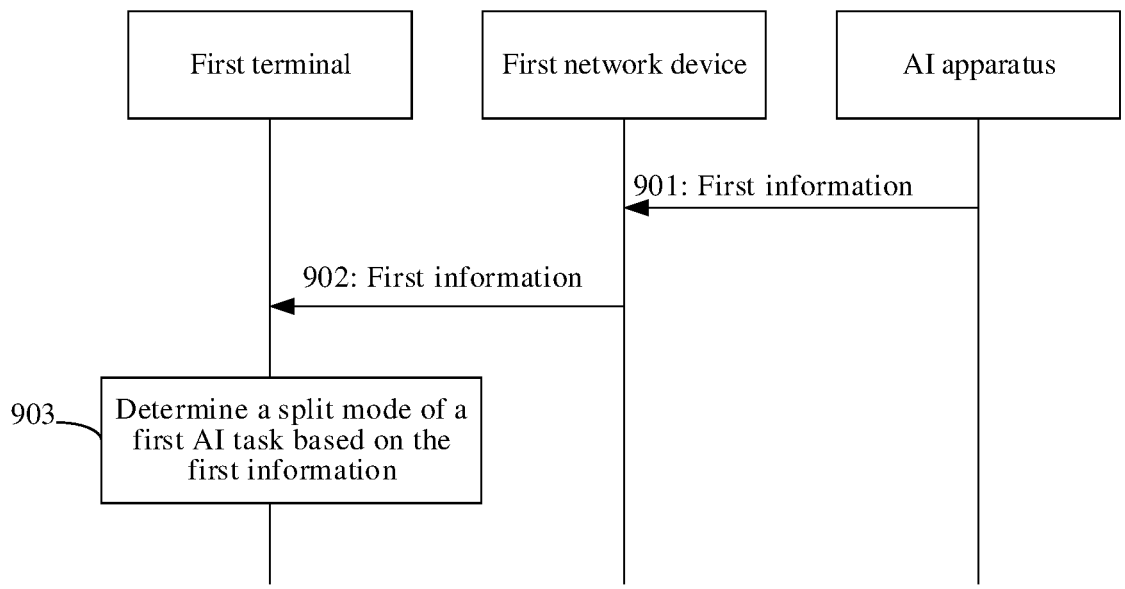

FIG. 9 shows another communication method according to some embodiments. The communication method includes step 901 to step 903.

Step 901: An AI apparatus sends first information to a first network device.

The AI apparatus performs one or more AI functions, for example, a training function and an inference function. For descriptions of the training function and the inference function, refer to the corresponding descriptions in FIG. 1.

For descriptions of the AI apparatus, the first network device, and a first terminal, refer to the descriptions in step 301. Details are not described again.

Different from the first information in FIG. 3 to FIG. 8, the first information in FIG. 9 indicates a condition that is met by a terminal corresponding to each of at least one AI split mode. The at least one AI split mode includes at least one of the following modes: a mode in which a network device performs AI functions, a mode in which the terminal performs the AI functions, a mode in which the AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, or a mode in which the network device, the AI apparatus, and the terminal respectively perform a part of the AI functions.

In a case, a mode of performing AI functions are understood as performing AI functions. For example, the mode in which a network device performs AI functions is applied, and the AI functions include the training function and the inference function. In this case, the mode in which a network device performs AI functions are understood as: The network device performs the training function and the inference function. In another case, a mode of performing AI functions alternatively is understood as performing a AI function. For example, a mode in which the first terminal performs training functions is applied, and the training functions include a training function 1 and a training function 2. A mode in which the first terminal performs the AI functions are understood as: The first terminal performs the training function 1 and the training function 2. Further, after performing the training function 1 and the training function 2, the first terminal sends a model training result to the network device, and the network device continues to perform a remaining AI function, for example, the inference function.

Similarly, a mode of performing a part of AI functions are understood as performing a part of AI functions. For example, the mode in which the network device and the first terminal respectively perform a part of the AI functions is applied, and the AI functions include a training function 1, a training function 2, an inference function 1, and an inference function 2. The first terminal performs the training function 1 and the inference function 1, and send execution results of the training function 1 and the inference function 1 to the network device. After receiving the execution results, the network device continues to perform the training function 2 and the inference function 2. A mode of performing a part of AI functions alternatively is understood as performing a part of an AI function. For example, a mode in which the network device and the first terminal respectively perform a part of the AI functions is applied, and the AI functions include a training function 1, a training function 2, and a training function 3. The network device performs the training function 1, and send a training result to the first terminal. After receiving the training result, the first terminal continues to perform the training function 2 and the training function 3.

In some embodiments, the mode in which the AI apparatus and the network device respectively perform a part of the AI functions alternatively is classified into different split modes based on a ratio of an AI function performed by the AI apparatus and an AI function performed by the network device. For example, the AI functions include a training function 1, a training function 2, and an inference function 1. If the AI apparatus performs the training function 1, and the network device performs the training function 2 and the inference function 1, this mode is referred to as a first AI split mode. If the AI apparatus performs the training function 1 and the training function 2, and the network device performs the inference function 1, this mode is referred to as a second AI split mode. If the AI apparatus performs the training function 2, and the network device performs the training function 1 and the inference function 1, this mode is referred to as a third AI split mode. The rest is deduced by analogy.

Similarly, the mode in which the AI apparatus and the terminal respectively perform a part of the AI functions alternatively is classified into different split modes based on a ratio of an AI function performed by the AI apparatus and an AI function performed by the terminal. The mode in which the network device and the terminal respectively perform a part of the AI functions alternatively is classified into different split modes based on a ratio of an AI function performed by the network device and an AI function performed by the terminal. The mode in which the network device, the AI apparatus, and the terminal respectively perform a part of the AI functions alternatively is classified into different split modes based on a ratio of an AI function performed by the network device, an AI function performed by the AI apparatus, and an AI function performed by the terminal.

The AI split mode in some embodiments alternatively is named in another manner, for example, named an AI task execution manner or an AI task execution mode. This is not limited.

In some embodiments the first information includes information about the terminal corresponding to each AI split mode, namely, the condition that is met by the terminal corresponding to each AI split mode. The information about the terminal corresponding to each AI split mode includes at least one of the following information: information about a computing capability level of the terminal corresponding to the AI split mode, electric-quantity information of the terminal corresponding to the AI split mode, type information of the terminal corresponding to the AI split mode, information about a memory size of the terminal corresponding to the AI split mode, and authorization condition information of the terminal corresponding to the AI split mode.

The following separately describes the information in the information about the terminal corresponding to each AI split mode.

(1) Information about the Computing Capability Level of the Terminal Corresponding to the AI Split Mode The information about the computing capability level of the terminal corresponding to the AI split mode indicates the computing capability level of the terminal corresponding to the AI split mode. Computing capabilities of terminals are classified into different levels. For example, the computing capabilities of the terminals are classified into a high level, a medium level, or a low level. Terminals of different computing capability levels executes AI tasks with different complexity. For example, a terminal whose computing capability level is the high level executes an AI task with high complexity, a terminal whose computing capability level is the medium level executes an AI task with low complexity, and a terminal whose computing capability level is the low level executes an AI task with low complexity.

For example, the information about the computing capability level of the terminal corresponding to the AI split mode indicates at least one of the high level, the medium level, or the low level. Further, the information about the computing capability level of the terminal corresponding to the AI split mode includes an identifier of the computing capability level of the terminal corresponding to the AI split mode. For example, the computing capability levels of the terminals corresponding to the AI split mode are classified into the high level, the medium level, and the low level, an identifier of the high level is G, an identifier of the medium level is Z, and an identifier of the low level is D. If the information about the computing capability level of the terminal corresponding to the AI split mode includes G, the computing capability level of the terminal corresponding to the AI split mode is the high level. If the information about the computing capability level of the terminal corresponding to the AI split mode includes Z, the computing capability level of the terminal corresponding to the AI split mode is the medium level. If the information about the computing capability level of the terminal corresponding to the AI split mode includes D, the computing capability level of the terminal corresponding to the AI split mode is the low level.

(2) Electric-Quantity Information of the Terminal Corresponding to the AI Split Mode The electric-quantity information of the terminal corresponding to the AI split mode indicates an electric quantity needed by the terminal corresponding to the AI split mode. Electric quantities of terminals are classified into different levels based on values of the electric quantities of the terminals. For example, the electric quantities of the terminals are classified into a high electric quantity, a medium electric quantity, or a low electric quantity. The high electric quantity indicates that the electric quantity of the terminal is greater than or equal to a fourth threshold. The medium electric quantity indicates that the electric quantity of the terminal is less than the fourth threshold and is greater than or equal to a fifth threshold. The low electric quantity indicates that the electric quantity of the terminal is less than the fifth threshold. The fourth threshold is greater than the fifth threshold.

In a case, the electric-quantity information of the terminal corresponding to the AI split mode includes the electric quantity needed by the terminal corresponding to the AI split mode. For example, if the electric-quantity information of the terminal corresponding to the AI split mode includes 85%, the electric quantity of the terminal corresponding to the AI split mode needs to reach at least 85%, or indicates that the electric quantity of the terminal corresponding to the AI split mode does not exceed 85%.

In a case, the electric-quantity information of the terminal corresponding to the AI split mode includes an identifier of a level of the electric quantity needed by the terminal corresponding to the AI split mode. For example, the electric quantities of the terminals corresponding to the AI split mode are classified into the high electric quantity, the medium electric quantity, and the low electric quantity, an identifier of the high electric quantity is G, an identifier of the medium electric quantity is Z, and an identifier of the low electric quantity is D. If the electric-quantity information of the terminal corresponding to the AI split mode includes G, the electric quantity of the terminal corresponding to the AI split mode is the high electric quantity. If the electric-quantity information of the terminal corresponding to the AI split mode includes Z, the electric quantity of the terminal corresponding to the AI split mode is the medium electric quantity. If the electric-quantity information of the terminal corresponding to the AI split mode includes D, the electric quantity of the terminal corresponding to the AI split mode is the low electric quantity.

In a case, the electric-quantity information of the terminal corresponding to the AI split mode includes a threshold corresponding to a level of the electric quantity needed by the terminal corresponding to the AI split mode. For example, if the electric-quantity information of the terminal corresponding to the AI split mode includes a fourth threshold, the electric quantity of the terminal corresponding to the AI split mode is the high electric quantity. If the electric-quantity information of the terminal corresponding to the AI split mode includes a fifth threshold, the electric quantity of the terminal corresponding to the AI split mode is the medium electric quantity. If the electric-quantity information of the terminal corresponding to the AI split mode includes 0, the electric quantity of the terminal corresponding to the AI split mode is the low electric quantity.

(3) Type Information of the Terminal Corresponding to the AI Split Mode

The type information of the terminal corresponding to the AI split mode indicates a type of the terminal corresponding to the AI split mode. A type of a terminal includes at least one of the following types: a V2X terminal, a UAV terminal, an MBB terminal, an eMBB terminal, an mMTC terminal, a URLLC terminal, an NB-IoT terminal, an eMTC terminal, or a REDCAP terminal.

In some embodiments the type information of the terminal corresponding to the AI split mode includes an identifier of the type of the terminal corresponding to the AI split mode. For example, the types of the terminals include the V2X terminal, the UAV terminal, and the eMBB terminal, an identifier of the V2X terminal is an ID 1, an identifier of the UAV terminal is an ID 2, and an identifier of the eMBB terminal is an ID 3. If the type information of the terminal corresponding to the AI split mode includes the ID 1, the terminal corresponding to the AI split mode is the V2X terminal. If the type information of the terminal corresponding to the AI split mode includes the ID 1 and the ID 2, the terminals corresponding to the AI split mode are the V2X terminal and the UAV terminal. If the type information of the terminal corresponding to the AI split mode includes the ID 3, the terminal corresponding to the AI split mode is the eMBB terminal.

(4) Information about the Memory Size of the Terminal Corresponding to the AI Split Mode The information about the memory size of the terminal corresponding to the AI split mode indicates the memory size needed by the terminal corresponding to the AI split mode. For example, the information about the memory size of the terminal corresponding to the AI split mode includes the memory size needed by the terminal corresponding to the AI split mode. For example, if the information about the memory size of the terminal corresponding to the AI split mode includes 4 G bytes, the memory size needed by the terminal corresponding to the AI split mode is greater than or equal to 4 G bytes, or indicates that the memory size needed by the terminal corresponding to the AI split mode is less than 4 G bytes.

(5) Authorization Condition Information of the Terminal Corresponding to the AI Split Mode The authorization condition information of the terminal corresponding to the AI split mode indicates whether the terminal corresponding to the AI split mode needs to be authorized to execute an AI task and/or the AI task that the terminal corresponding to the AI split mode needs to be authorized to execute.

For example, the authorization condition information of the terminal corresponding to the AI split mode includes indication information indicating whether the terminal corresponding to the AI split mode needs to be authorized to execute the AI task and/or an identifier of the AI task that the terminal corresponding to the AI split mode needs to be authorized to execute.

The indication information includes one bit. If the bit is 0, the terminal corresponding to the AI split mode does not call for being authorized to execute the AI task. To be specific, the AI task is executed regardless of whether the terminal corresponding to the AI split mode is authorized to execute the AI task. If the bit is 1, the terminal corresponding to the AI split mode needs to be authorized to execute the AI task. To be specific, the AI task is executed when the terminal corresponding to the AI split mode is authorized to execute the AI task.

Optionally, the AI apparatus sends, to the first network device, information about an AI split mode supported by the AI apparatus. The information about the AI split mode supported by the AI apparatus indicates the AI split mode supported by the AI apparatus. In this way, the first network device and/or the first terminal determines the AI split mode supported by the AI apparatus, and the first terminal further determines a split mode of an AI task based on the AI split mode supported by the AI apparatus.

In some embodiments, the information about the AI split mode supported by the AI apparatus may be sent before step 901, may be sent after step 901 and before step 903, or may be sent simultaneously with the first information. This is not limited.

In some embodiments, the foregoing at least one AI split mode may be the AI split mode supported by the AI apparatus.

Correspondingly, the first network device receives the first information from the AI apparatus.

Optionally, the first network device receives, from the AI apparatus, the information about the AI split mode supported by the AI apparatus.

Step 902: The first network device sends the first information to the first terminal.

In some embodiments the first network device sends the first information to the first terminal by using higher layer signaling, for example, an RRC message or a MAC message, physical layer signaling, or a system message.

Correspondingly, the first terminal receives the first information from the first network device.

Step 903: The first terminal determines a split mode of a first AI task based on the first information.

In some embodiments that the first terminal determines a split mode of a first AI task based on the first information includes: The first terminal determines the split mode of the first AI task based on the first information and information about the first terminal.

The first AI task is any AI task released by the AI apparatus. The first AI task includes an AI task of one or more network functions (or an AI model corresponding to the network function).

The information about the first terminal includes at least one of the following information: information about an AI split mode supported by the first terminal, information about a computing capability level of the first terminal, electric-quantity information of the first terminal, type information of the first terminal, information about a memory size of the first terminal, and authorization condition information of the first terminal.

The following separately describes the information in the information about the first terminal.

(1) Information about the AI Split Mode Supported by the First Terminal

The information about the AI split mode supported by the first terminal indicates the AI split mode supported by the first terminal.

For example, the information about the AI split mode supported by the first terminal includes an identifier of the AI split mode supported by the first terminal. For example, an identifier of the mode in which the terminal performs the AI functions is an ID 1, an identifier of the mode in which the AI apparatus and the terminal respectively perform a part of the AI functions is an ID 2, and an identifier of the mode in which the network device and the terminal respectively perform a part of the AI functions is an ID 3. If the information about the AI split mode supported by the first terminal includes the ID 1 and the ID 2, the AI split modes supported by the first terminal are the mode in which the terminal performs the AI functions and the mode in which the AI apparatus and the terminal respectively perform a part of the AI functions.

(2) Information about the Computing Capability Level of the First Terminal

The information about the computing capability level of the first terminal indicates the computing capability level of the first terminal.

For example, the information about the computing capability level of the first terminal indicates at least one of the high level, the medium level, or the low level. Further, the information about the computing capability level of the first terminal includes an identifier of the computing capability level of the first terminal. For example, the computing capability levels of the terminals are classified into the high level, the medium level, and the low level, an identifier of the high level is G, an identifier of the medium level is Z, and an identifier of the low level is D. If the information about the computing capability level of the first terminal includes G, the computing capability level of the first terminal is the high level. If the information about the computing capability level of the first terminal includes Z, the computing capability level of the first terminal is the medium level. If the information about the computing capability level of the terminal corresponding to the AI split mode includes D, the computing capability level of the first terminal is the low level.

(3) Electric-Quantity Information of the First Terminal

The electric-quantity information of the first terminal indicates an electric quantity of the first terminal.

In a case, the electric-quantity information of the first terminal includes the electric quantity of the first terminal. For example, if the electric-quantity information of the first terminal includes 85%, the electric quantity of the first terminal is 85%.

In a case, the electric-quantity information of the first terminal includes an identifier of a level of the electric quantity of the first terminal. For example, the electric quantities of the terminals are classified into the high electric quantity, the medium electric quantity, and the low electric quantity, an identifier of the high electric quantity is G, an identifier of the medium electric quantity is Z, and an identifier of the low electric quantity is D. If the electric-quantity information of the first terminal includes G, the electric quantity of the first terminal is the high electric quantity. If the electric-quantity information of the first terminal includes Z, the electric quantity of the first terminal is the medium electric quantity. If the electric-quantity information of the first terminal includes D, the electric quantity of the first terminal is the low electric quantity.

In a case, the electric-quantity information of the first terminal includes a threshold corresponding to a level of the electric quantity of the first terminal. For example, if the electric-quantity information of the first terminal includes a fourth threshold, the electric quantity of the first terminal is the high electric quantity. If the electric-quantity information of the first terminal includes a fifth threshold, the electric quantity of the first terminal is the medium electric quantity. If the electric-quantity information of the first terminal includes 0, the electric quantity of the first terminal is the low electric quantity.

(4) Type Information of the First Terminal

The type information of the first terminal indicates a type of the first terminal.

In some embodiments the type information of the first terminal includes an identifier of the type of the first terminal. For example, the types of the terminals include the V2X terminal, the UAV terminal, and the eMBB terminal, an identifier of the V2X terminal is an ID 1, an identifier of the UAV terminal is an ID 2, and an identifier of the eMBB terminal is an ID 3. If the type information of the first terminal includes the ID 1, the first terminal is the V2X terminal. If the type information of the first terminal includes the ID 1 and the ID 2, the first terminal is the V2X terminal and the UAV terminal. If the type information of the first terminal includes the ID 3, the first terminal is the eMBB terminal.

(5) Information about the Memory Size of the First Terminal

The information about the memory size of the first terminal indicates the memory size of the first terminal. For example, the information about the memory size of the first terminal includes the memory size of the first terminal. For example, if the information about the memory size of the first terminal includes 2 G bytes, the memory size of the first terminal is 2 G bytes.

(6) Authorization Condition Information of the First Terminal

The authorization condition information of the first terminal indicates whether the first terminal is authorized to execute an AI task and/or the AI task that the first terminal is authorized to execute.

For example, the authorization condition information of the first terminal includes indication information indicating whether the first terminal is authorized to execute the AI task and/or an identifier of the AI task that the first terminal is authorized to execute.

The indication information includes one bit. If the bit is 0, the first terminal is not authorized to execute the AI task. If the bit is 1, the first terminal is authorized to execute the AI task.

An example in which the first information includes at least one of a condition 1 to a condition 7 is used below to describe a process in which the first terminal determines the split mode of the first AI task based on the first information and the information about the first terminal.

The condition 1 is a condition that is met by a terminal corresponding to the mode in which a network device performs AI functions. The condition 2 is a condition that is met by a terminal corresponding to the mode in which the terminal performs the AI functions. The condition 3 is a condition that is met by a terminal corresponding to the mode in which the AI apparatus performs the AI functions. The condition 4 is a condition that is met by a terminal corresponding to the mode in which the AI apparatus and the network device respectively perform a part of the AI functions. The condition 5 is a condition that is met by a terminal corresponding to the mode in which the AI apparatus and the terminal respectively perform a part of the AI functions. The condition 6 is a condition that is met by a terminal corresponding to the mode in which the network device and the terminal respectively perform a part of the AI functions. The condition 7 is a condition that is met by a terminal corresponding to the mode in which the network device, the AI apparatus, and the terminal respectively perform a part of the AI functions.

For example, the first information includes the condition 1 and the condition 6, and the condition 1 and the condition 6 include the information about the computing capability level of the terminal; the information that is about the computing capability level of the terminal and that is included in the condition 1 indicates that the computing capability level of the terminal is the low level; the information that is about the computing capability level of the terminal and that is included in the condition 6 indicates that the computing capability level of the terminal is the medium level; and the information about the first terminal includes the information about the AI split mode supported by the first terminal and the information about the computing capability level of the first terminal. If the information about the AI split mode supported by the first terminal indicates that the terminal supports the mode in which a network device performs AI functions and the mode in which the network device and the terminal respectively perform a part of the AI functions, and the information about the computing capability level of the first terminal indicates that the computing capability level of the first terminal is the medium level, the split mode of the first AI task is the mode in which the network device and the terminal respectively perform a part of the AI functions. If the information about the AI split mode supported by the first terminal indicates that the terminal supports the mode in which a network device performs AI functions and the mode in which the network device and the terminal respectively perform a part of the AI functions, and the information about the computing capability level of the first terminal indicates that the computing capability level of the first terminal is the low level, the split mode of the first AI task is the mode in which a network device performs AI functions.

For example, the first information includes the condition 2, the condition 4, and the condition 7, and the condition 2, the condition 4, and the condition 7 include the electric-quantity information of the terminal and the type information of the terminal; in the condition 2, the electric-quantity information of the terminal indicates that the electric quantity of the terminal is the high electric quantity, and the terminal types indicated by the type information of the terminal are the UAV terminal and the eMBB terminal; in the condition 4, the electric-quantity information of the terminal indicates that the electric quantity of the terminal is the medium electric quantity, and the terminal type indicated by the type information of the terminal is the V2X terminal; in the condition 7, the electric-quantity information of the terminal indicates that the electric quantity of the terminal is the low electric quantity, and the terminal type indicated by the type information of the terminal is the MBB terminal; and the information about the first terminal includes the electric-quantity information of the first terminal and the type information of the first terminal. If the electric quantity of the first terminal indicated by the electric-quantity information of the first terminal is the high electric quantity, and the type information of the first terminal indicates that the first terminal is the eMBB terminal, the split mode of the first AI task is the mode in which the terminal performs the AI functions. If the electric quantity of the first terminal indicated by the electric-quantity information of the first terminal is the medium electric quantity, and the type information of the first terminal indicates that the first terminal is the V2X terminal, the split mode of the first AI task is the mode in which the AI apparatus and the network device respectively perform a part of the AI functions. If the electric quantity of the first terminal indicated by the electric-quantity information of the first terminal is the low electric quantity, and the type information of the first terminal indicates that the first terminal is the MBB terminal, the split mode of the first AI task is the mode in which the network device, the AI apparatus, and the terminal respectively perform a part of the AI functions.

For example, the first information includes the condition 3 and the condition 5, and the condition 3 and the condition 5 include the information about the memory size of the terminal and the authorization condition information of the terminal; in the condition 3, the memory size needed by the terminal and indicated by the information about the memory size of the terminal is 4 G bytes, and the authorization condition information of the terminal indicates that the terminal corresponding to the AI split mode does not call for being authorized to execute the AI task; in the condition 5, the memory size needed by the terminal and indicated by the information about the memory size of the terminal is 8 G bytes, and the authorization condition information of the terminal indicates that the terminal corresponding to the AI split mode needs to be authorized to execute the AI task; and the information about the first terminal includes the information about the memory size of the first terminal and the authorization condition information of the first terminal. If the information about the memory size of the first terminal indicates that the memory size of the first terminal is 4 G bytes, and the authorization condition information of the first terminal indicates that the first terminal is not authorized to execute the AI task, the split mode of the first AI task is the mode in which the AI apparatus performs the AI functions. If the information about the memory size of the first terminal indicates that the memory size of the first terminal is 8 G bytes, and the authorization condition information of the first terminal indicates that the first terminal is authorized to execute the AI task, the split mode of the first AI task is the mode in which the AI apparatus and the terminal respectively perform a part of the AI functions.

In some embodiments after step 903, the first terminal sends second information to the first network device. Subsequently, the first network device sends the second information to the AI apparatus. The second information indicates the split mode of the first AI task. For example, the second information includes an identifier of the split mode of the first AI task.

In some embodiments after step 903, the first terminal executes the first AI task based on the determined AI split mode.

For example, the first AI task includes an AI task of a load balancing function and an AI task of a network energy saving function. If the AI split mode determined by the first terminal is the mode in which a network device performs AI functions, the network device executes the first AI task. If the AI split mode determined by the first terminal is the mode in which the terminal performs the AI functions, the first terminal executes the first AI task. If the AI split mode determined by the first terminal is the mode in which the AI apparatus performs the AI functions, the AI apparatus executes the first AI task. If the AI split mode determined by the first terminal is the mode in which the AI apparatus and the network device respectively perform a part of the AI functions, the AI apparatus executes the AI task of the load balancing function, and the network device executes the AI task of the network energy saving function; or the AI apparatus executes the AI task of the network energy saving function, and the network device executes the AI task of the load balancing function. If the AI split mode determined by the first terminal is the mode in which the AI apparatus and the terminal respectively perform a part of the AI functions, the AI apparatus executes the AI task of the load balancing function, and the first terminal executes the AI task of the network energy saving function; or the AI apparatus executes the AI task of the network energy saving function, and the first terminal executes the AI task of the load balancing function. If the AI split mode determined by the first terminal is the mode in which the network device and the terminal respectively perform a part of the AI functions, the network device executes the AI task of the load balancing function, and the first terminal executes the AI task of the network energy saving function; or the network device executes the AI task of the network energy saving function, and the first terminal executes the AI task of the load balancing function.

In some embodiments the first terminal receives first configuration information from the first network device before executing the first AI task. The first configuration information is sent by the AI apparatus to the first network device. The first configuration information is configuration information for the first AI task.

Further, the first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task. For descriptions of the first configuration information, refer to the corresponding descriptions in step 401. Details are not described again.

According to the method shown in FIG. 9, the AI apparatus sends, to the first terminal through the first network device, the first information indicating the condition that is met by the terminal corresponding to each of the at least one AI split mode. After receiving the first information, the first terminal determines the split mode of the first AI task based on the first information. In this way, the first network device, the first terminal, and the AI apparatus executes the first AI task based on the determined AI split mode, to better collect the AI data, training data, inference data, or the like.

The method shown in FIG. 9 is a method for determining a split mode of an AI task by the first terminal. Alternatively, the AI apparatus determines the split mode of the AI task. For details, refer to the following method shown in FIG. 10.

Figure 10:
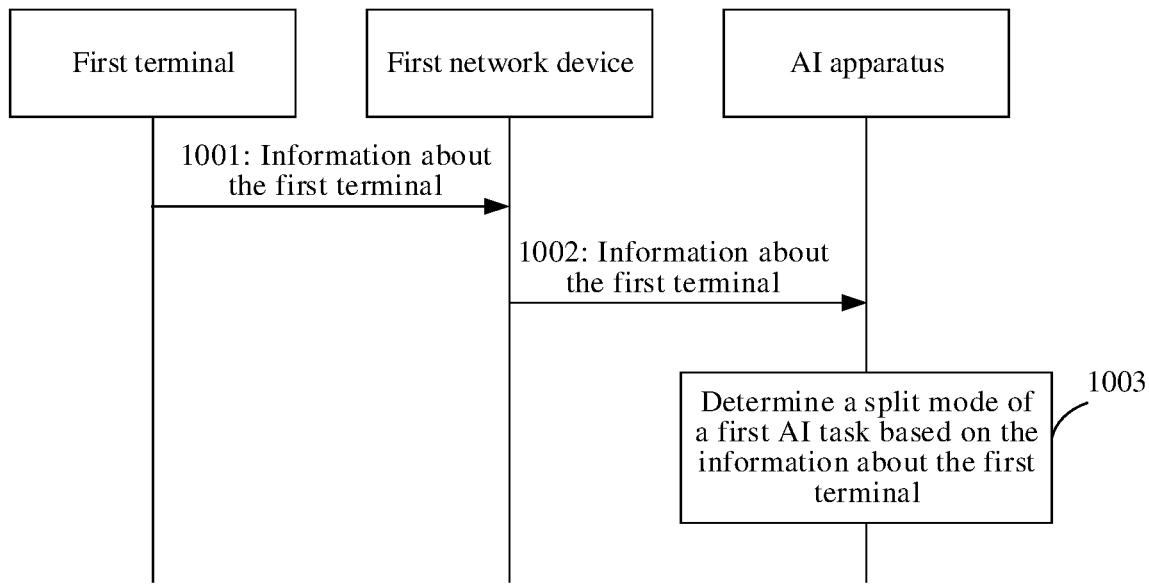

FIG. 10 shows another communication method according to some embodiments. The communication method includes step 1001 to step 1003.

Step 1001: A first terminal sends information about the first terminal to a first network device.

In some embodiments the first terminal sends the information about the first terminal to the first network device by using higher layer signaling, for example, an RRC message or a MAC message.

For descriptions of the information about the first terminal, refer to the descriptions in step 903. Details are not described again.

Correspondingly, the first network device receives the information about the first terminal from the first terminal.

Step 1002: The first network device sends the information about the first terminal to an AI apparatus.

The AI apparatus performs one or more AI functions, for example, a training function and an inference function. For descriptions of the training function and the inference function, refer to the corresponding descriptions in FIG. 1.

For descriptions of the AI apparatus, the first network device, and the first terminal, refer to the descriptions in step 301. Details are not described again.

Correspondingly, the AI apparatus receives the information about the first terminal from the first network device.

Step 1003: The AI apparatus determines a split mode of a first AI task based on the information about the first terminal.

In some embodiments that the AI apparatus determines a split mode of a first AI task based on the information about the first terminal includes: The AI apparatus determines the split mode of the first AI task based on the information about the first terminal and first information.

The first AI task is any AI task released by the AI apparatus. The first AI task includes an AI task of one or more network functions (or an AI model corresponding to the network function).

For descriptions of the first information, refer to the descriptions in step 901. Details are not described again.

For a process in which the AI apparatus determines the split mode of the first AI task based on the information about the first terminal and the first information, refer to the corresponding descriptions in step 903 in which the first terminal determines the split mode of the first AI task based on the first information and the information about the first terminal. Details are not described again.

In some embodiments after step 1003, the AI apparatus sends second information to the first network device. Subsequently, the first network device sends the second information to the first terminal. The second information indicates the split mode of the first AI task. For example, the second information includes an identifier of the split mode of the first AI task.

In some embodiments after step 1003, the AI apparatus executes the first AI task based on the determined AI split mode. For details, refer to the corresponding descriptions in step 903 in which the first terminal executes the first AI task based on the determined AI split mode.

In some embodiments the AI apparatus sends first configuration information to the first network device before executing the first AI task. Subsequently, the first network device sends the first configuration information to the first terminal. The first configuration information is configuration information for the first AI task.

Further, the first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task. For descriptions of the first configuration information, refer to the corresponding descriptions in step 401. Details are not described again.

According to the method shown in FIG. 10, the first terminal sends the information about the first terminal to the AI apparatus through the first network device. After receiving the information about the first terminal, the AI apparatus determines the split mode of the first AI task based on the information about the first terminal. In this way, the first network device, the first terminal, and the AI apparatus executes the first AI task based on the determined AI split mode, to better collect the AI data, training data, inference data, or the like.

The method shown in FIG. 9 is the method for determining a split mode of an AI task by the first terminal. The method shown in FIG. 10 is a method for determining a split mode of an AI task by the AI apparatus. Alternatively, the first network device determines the split mode of the AI task. For details, refer to the following method shown in FIG. 11.

Figure 11:
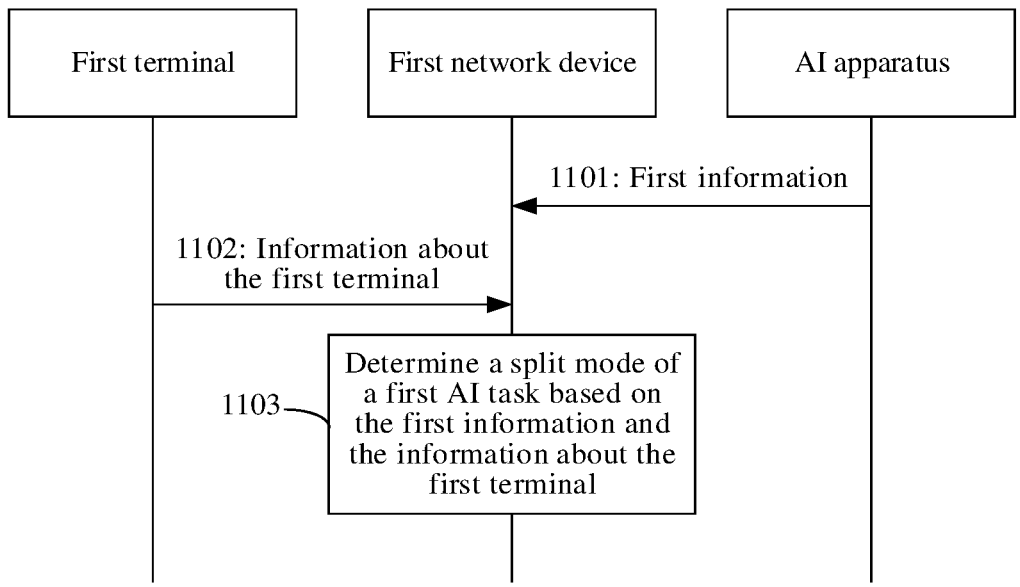

FIG. 11 shows another communication method according to some embodiments. The communication method includes step 1101 to step 1103.

Step 1101: An AI apparatus sends first information to a first network device.

The AI apparatus performs one or more AI functions, for example, a training function and an inference function. For descriptions of the training function and the inference function, refer to the corresponding descriptions in FIG. 1.

For descriptions of the AI apparatus, the first network device, and a first terminal, refer to the descriptions in step 301. For descriptions of the first information, refer to the descriptions in step 901. Details are not described again.

Optionally, the AI apparatus sends, to the first network device, information about an AI split mode supported by the AI apparatus. The information about the AI split mode supported by the AI apparatus indicates the AI split mode supported by the AI apparatus. In this way, the first network device and/or the first terminal determines the AI split mode supported by the AI apparatus, and the first network device further determines a split mode of an AI task based on the AI split mode supported by the AI apparatus.

In some embodiments, the information about the AI split mode supported by the AI apparatus may be sent before step 1101, may be sent after step 1101 and before step 1103, or may be sent simultaneously with the first information. This is not limited.

In some embodiments, at least one AI split mode in the first information may be the AI split mode supported by the AI apparatus.

Correspondingly, the first network device receives the first information from the AI apparatus.

Optionally, the first network device receives, from the AI apparatus, the information about the AI split mode supported by the AI apparatus.

Step 1102: The first terminal sends information about the first terminal to the first network device.

In some embodiments the first terminal sends the information about the first terminal to the first network device by using higher layer signaling, for example, an RRC message or a MAC message. The MAC message is a MAC CE. For descriptions of the information about the first terminal, refer to the descriptions in step 903. Details are not described again.

In some embodiments, a sequence of performing steps 1101 and 1102 is not limited in some embodiments. In other words, in the method shown in FIG. 11, step 1101 is performed before step 1102, or step 1102 is performed before step 1101. This is not limited.

Correspondingly, the first network device receives the information about the first terminal from the first terminal.

Step 1103: The first network device determines a split mode of a first AI task based on the first information and the information about the first terminal.

The first AI task is any AI task released by the AI apparatus. The first AI task includes an AI task of one or more network functions (or an AI model corresponding to the network function).

For a process in which the first network device determines the split mode of the first AI task based on the first information and the information about the first terminal, refer to the corresponding descriptions in step 903 in which the first terminal determines the split mode of the first AI task based on the first information and the information about the first terminal. Details are not described again.

In some embodiments after step 1103, the first network device sends second information to the first terminal and the AI apparatus. The second information indicates the split mode of the first AI task. For example, the second information includes an identifier of the split mode of the first AI task.

In some embodiments, the first network device simultaneously sends the second information to the first terminal and the AI apparatus. Alternatively, the first network device first sends the second information to the first terminal, and then send the second information to the AI apparatus. Alternatively, the first network device first sends the second information to the AI apparatus, and then send the second information to the first terminal.

In some embodiments after step 1103, the first network device executes the first AI task based on the determined AI split mode. For details, refer to the corresponding descriptions in step 903 in which the first terminal executes the first AI task based on the determined AI split mode. Details are not described again.

In some embodiments the first network device receives first configuration information from the AI apparatus before executing the first AI task. Subsequently, the first network device further sends the first configuration information to the first terminal. The first configuration information is configuration information for the first AI task.

Further, the first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task. For descriptions of the first configuration information, refer to the corresponding descriptions in step 401. Details are not described again.

According to the method shown in FIG. 11, the AI apparatus sends, to the first terminal through the first network device, the first information indicating a condition that is met by a terminal corresponding to each of the at least one AI split mode. After receiving the first information, the first terminal determines the split mode of the first AI task based on the first information. In this way, the first network device, the first terminal, and the AI apparatus executes the first AI task based on the determined AI split mode, to better collect the AI data, training data, inference data, or the like.

In some embodiments, when executing an AI task, the terminal are called to report collected AI data to the AI apparatus, so that the AI apparatus updates a model and so on based on AI data reported by a plurality of terminals.

When sending configuration information corresponding to the AI task to the network device, the AI apparatus further sends a priority of the AI task to the network device, so that the network device allocates, to the terminal based on the priority, a radio bearer (radio bearer, RB) and/or a channel for reporting the AI data. In this way, the terminal reports the AI data through the RB and/or the channel allocated by the network device.

Figure 12:
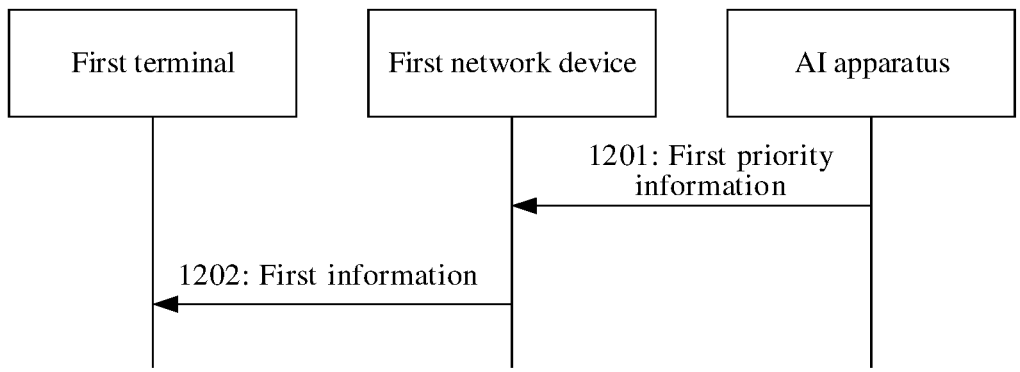

FIG. 12 shows another communication method according to some embodiments. The communication method includes step 1201 and step 1202.

Step 1201: An AI apparatus sends first priority information to a first network device.

The AI apparatus performs one or more AI functions, for example, a training function and an inference function. For descriptions of the training function and the inference function, refer to the corresponding descriptions in FIG. 1.

For descriptions of the AI apparatus, the first network device, and a first terminal, refer to the descriptions in step 301. Details are not described again.

The first priority information indicates a priority of a first AI task. For example, the first priority information includes an identifier of the priority of the first AI task. The first AI task is any AI task released by the AI apparatus. The first AI task includes an AI task of one or more network functions (or an AI model corresponding to the network function).

In some embodiments the first priority information and first configuration information are simultaneously sent. For descriptions of the first configuration information, refer to the corresponding descriptions in step 401. Details are not described again.

Correspondingly, the first network device receives the first priority information from the AI apparatus.

Step 1202: The first network device sends first information to the first terminal.

In some embodiments the first network device sends the first information to the first terminal by using higher layer signaling, for example, an RRC message or a MAC message, or physical layer signaling.

The first information indicates an RB and/or a channel. The RB and the channel carry data to be collected by the first terminal based on the first AI task.

In some embodiments, the RB is an AI data-dedicated RB, or is a common RB. The AI data-dedicated RB means that the RB carries data collected based on an AI task. In this case, the RB further is referred to as an AI dedicated radio bearer (AIRB). The common RB means that the RB carries various types of data, for example, AI data, user plane data, or control plane data. The common RB includes a data radio bearer (data radio bearer, DRB) and/or a signaling radio bearer (signaling radio bearer, SRB).

In some embodiments, the channel includes a physical uplink control channel (physical uplink control channel, PUCCH), a physical uplink shared channel (physical uplink share channel, PUSCH), or the like.

In some embodiments the first priority information corresponds to the RB and/or the channel.

For example, a correspondence between the priority of the first AI task and the RB and/or the channel is enumerated in Table 1. In Table 1, if the priority of the first AI task is a priority 1, the RB is an RB 1, and the channel is a channel 1. In other words, the data collected based on the first AI task is carried on the RB 1 and the channel 1. If the priority of the first AI task is a priority 2, the RB is an RB 2, and the channel is a channel 2. In other words, the data collected based on the first AI task is carried on the RB 2 and the channel 2. If the priority of the first AI task is a priority 3, the RB is an RB 3, and the channel is a channel 3. In other words, the data collected based on the first AI task is carried on the RB 3 and the channel 3.

TABLE 1

| Priority of the first AI task | RB | Channel |
|---|---|---|
| Priority 1 | RB 1 | Channel 1 |
| Priority 2 | RB 2 | Channel 2 |
| Priority 3 | RB 3 | Channel 3 |

The first information indicates the RB and/or the channel in the following two manners.

Manner 1: The First Information Includes the First Priority Information.

In this case, after receiving the first information, the first terminal determines the RB and/or the channel based on the first priority information. Subsequently, the first terminal sends, to the first network device through the determined RB and/or channel, the data collected based on the first AI task. After receiving the data, the first network device further sends the data to the AI apparatus.

The correspondence enumerated in Table 1 is used as an example. If the first information includes the priority 1, the first terminal determines that the RB is the RB 1 and the channel is the channel 1. If the first information includes the priority 2, the first terminal determines that the RB is the RB 2 and the channel is the channel 2. If the first information includes the priority 3, the first terminal determines that the RB is the RB 3 and the channel is the channel 3.

Manner 2: The First Information Indicates an Identifier of the RB and/or an Identifier of the Channel. For Example, the First Information Includes the Identifier of the RB and/or the Identifier of the Channel.

In this case, before step 1202, the first network device determines the RB and/or the channel based on the first priority information.

The correspondence enumerated in Table 1 is used as an example. If the first priority information includes the priority 1, the first network device determines that the RB is the RB 1 and the channel is the channel 1. If the first priority information includes the priority 2, the first network device determines that the RB is the RB 2 and the channel is the channel 2. If the first priority information includes the priority 3, the first network device determines that the RB is the RB 3 and the channel is the channel 3.

For the manner 2, after receiving the first information, the first terminal determines the RB and/or the channel based on the first information. Subsequently, the first terminal sends, to the first network device through the determined RB and/or channel, the data collected based on the first AI task. After receiving the data, the first network device further sends the data to the AI apparatus.

Correspondingly, the first terminal receives the first information from the first network device.

According to the method shown in FIG. 12, the AI apparatus sends, to the first network device, the first priority information indicating the priority of the first AI task. After receiving the first priority information, the first network device indicates, to the first terminal based on the first priority information, the RB and/or the channel carrying the data to be collected based on the first AI task. In this way, the first terminal and/or the first network device appropriately schedules the data collected based on the first AI task, to ensure transmission of data corresponding to a high-priority task.

Optionally, in a possible implementation of the method shown in FIG. 12, when an RB for transmitting the AI data is not set up between the first network device and the first terminal, or when the first terminal moves from coverage of a cell served by the first network device to coverage of another cell served by the first network device, the first terminal sends, to the first network device, request information for setting up an RB. Alternatively, when the first terminal moves from coverage of a first cell served by the first network device to coverage of a second cell served by a second network device, the first terminal sends, to the second network device, request information for setting up an RB.

In some embodiments, An operation of "move" in some embodiments includes cell selection, connection reestablishment, connection restoration, connection establishment, cell handover, or another behavior that may cause the terminal to move from coverage of a cell to coverage of another cell.

The second network device is different from the first network device, and is a device that has currently established a connection to the first terminal. The communication system shown in FIG. 1 is used as an example. The first network device may be the network device 101, the second network device may be the network device 102, and the first terminal may be the terminal 103 or the terminal 104. If the terminal 103 or the terminal 104 is disconnected from the network device 101, and establishes a connection to the network device 102, the terminal 103 or the terminal 104 sends, to the network device 102, request information for setting up an RB.

The following provides descriptions by using an example in which the first terminal sends, to the first network device, the request information for setting up an RB. For a process in which the first terminal sends, to the second network device, the request information for setting up an RB, refer to descriptions of the example in which the first terminal sends, to the first network device, the request information for setting up an RB. Details are not described again.

Figure 13:
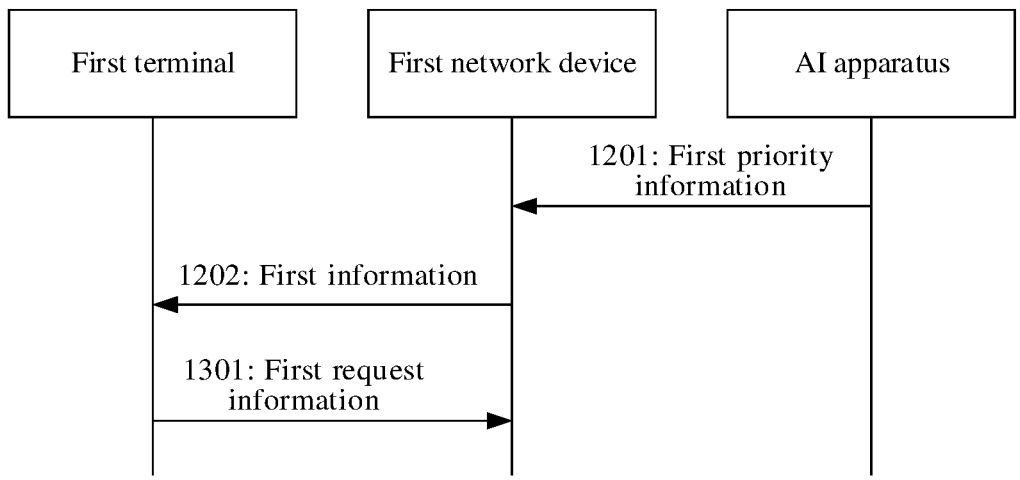

As shown in FIG. 13, the method shown in FIG. 12 further includes step 1301.

Step 1301: The first terminal sends first request information to the first network device.

The first request information is for setting up the RB. In this way, after receiving the first request information, the first network device sets up the RB based on the first request information.

In some embodiments the first request information includes at least one of the following information: indication information indicating that the first terminal needs to report AI data, indication information indicating an AI task type corresponding to the AI data that needs to be reported by the first terminal, type information of the RB, or priority information corresponding to the AI data.

The indication information indicating that the first terminal needs to report AI data includes one bit. When the bit includes 1 or 0, the indication information indicates that the first terminal needs to report the AI data. Subsequently, the first network device sets up the RB based on the indication information. For example, the first network device determines, based on the indication information, that the first terminal needs to report the AI data, determines the priority of the first AI task to be executed by the first terminal, and sets up the RB based on the priority. The indication information indicating an AI task type corresponding to the AI data that needs to be reported by the first terminal indicates the AI task type corresponding to the AI data that needs to be reported. The AI task type includes one or more of the following: data collection, model release, model training, inference result release, and the like. For example, the indication information indicating an AI task type corresponding to the AI data that needs to be reported by the first terminal includes an identifier of the AI task type corresponding to the AI data that needs to be reported by the first terminal. Subsequently, the first network device sets up the RB based on the indication information.

The type information of the RB indicates a type of the RB. Types of RBs include an AI data-dedicated RB and a common RB. Subsequently, the first network device sets up the RB based on the type information of the RB. For example, if the type information of the RB indicates that the type of the RB is the AI data-dedicated RB, the first network device sets up the AI data-dedicated RB. If the type information of the RB indicates that the type of the RB is the common RB, the first network device sets up the common RB.

The priority information corresponding to the AI data indicates a priority of the AI data. The AI data is data collected based on the first AI task. The priority of the AI data corresponds to the priority of the first AI task. In this way, after receiving the priority information corresponding to the AI data, the first network device sets up the RB based on the priority information corresponding to the AI data.

According to the method shown in FIG. 13, when the RB for transmitting the AI data is not set up between the first network device and the first terminal, or when the first terminal moves from coverage of a cell served by the first network device to coverage of another cell served by the first network device, the first terminal sends, to the first network device, the first request information for setting up the RB, so that the first network device sets up the RB based on the first request information.

In the method shown in FIG. 12 or FIG. 13, the first network device explicitly indicates the RB and/or the channel to the first terminal by using the first information. Alternatively, the first network device may implicitly indicate the RB and/or the channel to the first terminal.

Figure 14:
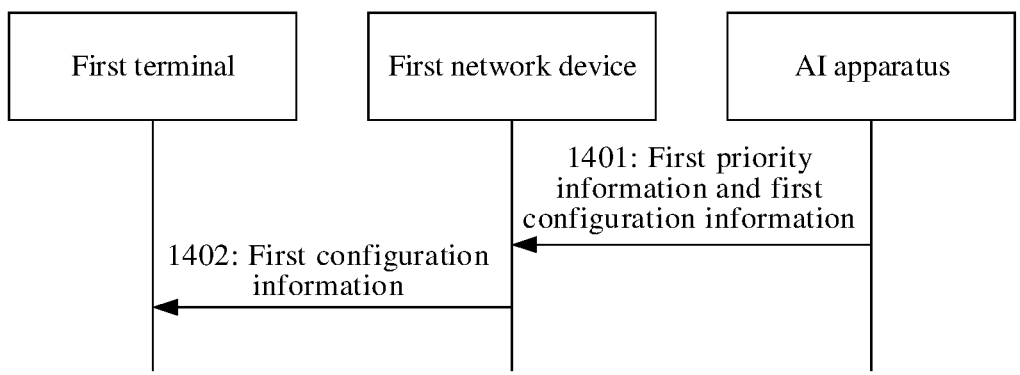

FIG. 14 shows another communication method according to some embodiments. The communication method includes step 1401 and step 1402.

Step 1401: An AI apparatus sends first priority information and first configuration information to a first network device.

For a process in which the AI apparatus sends the first priority information to the first network device, refer to the descriptions in step 1201. For descriptions of the first configuration information, refer to the descriptions in step 401. Details are not described again.

In some embodiments, the AI apparatus first sends the first priority information to the first network device, and then send the first configuration information to the first network device. Alternatively, the AI apparatus first sends the first configuration information to the first network device, and then send the first priority information to the first network device. Alternatively, the AI apparatus simultaneously sends the first priority information and the first configuration information to the first network device.

Correspondingly, the first network device receives the first priority information and the first configuration information from the AI apparatus.

Step 1402: The first network device sends the first configuration information to a first terminal through an RB and/or a channel.

In some embodiments the first priority information corresponds to the RB and/or the channel. For descriptions of the RB and the channel, refer to the descriptions in step 1202.

In some embodiments that the first network device sends the first configuration information to a first terminal through an RB and/or a channel includes: The first network device determines the RB and/or the channel based on the first priority information, and sends the first configuration information to the first terminal through the RB and/or the channel. For a process in which the first network device determines the RB and/or the channel based on the first priority information, refer to the descriptions in step 1202.

Correspondingly, the first terminal receives the first configuration information from the first network device through the RB and/or the channel.

In some embodiments, after receiving the first configuration information through the RB and/or the channel, the first terminal determines to subsequently send, to the first network device through the RB and/or the channel, data collected based on a first AI task. After receiving the data, the first network device further sends the data to the AI apparatus.

According to the method shown in FIG. 14, the AI apparatus sends, to the first network device, the first priority information indicating a priority of the first AI task and the first configuration information. After receiving the first priority information and the first configuration information, the first network device determines the RB and/or the channel based on the first priority information, and send the first configuration information to the first terminal through the RB and/or the channel. After receiving the first configuration information through the RB and/or the channel, the first terminal determines to subsequently send, to the first network device through the RB and/or the channel, the data collected based on the first AI task. In this way, the first terminal and/or the first network device appropriately schedules the data collected based on the first AI task, to ensure transmission of data corresponding to a high-priority task.

Optionally, in a possible implementation of the method shown in FIG. 14, when an RB for transmitting AI data is not set up between the first network device and the first terminal, or when the first terminal moves from coverage of a cell served by the first network device to coverage of another cell served by the first network device, the first terminal sends, to the first network device, request information for setting up an RB. Alternatively, when the first terminal moves from coverage of a first cell served by the first network device to coverage of a second cell served by a second network device, the first terminal sends, to the second network device, request information for setting up an RB.

The second network device is different from the first network device, and is a device that has currently established a connection to the first terminal. The communication system shown in FIG. 1 is used as an example. The first network device may be the network device 101, the second network device may be the network device 102, and the first terminal may be the terminal 103 or the terminal 104. If the terminal 103 or the terminal 104 is disconnected from the network device 101, and establishes a connection to the network device 102, the terminal 103 or the terminal 104 sends, to the network device 102, request information for setting up an RB. The following provides descriptions by using an example in which the first terminal sends, to the first network device, the request information for setting up an RB. For a process in which the first terminal sends, to the second network device, the request information for setting up an RB, refer to descriptions of the example in which the first terminal sends, to the first network device, the request information for setting up an RB. Details are not described again.

Figure 15:
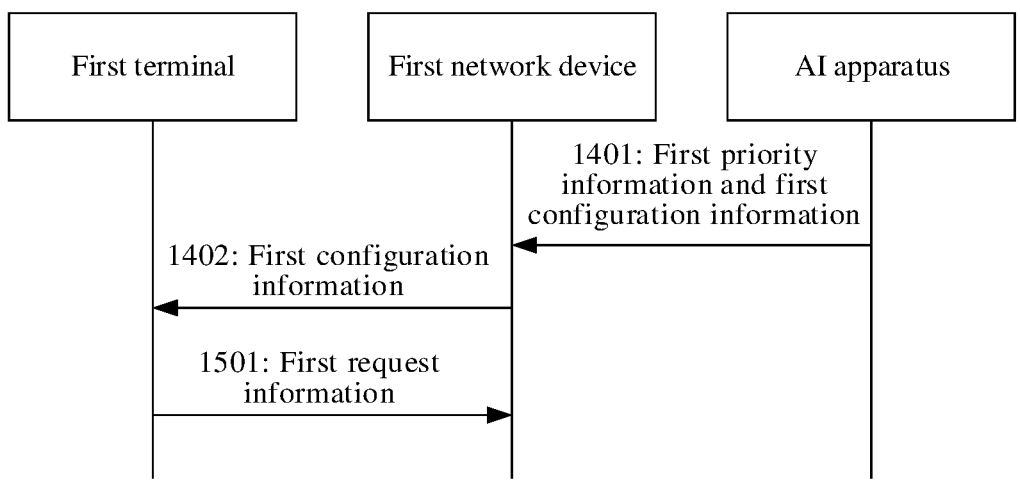

As shown in FIG. 15, the method shown in FIG. 14 further includes step 1501.

Step 1501: The first terminal sends first request information to the first network device.

For descriptions of step 1501, refer to the descriptions of step 1301. Details are not described again.

According to the method shown in FIG. 15, when the RB for transmitting AI data is not set up between the first network device and the first terminal, or when the first terminal moves from coverage of a cell served by the first network device to coverage of another cell served by the first network device, the first terminal sends, to the first network device, the first request information for setting up the RB, so that the first network device sets up the RB based on the first request information.

In some embodiments, the terminal has mobility. Therefore, the terminal may move from coverage of a cell to coverage of another cell. If the terminal receives configuration information for an AI task in coverage of a cell served by the $1^{st}$ network device, and receives configuration information for another AI task after moving to coverage of a cell served by the $2^{nd}$ network device, how the terminal processes the configuration information received twice is an urgent problem to be resolved.

Figure 16:
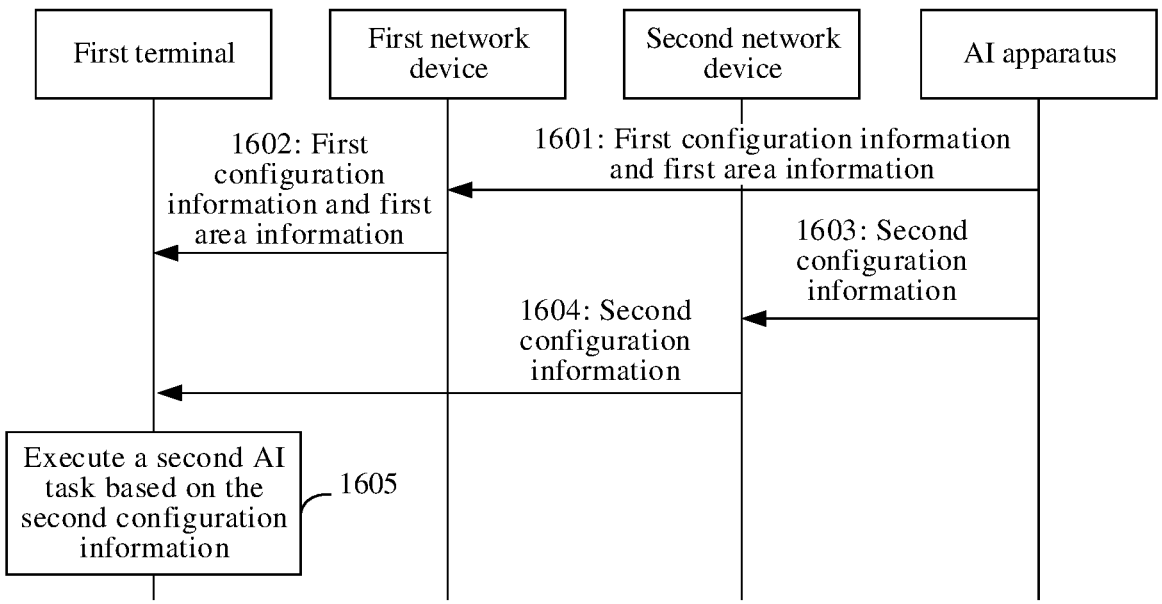

To resolve the foregoing problem, some embodiments provide another communication method. Specifically, as shown in FIG. 16, the method includes step 1601 to step 1605.

Step 1601: An AI apparatus sends first configuration information and first area information to a first network device.

For descriptions of the AI apparatus, the first network device, and a first terminal, refer to the descriptions in step 301. For descriptions of the first configuration information, refer to the descriptions in step 401. Details are not described again.

The first area information indicates an area to which the first configuration information is applicable. The area includes at least one cell. For example, the area includes a cell 1 and a cell 2. The cell 1 is a cell served by the first network device or a second network device. The cell 2 is a cell served by the first network device or the second network device. The second network device and the first network device is the same, or is different. The cell 1 and the cell 2 are different. In some embodiments, an example in which the second network device is different from the first network device is used for description. For example, if the first network device is the network device 101 in FIG. 1, the second network device is the network device 102 in FIG. 1. If the first network device is the network device 102 in FIG. 1, the second network device is the network device 101 in FIG. 1.

In some embodiments the first area information includes an identifier of the area to which the first configuration information is applicable. The identifier of the area includes at least one of a cell identifier, a tracking area code (tracking area code, TAC), a radio access network area code (radio access network area code, RANAC), an AI area code, an operator identifier, or another area identifier. The operator identifier includes at least one of a non-public network identifier (non-public network identifier, NPN ID), a non-terrestrial network identifier (non-terrestrial network identifier, NTN ID), or a public land mobile network identifier (public land mobile network identifier, PLMN ID).

Correspondingly, the first network device receives the first configuration information and the first area information from the AI apparatus.

Step 1602: The first network device sends the first configuration information and the first area information to the first terminal.

In some embodiments the first network device sends the first configuration information and the first area information to the first terminal by using higher layer signaling, for example, an RRC message or a MAC message, physical layer signaling, or a system message.

In some embodiments the first network device sends the first configuration information and the first area information to the first terminal through a first cell served by the first network device. Further, the area indicated by the first area information includes the first cell.

Correspondingly, the first terminal receives the first configuration information and the first area information from the first network device.

Step 1603: The AI apparatus sends second configuration information to the second network device.

The second network device is a device that has currently established a connection to the first terminal. To be specific, after step 1602, the first terminal is disconnected from the first network device, and establishes a connection to the second network device. In some embodiments if the first network device is the same as the second network device, after step 1602, the first terminal is disconnected from the first cell served by the first network device, and establishes a connection to the second cell served by the first network device. In other words, after step 1602, the first terminal is handed over from the first cell served by the first network device to the second cell served by the first network device.

The second configuration information indicates configuration information for a second AI task. The second AI task may be the same as or different from a first AI task. If the second AI task is the same as the first AI task, the second configuration information may be understood as configuration information obtained through updating on the first configuration information. The second AI task or the first AI task is any AI task released by the AI apparatus. The first AI task and the second AI task includes an AI task of one or more network functions (or an AI model corresponding to the network function).

In some embodiments the AI apparatus sends first indication information to the second network device. The first indication information indicates a processing manner of the first terminal for the first AI task corresponding to the first configuration information. In some embodiments, the first indication information in the embodiment shown in FIG. 16 has a different meaning from the first indication information in the embodiments shown in FIG. 3 to FIG. 8. The same name is used due to sequential numbering in different embodiments. In some embodiments when the embodiment shown in FIG. 16 is combined with the embodiments shown in FIG. 3 to FIG. 8, one of the first indication information in the embodiment shown in FIG. 16 and the first indication information in the embodiments shown in FIG. 3 to FIG. 8 is referred to as first indication information, and the other is referred to as second indication information.

The processing manner includes suspending execution of the first AI task corresponding to the first configuration information, releasing the first AI task, or continuing execution of the first AI task. Subsequently, the second network device sends the first indication information to the first terminal. In this way, the first terminal executes, based on the first indication information, the first AI task corresponding to the first configuration information.

For example, if the first indication information indicates to suspend the execution of the first AI task corresponding to the first configuration information, the first terminal suspends the execution of the first AI task corresponding to the first configuration information. In this case, the first terminal deletes data collected when the first terminal executes the first AI task based on the first configuration information, or stores the data. If the first indication information indicates to release the first AI task corresponding to the first configuration information, the first terminal releases the first AI task corresponding to the first configuration information. If the first indication information indicates to continue the execution of the first AI task corresponding to the first configuration information, the first terminal continues the execution of the first AI task corresponding to the first configuration information.

In some embodiments, for the case in which the first terminal suspends the execution of the first AI task corresponding to the first configuration information, the first terminal subsequently restarts the first AI task corresponding to the first configuration information. For example, after the first terminal moves from an area to which the second configuration information is applicable to another area, after the first terminal completes executing the second AI task based on the second configuration information, or after the first terminal receives restart indication information, the first terminal restarts the first AI task corresponding to the first configuration information. In this case, the first terminal continues to execute the first AI task corresponding to the first configuration information, without sending of the first configuration information to the first terminal again by the AI apparatus, to reduce signaling overheads.

Correspondingly, the second network device receives the second configuration information from the AI apparatus.

Step 1604: The second network device sends the second configuration information to the first terminal.

In some embodiments the second network device sends the second configuration information to the first terminal by using higher layer signaling, for example, an RRC message or a MAC message, physical layer signaling, or a system message.

In some embodiments the second network device sends the second configuration information to the first terminal through a second cell served by the second network device. Further, the area indicated by the first area information includes the second cell. The second cell is different from the first cell.

Correspondingly, the first terminal receives the second configuration information from the second network device.

Step 1605: The first terminal executes the second AI task based on the second configuration information.

In some embodiments the first terminal deletes the first configuration information, and executes the second AI task based on the second configuration information. In this case, the second AI task is the same as the first AI task. For example, a task type of the first AI task is the same as a task type of the second AI task; a network function corresponding to the first AI task is the same as a network function corresponding to the second AI task; a split mode of the first AI task is the same as a split mode of the second AI task; a task type of the first AI task is the same as a task type of the second AI task, and a network function of the first AI task is the same as a network function of the second AI task; or a task type of the first AI task is the same as a task type of the second AI task, a network function of the first AI task is the same as a network function of the second AI task, and a split mode of the first AI task is the same as a split mode of the second AI task.

In some embodiments the first terminal updates the first configuration information based on the second configuration information. In this case, the second AI task is the same as the first AI task.

For example, the first configuration information includes information about AI data that needs to be collected by a terminal that is to execute the first AI task and a data reporting manner of the first AI task. If the information about the AI data that needs to be collected by the terminal that is to execute the first AI task needs to be updated, the second configuration information includes updated information about AI data that needs to be collected by the terminal that is to execute the first AI task, and the first terminal updates, based on the second configuration information when receiving the second configuration information, the information about the AI data that needs to be collected by the terminal that is to execute the first AI task in the first configuration information to the updated information about the AI data that needs to be collected by the terminal that is to execute the first AI task included in the second configuration information. If the data reporting manner of the first AI task needs to be updated, the second configuration information includes an updated data reporting manner of the first AI task, and the first terminal updates, based on the second configuration information when receiving the second configuration information, the data reporting manner of the first AI task in the first configuration information to the updated data reporting manner of the first AI task included in the second configuration information.

In some embodiments the first terminal executes the second AI task based on the second configuration information, and processes, based on the first indication information, the first AI task corresponding to the first configuration information. In this case, the second AI task is the same as or different from the first AI task.

According to the method shown in FIG. 16, after receiving the second configuration information, the first terminal flexibly processes the first AI task corresponding to the first configuration information and the second AI task corresponding to the second configuration information.

The methods provided in some embodiments are combined with each other. For example, the methods shown in FIG. 3 to FIG. 8, the methods shown in FIG. 9 to FIG. 11, the methods shown in FIG. 12 to FIG. 15, and the method shown in FIG. 16 is combined with each other. For example, the method shown in FIG. 3 and the method shown in FIG. 9 are combined with each other. Step 301 to step 303 is first performed, and then step 901 to step 903 are performed. Alternatively, step 901 to step 903 is first performed, and then step 301 to step 303 are performed. Alternatively, step 301 to step 303 is simultaneously performed with step 901 to step 903.

The methods provided in some embodiments are described from a perspective of interaction between the first network device, the first terminal, the AI apparatus, and the second network device. To implement functions in the foregoing methods provided in some embodiments, the first network device, the first terminal, the AI apparatus, and the second network device each includes a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on an application and a design constraint of the technical solutions.

Division into modules in some embodiments is an example, is logical function division, and is other division during implementation. In addition, functional modules in some embodiments are integrated into one processor, each of the modules exists alone physically, or two or more modules are integrated into one module. The integrated module is implemented by hardware, or is implemented by a software functional module.

Figure 17:
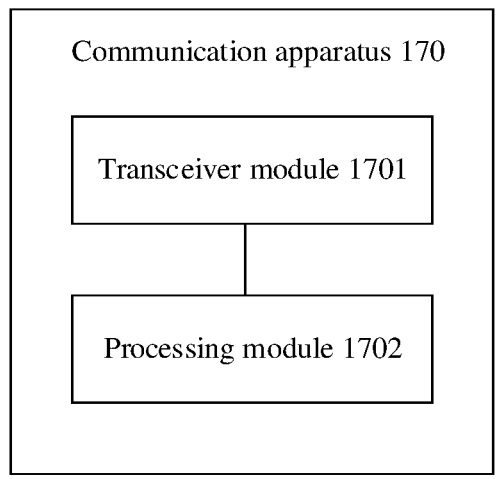
FIG. 17 to FIG. 19 each are a schematic diagram of a structure of a communication apparatus according to some embodiments.

For example, when each functional module is obtained through division in an integrated manner, FIG. 17 is a schematic diagram of a structure of a communication apparatus 170. The communication apparatus 170 includes a transceiver module 1701 and a processing module 1702.

For example, the communication apparatus 170 is configured to implement a function of a first network device. For example, the first network device is the first network device described in the embodiment shown in FIG. 3 or the embodiment shown in FIG. 4.

The communication apparatus 170 is the first network device, a chip used in the first network device, or another combined device or a component that has the function of the first network device. The transceiver module 1701 is a communication interface. The processing module 1702 is a processor (or a processing circuit), for example, a baseband processor. The baseband processor includes one or more CPUs.

The transceiver module 1701 in some embodiments is implemented by a transceiver or a transceiver-related circuit component, and the processing module 1702 is implemented by a processor or a processor-related circuit component (or referred to as a processing circuit).

For example, the transceiver module 1701 is configured to perform receiving and sending operations performed by the first network device in the embodiment shown in FIG. 3, for example, step 301 and step 302, and/or configured to support another process of the technology described in some embodiments. The processing module 1702 is configured to perform operations, except the receiving and sending operations, performed by the first network device in the embodiment shown in FIG. 3, for example, step 303, and/or configured to support another process of the technology described in some embodiments.

For another example, the transceiver module 1701 is configured to perform receiving and sending operations performed by the first network device in the embodiment shown in FIG. 4, for example, step 301, step 302, step 401, and step 402, and/or configured to support another process of the technology described in some embodiments.

The transceiver module 1701 is configured to receive first information from an AI apparatus. The first information indicates information about a terminal capable of executing a first AI task.

The transceiver module 1701 is further configured to receive information from a first terminal.

The processing module 1702 is configured to determine, based on the first information and the information about the first terminal, whether the first terminal is capable of executing the first AI task.

In some embodiments the transceiver module 1701 is further configured to receive first configuration information from the AI apparatus.

In some embodiments the transceiver module 1701 is further configured to send first indication information to the first terminal and/or the AI apparatus. The first indication information indicates whether the first terminal is capable of executing the first AI task.

When the communication apparatus 170 is configured to implement the function of the first network device, for another function that is implemented by the communication apparatus 170, refer to the related descriptions of the embodiment shown in FIG. 3 or the method embodiment shown in FIG. 4. Details are not described again.

Alternatively, for example, the communication apparatus 170 is configured to implement a function of an AI apparatus. For example, the communication apparatus 170 is the AI apparatus described in the embodiment shown in FIG. 5 or the embodiment shown in FIG. 6.

The communication apparatus 170 is the AI apparatus, a chip used in the AI apparatus, or another combined device or a component that has the function of the AI apparatus. The transceiver module 1701 is a communication interface. The processing module 1702 is a processor (or a processing circuit), for example, a baseband processor. The baseband processor includes one or more CPUs.

For example, the transceiver module 1701 is configured to perform receiving and sending operations performed by the AI apparatus in the embodiment shown in FIG. 5, for example, step 502, and/or configured to support another process of the technology described in some embodiments. The processing module 1702 is configured to perform operations, except the receiving and sending operations, performed by the AI apparatus in the embodiment shown in FIG. 5, for example, step 503, and/or configured to support another process of the technology described in some embodiments.

For another example, the transceiver module 1701 is configured to perform receiving and sending operations performed by the AI apparatus in the embodiment shown in FIG. 6, for example, step 502 and step 601, and/or configured to support another process of the technology described in some embodiments.

The transceiver module 1701 is configured to receive information about a first terminal from a first network device.

The processing module 1702 is configured to determine, based on the information about the first terminal, whether the first terminal is capable of executing a first AI task.

In some embodiments the processing module 1702 is configured to determine, based on the information about the first terminal and first information, whether the first terminal is capable of executing the first AI task. The first information indicates information about a terminal capable of executing the first AI task.

In some embodiments the transceiver module 1701 is further configured to send first indication information to the first network device. The first indication information indicates whether the first terminal is capable of executing the first AI task.

In some embodiments in response to determining that the first terminal is capable of executing the first AI task, the transceiver module 1701 is further configured to send first configuration information to the first network device. The first configuration information includes at least one of the following information: an identifier of the first AI task, information about AI data that needs to be collected by a terminal that is to execute the first AI task, a data reporting manner of the first AI task, or information about an AI model used by the terminal that is to execute the first AI task.

When the communication apparatus 170 is configured to implement the function of the AI apparatus, for another function that is implemented by the communication apparatus 170, refer to the related descriptions of the embodiment shown in FIG. 5 or the method embodiment shown in FIG. 6. Details are not described again.

Alternatively, for example, the communication apparatus 170 is configured to implement a function of a first terminal. For example, the first terminal is the first terminal described in the embodiment shown in FIG. 7 or the embodiment shown in FIG. 8.

The communication apparatus 170 is the first terminal, a chip used in the first terminal, or another combined device or a component that has the function of the first terminal. The transceiver module 1701 is a communication interface. The processing module 1702 is a processor (or a processing circuit), for example, a baseband processor. The baseband processor includes one or more CPUs.

For example, the transceiver module 1701 is configured to perform receiving and sending operations performed by the first terminal in the embodiment shown in FIG. 7, for example, step 702, and/or configured to support another process of the technology described in some embodiments. The processing module 1702 is configured to perform operations, except the receiving and sending operations, performed by the first terminal in the embodiment shown in FIG. 7, for example, step 703, and/or configured to support another process of the technology described in some embodiments.

For another example, the transceiver module 1701 is configured to perform receiving and sending operations performed by the first terminal in the embodiment shown in FIG. 8, for example, step 702 and step 802, and/or configured to support another process of the technology described in some embodiments.

The transceiver module 1701 is configured to receive first information from a first network device. The first information indicates at least one of the following information about a terminal capable of executing a first artificial intelligence AI task: type information of the terminal, information about a moving speed of the terminal, information about a computing capability level of the terminal, electric-quantity information of the terminal, latency information of the terminal, signal quality threshold information of the terminal, information about a memory size of the terminal, information about a remaining memory size of the terminal, information about an AI task type supported by the terminal, information about a network function supported by the terminal and implementable through AI, and information about an AI algorithm supported by the terminal.

The processing module 1702 is configured to determine, based on the first information, whether the first terminal is capable of executing the first AI task.

In some embodiments the processing module 1702 is configured to determine, based on the first information and information about the first terminal, whether the first terminal is capable of executing the first AI task.

In some embodiments the transceiver module 1701 is further configured to send first indication information to the first network device. The first indication information indicates whether the first terminal is capable of executing the first AI task.

In some embodiments the transceiver module 1701 is further configured to receive first configuration information from the first network device. The first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task.

When the communication apparatus 170 is configured to implement the function of the first terminal, for another function that is implemented by the communication apparatus 170, refer to the related descriptions of the embodiment shown in FIG. 7 or the method embodiment shown in FIG. 8. Details are not described again.

Alternatively, for example, the communication apparatus 170 is configured to implement a function of a first terminal. For example, the first terminal is the first terminal described in the embodiment shown in FIG. 9.

The communication apparatus 170 is the first terminal, a chip used in the first terminal, or another combined device or a component that has the function of the first terminal. The transceiver module 1701 is a communication interface. The processing module 1702 is a processor (or a processing circuit), for example, a baseband processor. The baseband processor includes one or more CPUs.

For example, the transceiver module 1701 is configured to perform receiving and sending operations performed by the first terminal in the embodiment shown in FIG. 9, for example, step 902, and/or configured to support another process of the technology described in some embodiments. The processing module 1702 is configured to perform operations, except the receiving and sending operations, performed by the first terminal in the embodiment shown in FIG. 9, for example, step 903, and/or configured to support another process of the technology described in some embodiments.

The transceiver module 1701 is configured to receive first information from a first network device. The first information indicates a condition that is met by a terminal corresponding to each of at least one AI split mode, and the at least one AI split mode includes at least one of the following modes: a mode in which a network device performs AI functions, a mode in which the terminal performs the AI functions, a mode in which an AI apparatus performs the AI functions, a mode in which the AI apparatus and the network device respectively perform a part of the AI functions, a mode in which the AI apparatus and the terminal respectively perform a part of the AI functions, a mode in which the network device and the terminal respectively perform a part of the AI functions, or a mode in which the network device, the AI apparatus, and the terminal respectively perform a part of the AI functions.

The processing module 1702 is configured to determine a split mode of a first AI task based on the first information.

In some embodiments the processing module 1702 is configured to determine the split mode of the first AI task based on the first information and information about the first terminal.

In some embodiments the transceiver module 1701 is further configured to send second information to the first network device. The second information indicates the split mode of the first AI task.

In some embodiments the transceiver module 1701 is further configured to receive, from the first network device, information about an AI split mode supported by the AI apparatus.

In some embodiments the transceiver module 1701 is further configured to receive first configuration information from the first network device. The first configuration information is configuration information for the first AI task. The first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task.

When the communication apparatus 170 is configured to implement the function of the first terminal, for another function that is implemented by the communication apparatus 170, refer to the related descriptions of the method embodiment shown in FIG. 9. Details are not described again.

Alternatively, for example, the communication apparatus 170 is configured to implement a function of an AI apparatus. For example, the communication apparatus 170 is the AI apparatus described in the embodiment shown in FIG. 10.

The communication apparatus 170 is the AI apparatus, a chip used in the AI apparatus, or another combined device or a component that has the function of the AI apparatus. The transceiver module 1701 is a communication interface. The processing module 1702 is a processor (or a processing circuit), for example, a baseband processor. The baseband processor includes one or more CPUs.

For example, the transceiver module 1701 is configured to perform receiving and sending operations performed by the AI apparatus in the embodiment shown in FIG. 10, for example, step 1002, and/or configured to support another process of the technology described in some embodiments. The processing module 1702 is configured to perform operations, except the receiving and sending operations, performed by the AI apparatus in the embodiment shown in FIG. 10, for example, step 1003, and/or configured to support another process of the technology described in some embodiments.

The transceiver module 1701 is configured to receive information about a first terminal from a first network device.

The processing module 1702 is configured to determine a split mode of a first AI task based on the information about the first terminal.

In some embodiments the processing module 1702 is configured to determine the split mode of the first AI task based on the information about the first terminal and first information. The first information indicates a condition that is met by a terminal corresponding to each of the AI split modes.

In some embodiments the transceiver module 1701 is further configured to send second information to the first network device, where the second information indicates the split mode of the first AI task.

In some embodiments the transceiver module 1701 is further configured to send first configuration information to the first network device. The first configuration information is configuration information corresponding to the split mode of the first AI task. The first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task.

When the communication apparatus 170 is configured to implement the function of the AI apparatus, for another function that is implemented by the communication apparatus 170, refer to the related descriptions of the method embodiment shown in FIG. 10. Details are not described again.

Alternatively, for example, the communication apparatus 170 is configured to implement a function of a first network device. For example, the communication apparatus 170 is the first network device described in the embodiment shown in FIG. 11.

The communication apparatus 170 is the first network device, a chip used in the first network device, or another combined device or a component that has the function of the first network device. The transceiver module 1701 is a communication interface. The processing module 1702 is a processor (or a processing circuit), for example, a baseband processor. The baseband processor includes one or more CPUs.

For example, the transceiver module 1701 is configured to perform receiving and sending operations performed by the first network device in the embodiment shown in FIG. 11, for example, step 1101 and step 1102, and/or configured to support another process of the technology described in some embodiments. The processing module 1702 is configured to perform operations, except the receiving and sending operations, performed by the first network device in the embodiment shown in FIG. 11, for example, step 1103, and/or configured to support another process of the technology described in some embodiments.

The transceiver module 1701 is configured to receive first information from an AI apparatus.

The transceiver module 1701 is further configured to receive information from a first terminal.

The processing module 1702 is configured to determine a split mode of a first AI task based on the first information and the information about the first terminal.

In some embodiments the information about the first terminal includes at least one of the following information: information about an AI split mode supported by the first terminal, information about a computing capability level of the first terminal, electric-quantity information of the first terminal, type information of the first terminal, information about a memory size of the first terminal, or authorization condition information of the first terminal.

In some embodiments the transceiver module 1701 is further configured to send second information to the AI apparatus and the first terminal, where the second information indicates the split mode of the first AI task.

In some embodiments the transceiver module 1701 is further configured to receive, from the AI apparatus, information about an AI split mode supported by the AI apparatus.

In some embodiments the transceiver module 1701 is further configured to receive first configuration information from the AI apparatus. The first configuration information is configuration information corresponding to the split mode of the first AI task. The first configuration information includes at least one of the following information: an identifier of the first AI task, a reporting manner of the first AI task, information about AI data that needs to be collected by a terminal that is to execute the first AI task, or information about an AI model used by the terminal that is to execute the first AI task.

When the communication apparatus 170 is configured to implement the function of the first network device, for another function that is implemented by the communication apparatus 170, refer to the related descriptions of the method embodiment shown in FIG. 11. Details are not described again.

Alternatively, for example, the communication apparatus 170 is configured to implement a function of a first terminal.

For example, the communication apparatus 170 is the first terminal described in the embodiment shown in FIG. 16.

The communication apparatus 170 is the first terminal, a chip used in the first terminal, or another combined device or a component that has the function of the first terminal. The transceiver module 1701 is a communication interface. The processing module 1702 is a processor (or a processing circuit), for example, a baseband processor. The baseband processor includes one or more CPUs.

For example, the transceiver module 1701 is configured to perform receiving and sending operations performed by the first terminal in the embodiment shown in FIG. 16, for example, step 1602 and step 1604, and/or configured to support another process of the technology described in some embodiments. The processing module 1702 is configured to perform operations, except the receiving and sending operations, performed by the first terminal in the embodiment shown in FIG. 16, for example, step 1605, and/or configured to support another process of the technology described in some embodiments.

The transceiver module 1701 is configured to receive first configuration information and first area information from a first network device. The first configuration information is configuration information for a first AI task, and the first area information indicates an area to which the first configuration information is applicable.

The transceiver module 1701 is further configured to receive second configuration information from a second network device. The second configuration information indicates configuration information for a second AI task, and the second AI task is the same as or different from the first AI task.

The processing module 1702 is configured to execute the second AI task based on the second configuration information.

In some embodiments the transceiver module 1701 is further configured to receive first indication information from the second network device. The first indication information indicates a processing manner of the first AI task corresponding to the first configuration information, and the processing manner includes suspending execution of the first AI task, releasing the first AI task, or continuing execution of the first AI task. The processing module 1702 is further configured to execute, based on the first indication information, the first AI task corresponding to the first configuration information.

When the communication apparatus 170 is configured to implement the function of the first terminal, for another function that is implemented by the communication apparatus 170, refer to the related descriptions of the method embodiment shown in FIG. 16. Details are not described again.

Figure 18:
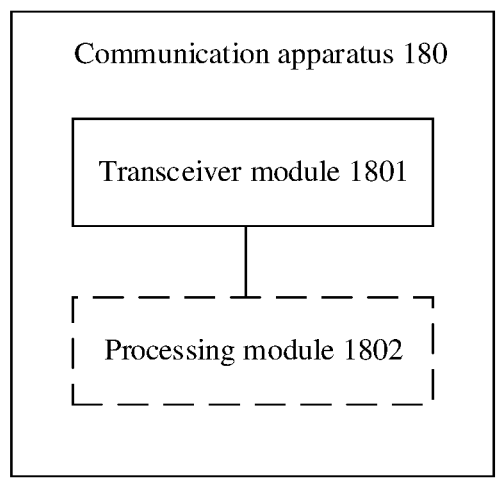

For example, when each functional module is obtained through division in an integrated manner, FIG. 18 is a schematic diagram of a structure of a communication apparatus 180. The communication apparatus 180 includes a transceiver module 1801. Optionally, the communication apparatus 180 further includes a processing module 1802.

For example, the communication apparatus 180 is configured to implement a function of a first terminal. For example, the communication apparatus 180 is the first terminal described in the embodiment shown in FIG. 3, the embodiment shown in FIG. 4, the embodiment shown in FIG. 5, or the embodiment shown in FIG. 6.

The communication apparatus 180 is the first terminal, a chip used in the first terminal, or another combined device or a component that has the function of the first terminal. The transceiver module 1801 is a communication interface. The processing module 1802 is a processor (or a processing circuit), for example, a baseband processor. The baseband processor includes one or more CPUs.

For example, the transceiver module 1801 is configured to perform receiving and sending operations performed by the first terminal in the embodiment shown in FIG. 3, for example, step 302, and/or configured to support another process of the technology described in some embodiments.

For another example, the transceiver module 1801 is configured to perform receiving and sending operations performed by the first terminal in the embodiment shown in FIG. 4, for example, step 402, and/or configured to support another process of the technology described in some embodiments. The processing module 1802 is configured to perform operations, except the receiving and sending operations, performed by the first terminal in the embodiment shown in FIG. 4, for example, execute a first AI task based on first configuration information, and/or configured to support another process of the technology described in some embodiments.

For another example, the transceiver module 1801 is configured to perform receiving and sending operations performed by the first terminal in the embodiment shown in FIG. 5, for example, step 501, and/or configured to support another process of the technology described in some embodiments.

For another example, the transceiver module 1801 is configured to perform receiving and sending operations performed by the first terminal in the embodiment shown in FIG. 6, for example, step 501 and step 602, and/or configured to support another process of the technology described in some embodiments. The processing module 1802 is configured to perform operations, except the receiving and sending operations, performed by the first terminal in the embodiment shown in FIG. 6, for example, execute a first AI task based on first configuration information, and/or configured to support another process of the technology described in some embodiments.

The transceiver module 1801 is configured to send information about the first terminal to a first network device.

In some embodiments the transceiver module 1801 is further configured to receive the first configuration information from the first network device.

In some embodiments the transceiver module 1801 is further configured to receive first indication information from the first network device. The first indication information indicates whether the first terminal is capable of executing the first AI task.

When the communication apparatus 180 is configured to implement the function of the first terminal, for another function that is implemented by the communication apparatus 180, refer to the related descriptions of the embodiment shown in FIG. 3, the method embodiment shown in FIG. 4, the method embodiment shown in FIG. 5, or the method embodiment shown in FIG. 6. Details are not described again.

Alternatively, for example, the communication apparatus 180 is configured to implement a function of a first network device. For example, the communication apparatus 180 is the first network device described in the embodiment shown in FIG. 12 or the embodiment shown in FIG. 13.

The communication apparatus 180 is the first network device, a chip used in the first network device, or another combined device or a component that has the function of the first network device. The transceiver module 1801 is a communication interface. The processing module 1802 is a processor (or a processing circuit), for example, a baseband processor. The baseband processor includes one or more CPUs.

For example, the transceiver module 1801 is configured to perform receiving and sending operations performed by the first network device in the embodiment shown in FIG. 12, for example, step 1201 and step 1202, and/or configured to support another process of the technology described in some embodiments. The processing module 1802 is configured to perform operations, except the receiving and sending operations, performed by the first network device in the embodiment shown in FIG. 12, for example, determine an RB and/or a channel based on first priority information, and/or configured to support another process of the technology described in some embodiments.

For example, the transceiver module 1801 is configured to perform receiving and sending operations performed by the first network device in the embodiment shown in FIG. 13, for example, step 1201, step 1202, and step 1301, and/or configured to support another process of the technology described in some embodiments.

The transceiver module 1801 is configured to receive the first priority information from an AI apparatus. The first priority information indicates a priority of a first AI task.

The transceiver module 1801 is further configured to send first information to a first terminal. The first information indicates the RB and/or the channel. The RB and the channel carry data to be collected by the first terminal based on the first AI task. The first priority information corresponds to the RB and/or the channel.

In some embodiments the transceiver module 1801 is further configured to receive first request information from the first terminal. The first request information requests to set up the RB.

When the communication apparatus 180 is configured to implement the function of the first network device, for another function that is implemented by the communication apparatus 180, refer to the related descriptions of the embodiment shown in FIG. 12 or the method embodiment shown in FIG. 13. Details are not described again.

Figure 19:
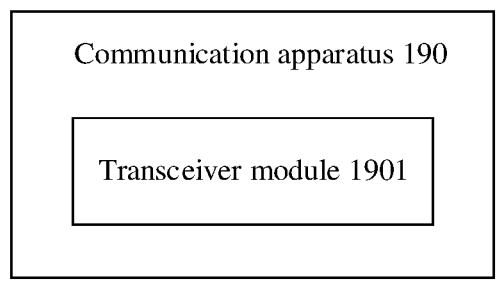

For example, when each functional module is obtained through division in an integrated manner, FIG. 19 is a schematic diagram of a structure of a communication apparatus 190. The communication apparatus 190 includes a transceiver module 1901.

For example, the communication apparatus 190 is configured to implement a function of an AI apparatus. For example, the communication apparatus 190 is the AI apparatus described in the embodiment shown in FIG. 3 or the embodiment shown in FIG. 4.

The communication apparatus 190 is the AI apparatus, a chip used in the AI apparatus, or another combined device or a component that has the function of the AI apparatus. The transceiver module 1901 is a communication interface.

For example, the transceiver module 1901 is configured to perform receiving and sending operations performed by the AI apparatus in the embodiment shown in FIG. 3, for example, step 301, and/or configured to support another process of the technology described in some embodiments.

For another example, the transceiver module 1901 is configured to perform receiving and sending operations performed by the AI apparatus in the embodiment shown in FIG. 4, for example, step 301 and step 401, and/or configured to support another process of the technology described in some embodiments.

The transceiver module 1901 is configured to send first information to a first network device.

In some embodiments the transceiver module 1901 is further configured to send first configuration information to the first network device.

In some embodiments the transceiver module 1901 is further configured to receive first indication information from the first network device. The first indication information indicates whether a first terminal is capable of executing a first AI task.

When the communication apparatus 190 is configured to implement the function of the AI apparatus, for another function that is implemented by the communication apparatus 190, refer to the related descriptions of the embodiment shown in FIG. 3 or the method embodiment shown in FIG. 4. Details are not described again.

Alternatively, for example, the communication apparatus 190 is configured to implement a function of a first network device. For example, the communication apparatus 190 is the first network device described in the embodiment shown in FIG. 5 or the embodiment shown in FIG. 6.

The communication apparatus 190 is the first network device, a chip used in the first network device, or another combined device or a component that has the function of the first network device. The transceiver module 1901 is a communication interface.

For example, the transceiver module 1901 is configured to perform receiving and sending operations performed by the first network device in the embodiment shown in FIG. 5, for example, step 501 and step 502, and/or configured to support another process of the technology described in some embodiments.

For another example, the transceiver module 1901 is configured to perform receiving and sending operations performed by the first network device in the embodiment shown in FIG. 6, for example, step 501, step 502, step 601, and step 602, and/or configured to support another process of the technology described in some embodiments.

The transceiver module 1901 is configured to receive information from a first terminal.

In some embodiments the transceiver module 1901 is further configured to receive first indication information from an AI apparatus. The first indication information indicates whether the first terminal is capable of executing a first AI task.

In some embodiments the transceiver module 1901 is further configured to send the first indication information to the first terminal.

In some embodiments the first terminal is capable of executing the first AI task, and the transceiver module 1901 is further configured to receive first configuration information from the AI apparatus.

When the communication apparatus 190 is configured to implement the function of the first network device, for another function that is implemented by the communication apparatus 190, refer to the related descriptions of the embodiment shown in FIG. 5 or the method embodiment shown in FIG. 6. Details are not described again.

Alternatively, for example, the communication apparatus 190 is configured to implement a function of a first network device. For example, the communication apparatus 190 is the first network device described in the embodiment shown in FIG. 7 or the embodiment shown in FIG. 8.

The communication apparatus 190 is the first network device, a chip used in the first network device, or another combined device or a component that has the function of the first network device. The transceiver module 1901 is a communication interface.

For example, the transceiver module 1901 is configured to perform receiving and sending operations performed by the first network device in the embodiment shown in FIG. 7, for example, step 701 and step 702, and/or configured to support another process of the technology described in some embodiments.

For another example, the transceiver module 1901 is configured to perform receiving and sending operations performed by the first network device in the embodiment shown in FIG. 8, for example, step 701, step 702, step 801, and step 802, and/or configured to support another process of the technology described in some embodiments.

The transceiver module 1901 is configured to receive first information from an AI apparatus.

The transceiver module 1901 is further configured to send the first information to a first terminal.

In some embodiments the transceiver module 1901 is further configured to receive first indication information of the first terminal. The first indication information indicates whether the first terminal is capable of executing a first AI task.

In some embodiments the transceiver module 1901 is further configured to send the first indication information to the AI apparatus.

In some embodiments the transceiver module 1901 is further configured to receive first configuration information from the AI apparatus.

When the communication apparatus 190 is configured to implement the function of the first network device, for another function that is implemented by the communication apparatus 190, refer to the related descriptions of the embodiment shown in FIG. 7 or the method embodiment shown in FIG. 8. Details are not described again.

Alternatively, for example, the communication apparatus 190 is configured to implement a function of an AI apparatus. For example, the communication apparatus 190 is the AI apparatus described in the embodiment shown in FIG. 7 or the embodiment shown in FIG. 8.

The communication apparatus 190 is the AI apparatus, a chip used in the AI apparatus, or another combined device or a component that has the function of the AI apparatus. The transceiver module 1901 is a communication interface.

For example, the transceiver module 1901 is configured to perform receiving and sending operations performed by the AI apparatus in the embodiment shown in FIG. 7, for example, step 701, and/or configured to support another process of the technology described in some embodiments.

For another example, the transceiver module 1901 is configured to perform receiving and sending operations performed by the AI apparatus in the embodiment shown in FIG. 8, for example, step 701 and step 801, and/or configured to support another process of the technology described in some embodiments.

The transceiver module 1901 is configured to send first information to a first network device.

In some embodiments the transceiver module 1901 is further configured to receive first indication information from the first network device. The first indication information indicates whether a first terminal is capable of executing a first AI task.

In some embodiments the transceiver module 1901 is further configured to send first configuration information to the first network device.

When the communication apparatus 190 is configured to implement the function of the AI apparatus, for another function that is implemented by the communication apparatus 190, refer to the related descriptions of the embodiment shown in FIG. 7 or the method embodiment shown in FIG. 8. Details are not described again.

Alternatively, for example, the communication apparatus 190 is configured to implement a function of a first network device. For example, the communication apparatus 190 is the first network device described in the embodiment shown in FIG. 9.

The communication apparatus 190 is the first network device, a chip used in the first network device, or another combined device or a component that has the function of the first network device. The transceiver module 1901 is a communication interface.

For example, the transceiver module 1901 is configured to perform receiving and sending operations performed by the first network device in the embodiment shown in FIG. 9, for example, step 901 and step 902, and/or configured to support another process of the technology described in some embodiments.

The transceiver module 1901 is configured to receive first information from an AI apparatus.

In some embodiments the transceiver module 1901 is further configured to send the first information to a first terminal.

In some embodiments the transceiver module 1901 is further configured to receive second information from the first terminal. The second information indicates a split mode of a first AI task.

In some embodiments the transceiver module 1901 is further configured to send the second information to the AI apparatus.

In some embodiments the transceiver module 1901 is further configured to receive, from the AI apparatus, information about an AI split mode supported by the AI apparatus; and the transceiver module 1901 is further configured to send, to the terminal, the information about the AI split mode supported by the AI apparatus.

In some embodiments the transceiver module 1901 is further configured to receive first configuration information from the AI apparatus.

When the communication apparatus 190 is configured to implement the function of the first network device, for another function that is implemented by the communication apparatus 190, refer to the related descriptions of the method embodiment shown in FIG. 9. Details are not described again.

Alternatively, for example, the communication apparatus 190 is configured to implement a function of an AI apparatus. For example, the communication apparatus 190 is the AI apparatus described in the embodiment shown in FIG. 9.

The communication apparatus 190 is the AI apparatus, a chip used in the AI apparatus, or another combined device or a component that has the function of the AI apparatus. The transceiver module 1901 is a communication interface.

For example, the transceiver module 1901 is configured to perform receiving and sending operations performed by the AI apparatus in the embodiment shown in FIG. 9, for example, step 901, and/or configured to support another process of the technology described in some embodiments.

The transceiver module 1901 is configured to send first information to a first network device.

In some embodiments the transceiver module 1901 is further configured to send, to the first network device, information about an AI split mode supported by the AI apparatus.

In some embodiments the transceiver module 1901 is further configured to receive second information from the first network device. The second information indicates a split mode of a first AI task.

In some embodiments the transceiver module 1901 is further configured to send first configuration information to the first network device.

When the communication apparatus 190 is configured to implement the function of the AI apparatus, for another function that is implemented by the communication apparatus 190, refer to the related descriptions of the method embodiment shown in FIG. 9. Details are not described again.

Alternatively, for example, the communication apparatus 190 is configured to implement a function of a first network device. For example, the communication apparatus 190 is the first network device described in the embodiment shown in FIG. 10.

The communication apparatus 190 is the first network device, a chip used in the first network device, or another combined device or a component that has the function of the first network device. The transceiver module 1901 is a communication interface.

For example, the transceiver module 1901 is configured to perform receiving and sending operations performed by the first network device in the embodiment shown in FIG. 10, for example, step 1001 and step 1002, and/or configured to support another process of the technology described in some embodiments.

The transceiver module 1901 is configured to receive information from a first terminal.

The transceiver module 1901 is further configured to send the information about the first terminal to an AI apparatus.

In some embodiments the transceiver module 1901 is further configured to receive second information from the AI apparatus. The second information indicates a split mode of a first AI task. The transceiver module 1901 is further configured to send the second information to the first terminal.

In some embodiments the transceiver module 1901 is further configured to receive first configuration information from the AI apparatus.

When the communication apparatus 190 is configured to implement the function of the first network device, for another function that is implemented by the communication apparatus 190, refer to the related descriptions of the method embodiment shown in FIG. 10. Details are not described again.

Alternatively, for example, the communication apparatus 190 is configured to implement a function of a first terminal. For example, the communication apparatus 190 is the first terminal described in the embodiment shown in FIG. 10 or the embodiment shown in FIG. 11.

The communication apparatus 190 is the first terminal, a chip used in the first terminal, or another combined device or a component that has the function of the first terminal. The transceiver module 1901 is a communication interface.

For example, the transceiver module 1901 is configured to perform receiving and sending operations performed by the first terminal in the embodiment shown in FIG. 10, for example, step 1001, and/or configured to support another process of the technology described in some embodiments.

For another example, the transceiver module 1901 is configured to perform receiving and sending operations performed by the first terminal in the embodiment shown in FIG. 11, for example, step 1102, and/or configured to support another process of the technology described in some embodiments.

The transceiver module 1901 is configured to send information about the first terminal to a first network device.

In some embodiments the transceiver module 1901 is further configured to receive second information from the first network device. The second information indicates a split mode of a first AI task.

In some embodiments the transceiver module 1901 is further configured to receive first configuration information from the first network device.

When the communication apparatus 190 is configured to implement the function of the first terminal, for another function that is implemented by the communication apparatus 190, refer to the related descriptions of the method embodiment shown in FIG. 10 or the method embodiment shown in FIG. 11. Details are not described again.

Alternatively, for example, the communication apparatus 190 is configured to implement a function of an AI apparatus. For example, the communication apparatus 190 is the AI apparatus described in the embodiment shown in FIG. 11.

The communication apparatus 190 is the AI apparatus, a chip used in the AI apparatus, or another combined device or a component that has the function of the AI apparatus. The transceiver module 1901 is a communication interface.

For example, the transceiver module 1901 is configured to perform receiving and sending operations performed by the AI apparatus in the embodiment shown in FIG. 11, for example, step 1101, and/or configured to support another process of the technology described in some embodiments.

The transceiver module 1901 is configured to send first information to a first network device.

In some embodiments the transceiver module 1901 is further configured to receive second information from the first network device. The second information indicates a split mode of a first AI task.

In some embodiments the transceiver module 1901 is further configured to send, to the first network device, information about an AI split mode supported by the AI apparatus.

In some embodiments the transceiver module 1901 is further configured to send first configuration information to the first network device.

When the communication apparatus 190 is configured to implement the function of the AI apparatus, for another function that is implemented by the communication apparatus 190, refer to the related descriptions of the method embodiment shown in FIG. 11. Details are not described again.

Alternatively, for example, the communication apparatus 190 is configured to implement a function of a first terminal. For example, the communication apparatus 190 is the first terminal described in the embodiment shown in FIG. 12 or the embodiment shown in FIG. 13.

The communication apparatus 190 is the first terminal, a chip used in the first terminal, or another combined device or a component that has the function of the first terminal. The transceiver module 1901 is a communication interface.

For example, the transceiver module 1901 is configured to perform receiving and sending operations performed by the first terminal in the embodiment shown in FIG. 12, for example, step 1202, and/or configured to support another process of the technology described in some embodiments.

For another example, the transceiver module 1901 is configured to perform receiving and sending operations performed by the first terminal in the embodiment shown in FIG. 13, for example, step 1202 and step 1301, and/or configured to support another process of the technology described in some embodiments.

The transceiver module 1901 is configured to receive first information from a first network device.

In some embodiments the transceiver module 1901 is further configured to send first request information to the first network device. The first request information requests to set up an RB.

In some embodiments the transceiver module 1901 is further configured to send the first request information to a second network device. The first request information is for setting up the RB. The second network device is different from the first network device. The second network device is a device that has currently established a connection to the first terminal.

When the communication apparatus 190 is configured to implement the function of the first terminal, for another function that is implemented by the communication apparatus 190, refer to the related descriptions of the method embodiment shown in FIG. 12 or the method embodiment shown in FIG. 13. Details are not described again.

Alternatively, for example, the communication apparatus 190 is configured to implement a function of an AI apparatus. For example, the communication apparatus 190 is the AI apparatus described in the embodiment shown in FIG. 12 or the embodiment shown in FIG. 13.

The communication apparatus 190 is the AI apparatus, a chip used in the AI apparatus, or another combined device or a component that has the function of the AI apparatus. The transceiver module 1901 is a communication interface.

For example, the transceiver module 1901 is configured to perform receiving and sending operations performed by the AI apparatus in the embodiment shown in FIG. 12, for example, step 1201, and/or configured to support another process of the technology described in some embodiments.

For example, the transceiver module 1901 is configured to perform receiving and sending operations performed by the AI apparatus in the embodiment shown in FIG. 13, for example, step 1201, and/or configured to support another process of the technology described in some embodiments.

The transceiver module 1901 is configured to send first priority information to a first network device. The first priority information indicates a priority of a first AI task. The first priority information corresponds to an RB and/or a channel. The RB and the channel carry data to be collected by a first terminal based on the first AI task.

When the communication apparatus 190 is configured to implement the function of the AI apparatus, for another function that is implemented by the communication apparatus 190, refer to the related descriptions of the method embodiment shown in FIG. 12 or the method embodiment shown in FIG. 13. Details are not described again.

Alternatively, for example, the communication apparatus 190 is configured to implement a function of a first network device. For example, the communication apparatus 190 is the first network device described in the embodiment shown in FIG. 16.

The communication apparatus 190 is the first network device, a chip used in the first network device, or another combined device or a component that has the function of the first network device. The transceiver module 1901 is a communication interface.

For example, the transceiver module 1901 is configured to perform receiving and sending operations performed by the first network device in the embodiment shown in FIG. 16, for example, step 1601 and step 1602, and/or configured to support another process of the technology described in some embodiments.

The transceiver module 1901 is configured to receive first configuration information and first area information from an AI apparatus. The first configuration information is configuration information for a first AI task, and the first area information indicates an area to which the first configuration information is applicable.

The transceiver module 1901 is further configured to send the first configuration information and the first area information to a first terminal.

When the communication apparatus 190 is configured to implement the function of the first network device, for another function that is implemented by the communication apparatus 190, refer to the related descriptions of the method embodiment shown in FIG. 16. Details are not described again.

Alternatively, for example, the communication apparatus 190 is configured to implement a function of an AI apparatus. For example, the communication apparatus 190 is the AI apparatus described in the embodiment shown in FIG. 16.

The communication apparatus 190 is the AI apparatus, a chip used in the AI apparatus, or another combined device or a component that has the function of the AI apparatus. The transceiver module 1901 is a communication interface.

For example, the transceiver module 1901 is configured to perform receiving and sending operations performed by the AI apparatus in the embodiment shown in FIG. 16, for example, step 1601, and/or configured to support another process of the technology described in some embodiments.

The transceiver module 1901 is configured to send first configuration information and first area information to a first network device. The first configuration information is configuration information for a first AI task, and the first area information indicates an area to which the first configuration information is applicable.

The transceiver module 1901 is further configured to send second configuration information to a second network device. The second configuration information indicates configuration information for a second AI task, and the second AI task is the same as or different from the first AI task.

In some embodiments the transceiver module 1901 is further configured to send first indication information to the second network device. The first indication information indicates a processing manner of the first AI task corresponding to the first configuration information, and the processing manner includes suspending execution of the first AI task, releasing the first AI task, or continuing execution of the first AI task.

When the communication apparatus 190 is configured to implement the function of the AI apparatus, for another function that is implemented by the AI apparatus 190, refer to the related descriptions of the method embodiment shown in FIG. 16. Details are not described again.

Alternatively, for example, the communication apparatus 190 is configured to implement a function of a second network device. For example, the communication apparatus 190 is the second network device described in the embodiment shown in FIG. 16.

The communication apparatus 190 is the second network device, a chip used in the second network device, or another combined device or a component that has the function of the second network device. The transceiver module 1901 is a communication interface.

For example, the transceiver module 1901 is configured to perform receiving and sending operations performed by the second network device in the embodiment shown in FIG. 16, for example, step 1603 and step 1604, and/or configured to support another process of the technology described in some embodiments.

The transceiver module 1901 is configured to receive second configuration information from an AI apparatus. The second configuration information indicates configuration information for a second AI task. First configuration information indicates configuration information for a first AI task. The second AI task is the same as or different from the first AI task.

The transceiver module 1901 is further configured to send the second configuration information to a first terminal.

In some embodiments the transceiver module 1901 is further configured to receive first indication information from the AI apparatus. The first indication information indicates a processing manner of the first AI task corresponding to the first configuration information, and the processing manner includes suspending execution of the first AI task, releasing the first AI task, or continuing execution of the first AI task.

When the communication apparatus 190 is configured to implement the function of the second network device, for another function that is implemented by the communication apparatus 190, refer to the related descriptions of the method embodiment shown in FIG. 16. Details are not described again.

Figure 20:
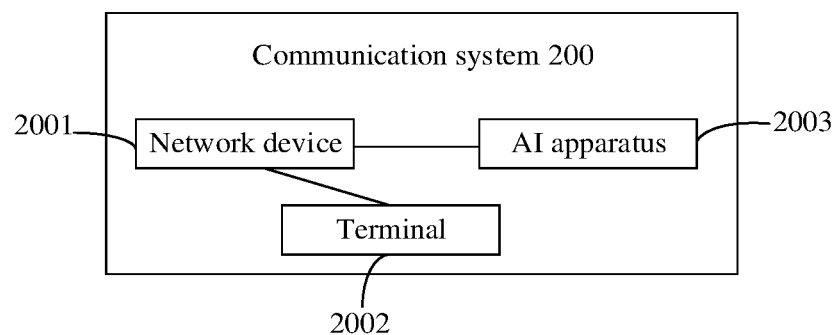
FIG. 20 is a schematic composition diagram of a communication system according to some embodiments.

FIG. 20 is a schematic composition diagram of a communication system. As shown in FIG. 20, the communication system 200 includes a network device 2001, a terminal 2002, and an AI apparatus 2003. FIG. 20 is an example of an accompanying drawing. Network elements included in the communication system 200 shown in FIG. 20 and a quantity of network elements are not limited.

The network device 2001 has a function of the first network device in one or more methods shown in FIG. 3 to FIG. 15. The terminal 2002 has a function of the first terminal in one or more methods shown in FIG. 3 to FIG. 15. The AI apparatus 2003 has a function of the AI apparatus in one or more methods shown in FIG. 3 to FIG. 15.

Figure 21:
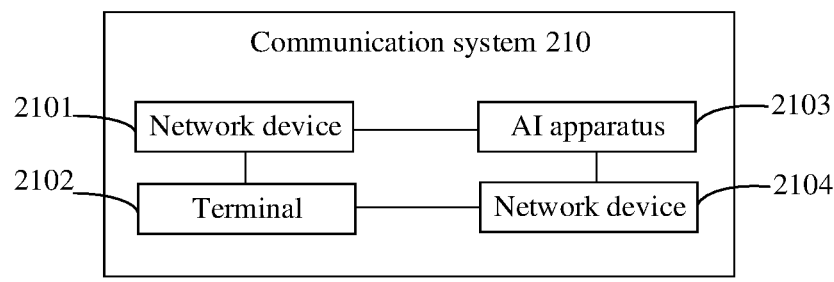
FIG. 21 is a schematic composition diagram of another communication system according to some embodiments.

FIG. 21 is a schematic composition diagram of another communication system. As shown in FIG. 21, communication system 210 includes a network device 2101, a terminal 2102, an AI apparatus 2103, and a network device 2104. FIG. 21 is an example of an accompanying drawing. Network elements included in the communication system 210 shown in FIG. 21 and a quantity of network elements are not limited.

The network device 2101 has a function of the first network device in the method shown in FIG. 16. The terminal 2102 has a function of the first terminal in the method shown in FIG. 16. The AI apparatus 2103 has a function of the AI apparatus in the method shown in FIG. 16. The network device 2104 has a function of the second network device in the method shown in FIG. 16.

All or a part of the technical solutions provided in some embodiments are implemented by using software, hardware, firmware, or any combination thereof. When software is used to implement embodiments, all or a part of embodiments are implemented in the form of a computer program product. The computer program product includes one or more computer instructions. When the computer program instructions are loaded and executed on a computer, the procedures or functions according to some embodiments, are all or partially generated. The computer is a general-purpose computer, a special-purpose computer, a computer network, a network device, a terminal device, an AI apparatus, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device such as a server or a data center, integrating one or more usable media. The usable medium is a magnetic medium (for example, a floppy disk, a hard disk, or a magnetic tape), an optical medium (for example, a digital video disc (digital video disc, DVD)), a semiconductor medium, or the like.

In some embodiments, when there is no logical conflict, embodiments are mutually referenced. For example, methods and/or terms in the method embodiments are mutually referenced, and functions and/or terms in the apparatus embodiments are mutually referenced. For example, functions and/or terms in the apparatus embodiments and the method embodiments are mutually referenced.

A person skilled in the art is able to make various modifications and variations to the embodiments without departing from the scope of the embodiments. The embodiments are intended to cover these modifications and variations provided that the modifications and variations fall within the scope defined by the following claims of the embodiments and equivalent technologies.

What is claimed is:

1. A communication method, comprising: receiving first information from an artificial intelligence (AI) apparatus, wherein the first information includes information about a first terminal configured to perform a first AI task;
   receiving second information about a second terminal from the second terminal;
   determining, based on the first information and the second information, whether the second terminal is configured to perform the first AI task;
   wherein the AI apparatus transmits configuration information which includes first priority information indicating a priority of the first AI task; and
   wherein the AI apparatus determines a split mode based on the first terminal information.

2. The method according to claim 1, wherein:
   the first information further includes at least one of the following information about the first terminal:
   terminal type information;
   information about a moving speed;
   information about a computing capability level;
   electric-quantity information;
   latency information;
   signal quality threshold information;
   information about a memory size;
   information about a remaining memory size;
   information about an AI task type supported
   information about a network function supported and implementable through AI; and
   information about an AI algorithm supported.

3. The method according to claim 1, wherein:
the second information includes at least one of the following information about the second terminal:
  type information;
  information about a moving speed;
  information about a computing capability level;
  electric-quantity information;
  latency information;
  signal quality information;
  information about a memory size;
  information about a remaining memory size;
  information about an AI task type supported;
  information about a network function supported and implementable through the AI; and
  information about an AI algorithm supported.

4. The method according to claim 1, further comprising:
receiving first configuration information from the AI apparatus, wherein the first configuration information includes at least one of the following information:
  an identifier of the first AI task;
  information about AI data to be collected by a third terminal that is to execute the first AI task;
  a data reporting manner of the first AI task, and information about an AI model usable by the third terminal that is to execute the first AI task; and
sending the first configuration information to the second terminal when determining that the second terminal is configured to perform the first AI task.

5. The method according to claim 1, further comprising:
sending first indication information to the second terminal, wherein the first indication information includes whether the second terminal is configured to perform the first AI task.

6. The method according to claim 1, further comprising:
sending first indication information to the AI apparatus, wherein the first indication information indicates whether the second terminal is configured to perform the first AI task.

7. The method according to claim 1, wherein:
the AI apparatus is a network device or a third terminal.

8. A communication apparatus, comprises: at least one processor; a memory storing instructions and in communication with the at least one processor, the at least one processor configured, upon execution of the instructions to cause the communication apparatus to:
  receive first information from an artificial intelligence (AI) apparatus, wherein the first information includes information about a first terminal configured to perform a first AI task;
  receive second information about a second terminal from the second terminal;
  determine, based on the first information and the second information about the second terminal, whether the second terminal is configured to perform the first AI task;
  wherein the AI apparatus transmits configuration information which includes first priority information indicating a priority of the first AI task; and
  wherein the AI apparatus determines a split mode based on the first terminal information.

9. The communication apparatus according to claim 8, wherein:
the first information includes at least one of the following information about the first terminal:
  type information of a terminal type;
  information about a moving speed;
  information about a computing capability level;
  electric-quantity information;
  latency information;
  signal quality threshold information;
  information about a memory size;
  information about a remaining memory size;
  information about an AI task type supported;
  information about a network function supported and implementable through AI; and
  information about an AI algorithm supported.

10. The communication apparatus according to claim 8, wherein:
the information about the second terminal includes at least one of the following information:
  terminal type information;
  information about a moving speed;
  information about a computing capability level;
  electric-quantity information;
  latency information;
  signal quality information;
  information about a memory size;
  information about a remaining memory size;
  information about an AI task type supported;
  information about a network function supported and implementable through the AI; and
  information about an AI algorithm supported.

11. The communication apparatus according to claim 8, wherein the instructions, in response to being executed by the at least one processor, further cause the apparatus to:
  receive first configuration information from the AI apparatus, wherein the first configuration information includes at least one of the following information:
    an identifier of the first AI task;
    information about AI data to be collected by a third terminal that is to perform the first AI task;
    a data reporting manner of the first AI task; and
    information about an AI model usable by the third terminal that is to perform the first AI task; and
  send the first configuration information to the second terminal when determining that the second terminal is configured to perform the first AI task.

12. The communication apparatus according to claim 8, wherein the instructions, in response to being executed by the at least one processor, further cause the apparatus to:
  send first indication information to the first terminal, wherein the first indication information indicates whether the first terminal is configured to perform the first AI task.

13. The communication apparatus according to claim 8, wherein the instructions, in response to being executed by the at least one processor, further cause the apparatus to:
  send first indication information to the AI apparatus, wherein the first indication information indicates whether the first terminal is configured to perform the first AI task.

14. The communication apparatus according to claim 8, wherein:
the AI apparatus is a network device or a third terminal.

15. A communication apparatus, comprises:
at least one processor;
a memory storing instructions and in communication with the at least on processor configured, upon execution of the instructions, to cause the communication apparatus to:
  send information about a first terminal to a first network device, wherein the first terminal is configured to perform a first artificial intelligence (AI) task wherein the information about the first terminal includes at least one of the following:

terminal type information;
information about a moving speed;
information about a computing capability level;
electric-quantity information;
latency information;
signal quality information;
information about a memory size;
information about a remaining memory size;
information about an AI task type supported;
information about a network function supported and implementable through AI; and
information about an AI algorithm supported;
wherein an AI apparatus transmits configuration information which includes first priority information indicating a priority of the first AI task; and
wherein the AI apparatus determines a split mode based on the first terminal information.

16. The communication apparatus according to claim 15, wherein the instructions, in response to being executed by the at least one processor, further cause the communication apparatus to:
receive first configuration information from the first network device, wherein the first configuration information includes at least one of the following information:
an identifier of a first AI task;
information about AI data to be collected by a second terminal that is to perform the first AI task;
a data reporting manner of the first AI task; and
information about an AI model used by the second terminal that is to execute the first AI task; and
perform the first AI task based on the first configuration information.

17. The communication apparatus according claim 16, wherein the instructions, in response to being executed by the at least one processor, further cause the apparatus to:
receive first indication information from the first network device, wherein the first indication information indicates whether the first terminal is configured to perform the first AI task.

* * * * *